US012129111B2

(12) United States Patent
Gary et al.

(10) Patent No.: US 12,129,111 B2
(45) Date of Patent: Oct. 29, 2024

(54) ATTACHMENT SYSTEM FOR VEHICLE

(71) Applicant: Oshkosh Corporation, Oshkosh, WI (US)

(72) Inventors: Logan Gary, Oshkosh, WI (US); David Giere, Oshkosh, WI (US); Vincent Hoover, Byron, MN (US); Zachary Klein, Rochester, MN (US); Jerrod Kappers, Oshkosh, WI (US); Leslie Schwartz, Owatonna, MN (US); Jacob Solberg, Oshkosh, WI (US); Jacob Wallin, Oshkosh, WI (US); Derek Wente, Austin, WI (US)

(73) Assignee: Oshkosh Corporation, Oshkosh, WI (US)

( * ) Notice: Subject to any disclaimer, the term of this patent is extended or adjusted under 35 U.S.C. 154(b) by 492 days.

(21) Appl. No.: 17/558,183

(22) Filed: Dec. 21, 2021

(65) Prior Publication Data

US 2022/0219896 A1 Jul. 14, 2022

Related U.S. Application Data

(60) Provisional application No. 63/135,908, filed on Jan. 11, 2021.

(51) Int. Cl.
*B65F 3/04* (2006.01)
*B65F 3/02* (2006.01)

(52) U.S. Cl.
CPC ...... *B65F 3/041* (2013.01); *B65F 2003/0279* (2013.01)

(58) Field of Classification Search
CPC ......................... B65F 2003/0279; B65F 3/041
See application file for complete search history.

(56) References Cited

U.S. PATENT DOCUMENTS

| | | | | |
|---|---|---|---|---|
| 3,016,157 A | | 1/1962 | Brisson | |
| 3,790,011 A | * | 2/1974 | Owen, Jr. | B65F 3/041 414/608 |
| 4,119,225 A | | 10/1978 | Macht et al. | |
| 4,436,477 A | | 3/1984 | Lenertz et al. | |

(Continued)

FOREIGN PATENT DOCUMENTS

| | | |
|---|---|---|
| DE | 10 2009 046 213 | 5/2011 |
| EP | 1 947 249 A2 | 7/2008 |

*Primary Examiner* — Saul Rodriguez
*Assistant Examiner* — Brendan P Tighe
(74) *Attorney, Agent, or Firm* — Foley & Lardner LLP

(57) ABSTRACT

An attachment system includes a lateral member and an attachment interface. The attachment interface is configured to selectively engage with an attachment to facilitate releasably coupling the attachment to a vehicle. The attachment interface includes a first connecting plate coupled to the lateral member proximate a first end of the lateral member and a second connecting plate coupled to the lateral member proximate an opposing second end of the lateral member. Each of the first connecting plate and the second connecting plate includes (i) an upper interface positioned at an upper end thereof and (ii) a lower interface positioned at a lower end thereof. The upper interface of each of the first connecting plate and the second connecting plate defines a first aperture. The lower interface of each of the first connecting plate and the second connecting plate defines a second aperture.

20 Claims, 52 Drawing Sheets

(56) References Cited

U.S. PATENT DOCUMENTS

| | | | | | |
|---|---|---|---|---|---|
| 5,098,252 | A | | 3/1992 | Sheesley et al. | |
| 5,107,610 | A | | 4/1992 | Fusco | |
| 5,119,894 | A | | 6/1992 | Crawford et al. | |
| 5,215,155 | A | | 6/1993 | Van Der Velden | |
| 5,562,397 | A | | 10/1996 | Albright | |
| 5,727,342 | A | | 3/1998 | Horton | |
| 5,727,637 | A | | 3/1998 | Kono et al. | |
| 5,769,596 | A | * | 6/1998 | Burton | E02F 3/3659 37/468 |
| 6,062,319 | A | | 5/2000 | Schwalenberg et al. | |
| 6,375,405 | B1 | | 4/2002 | Kallevig | |
| 7,014,385 | B2 | | 3/2006 | Lim et al. | |
| 8,117,773 | B2 | | 2/2012 | Seda et al. | |
| 9,624,641 | B2 | | 4/2017 | Martin et al. | |
| 10,377,568 | B2 | | 8/2019 | Rimsa | |
| 10,737,880 | B2 | | 8/2020 | Gentry et al. | |
| 2006/0210384 | A1 | | 9/2006 | Warren | |
| 2013/0243554 | A1 | | 9/2013 | Rowland et al. | |
| 2015/0071700 | A1 | | 3/2015 | Miller | |
| 2019/0367270 | A1 | | 12/2019 | Rimsa | |
| 2020/0087063 | A1 | * | 3/2020 | Haddick | B65F 3/02 |

* cited by examiner

ATTACHMENT SYSTEM FOR VEHICLE

CROSS-REFERENCE TO RELATED PATENT APPLICATION

This application claims the benefit of and priority to U.S. Provisional Patent Application No. 63/135,908, filed Jan. 11, 2021, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to an attachment system for a vehicle. The attachment system includes a lateral member and an attachment interface. The attachment interface is configured to selectively engage with an attachment to facilitate releasably coupling the attachment to the vehicle. The attachment interface includes a first connecting plate coupled to the lateral member proximate a first end of the lateral member and a second connecting plate coupled to the lateral member proximate an opposing second end of the lateral member. Each of the first connecting plate and the second connecting plate includes (i) an upper interface positioned at an upper end thereof and (ii) a lower interface positioned at a lower end thereof. The upper interface of each of the first connecting plate and the second connecting plate defines a first aperture. The lower interface of each of the first connecting plate and the second connecting plate defines a second aperture.

Another embodiment relates to an attachment system for a vehicle. The attachment system includes a lateral member, a plurality of arms coupled to and extending from the lateral member along a length thereof, and an attachment interface. The attachment interface includes a bracket coupled to the plurality of arms and a pair of interfaces coupled to the lateral member. One of the pair of interfaces is positioned proximate each end of the lateral member. The bracket and the pair of receivers are configured to selectively interface with an attachment to facilitate releasably coupling the attachment to the vehicle.

Still another embodiment relates to an attachment system for a vehicle. The attachment system includes a lateral member and an attachment interface. The attachment interface is configured to selectively engage with a plurality of attachments to facilitate releasably coupling the plurality of attachments to the vehicle. The attachment interface includes a first interface coupled to the lateral member proximate a first end of the lateral member, a second interface coupled to the lateral member proximate an opposing second end of the lateral member, and a third interface positioned between the first interface and the second interface. The second interface is spaced a first distance from the first interface. The third interface is spaced a second distance from the first interface that is less than the first distance. The first interface and the second interface facilitate selectively coupling a first attachment to the vehicle. The first interface and the third interface facilitate selectively coupling a second attachment to the vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an attachment system for a vehicle (e.g., a refuse vehicle, a front-loading refuse vehicle, a rear-loading refuse vehicle, a side-loading refuse vehicle, a skid-loader, a telehandler, a truck, a boom lift, etc.) is configured to facilitate selectively and releasably securing an attachment (e.g., a container attachment, a fork attachment, a plow attachment, a bucket attachment, a street sweeper attachment, a grabber attachment, a cart tipper attachment, etc.) to a lift assembly of the vehicle. Such an attachment system may advantageously allow an operator of the vehicle to use the vehicle for various applications and/or switch attachments for the vehicle with relative ease. By way of example, a container attachment may be attached to the vehicle such that the vehicle may be used for residential refuse collection (e.g., to collect refuse from smaller, residential refuse containers, etc.). By way of another example, a fork attachment may be attached to the vehicle such that the vehicle may be used for commercial refuse collection (e.g., to collect refuse from larger, commercial refuse containers, etc.). By way of yet another example, a plow attachment may be attached to the vehicle such that the vehicle may be used for snow removal. By way of still another example, a street sweeper attachment may be attached to the vehicle such that the vehicle maybe used to remove debris, dirt, etc. from streets, parking lots, etc.

Figure 1:
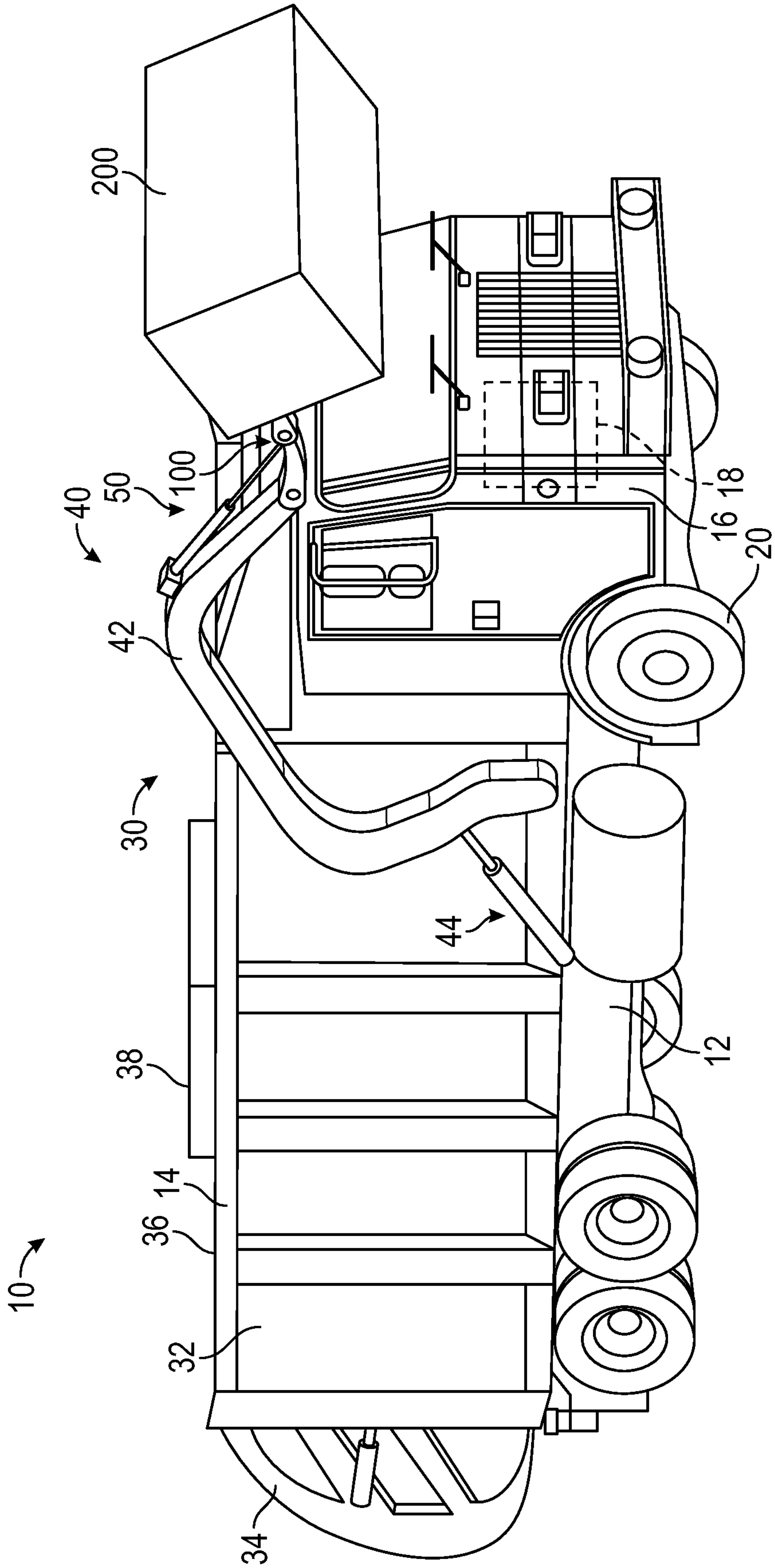
FIG. 1 is a perspective view of a refuse vehicle, according to an exemplary embodiment.

According to the exemplary embodiment shown in FIGS. 1-20, a vehicle, shown as refuse vehicle 10 (e.g., a garbage truck, a waste collection truck, a sanitation truck, etc.), is configured as a front-loading refuse truck having a first attachment assembly, shown as attachment assembly 100. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a plurality of tractive elements, shown as wheels 20, and/or to other systems of the refuse vehicle 10 (e.g., a pneumatic system, a hydraulic system, etc.). The engine 18 may be configured to utilize one or more of a variety of fuels (e.g., gasoline, diesel, biodiesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes a first lift mechanism/system (e.g., a front-loading lift assembly, etc.), shown as lift assembly 40. The lift assembly 40 includes a pair of arms, shown as lift arms 42, coupled to the frame 12 and/or the body 14 on either side of the refuse vehicle 10 such that the lift arms 42 extend forward of the cab 16 (e.g., a front-loading refuse vehicle, etc.). In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). The lift arms 42 may be rotatably coupled to frame 12 with a pivot (e.g., a lug, a shaft, etc.). As shown in FIG. 1, the lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment.

Figure 8:
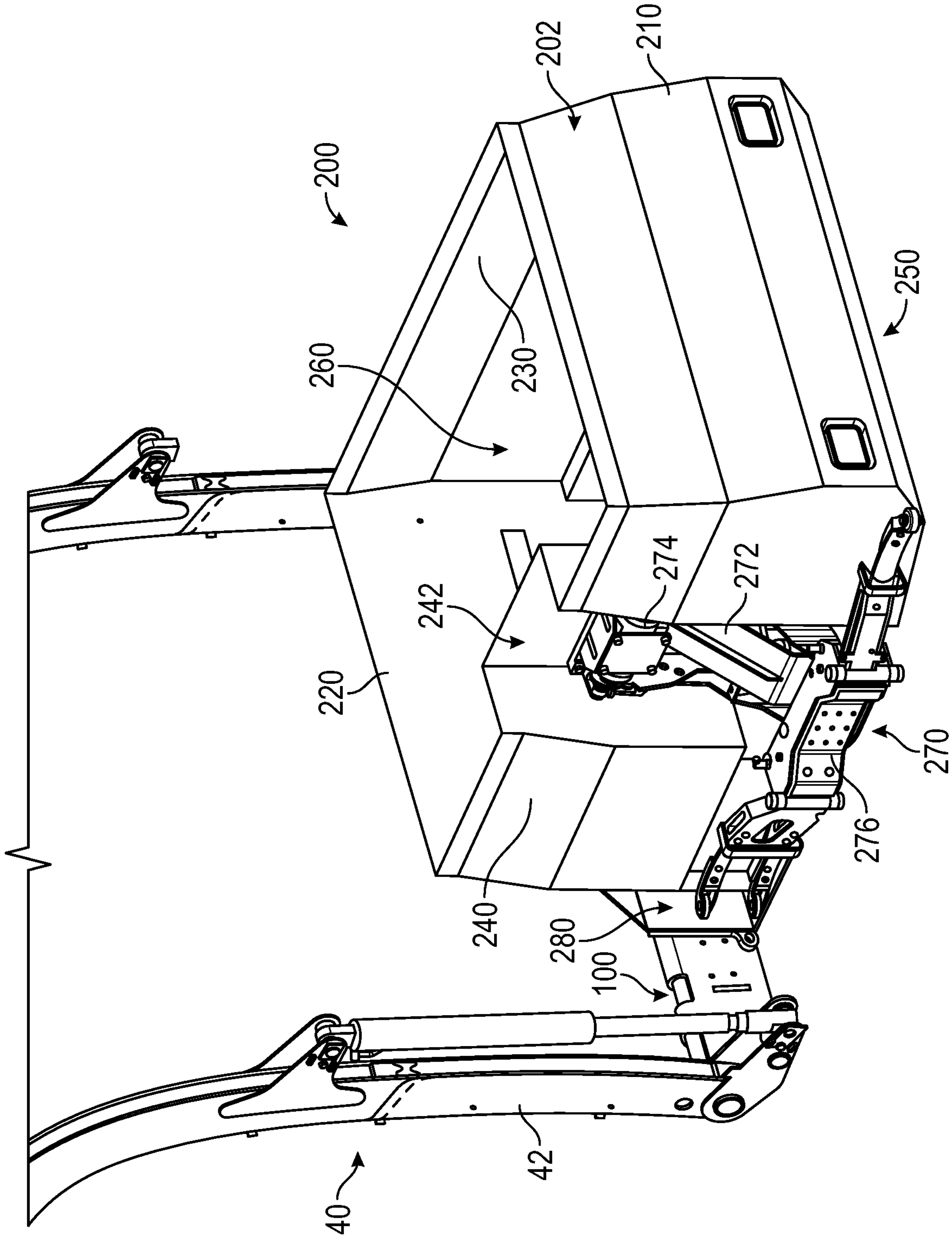
FIG. 8 is a front perspective view of a first attachment coupled to the attachment assembly of FIG. 3, according to an exemplary embodiment.
Figure 16:
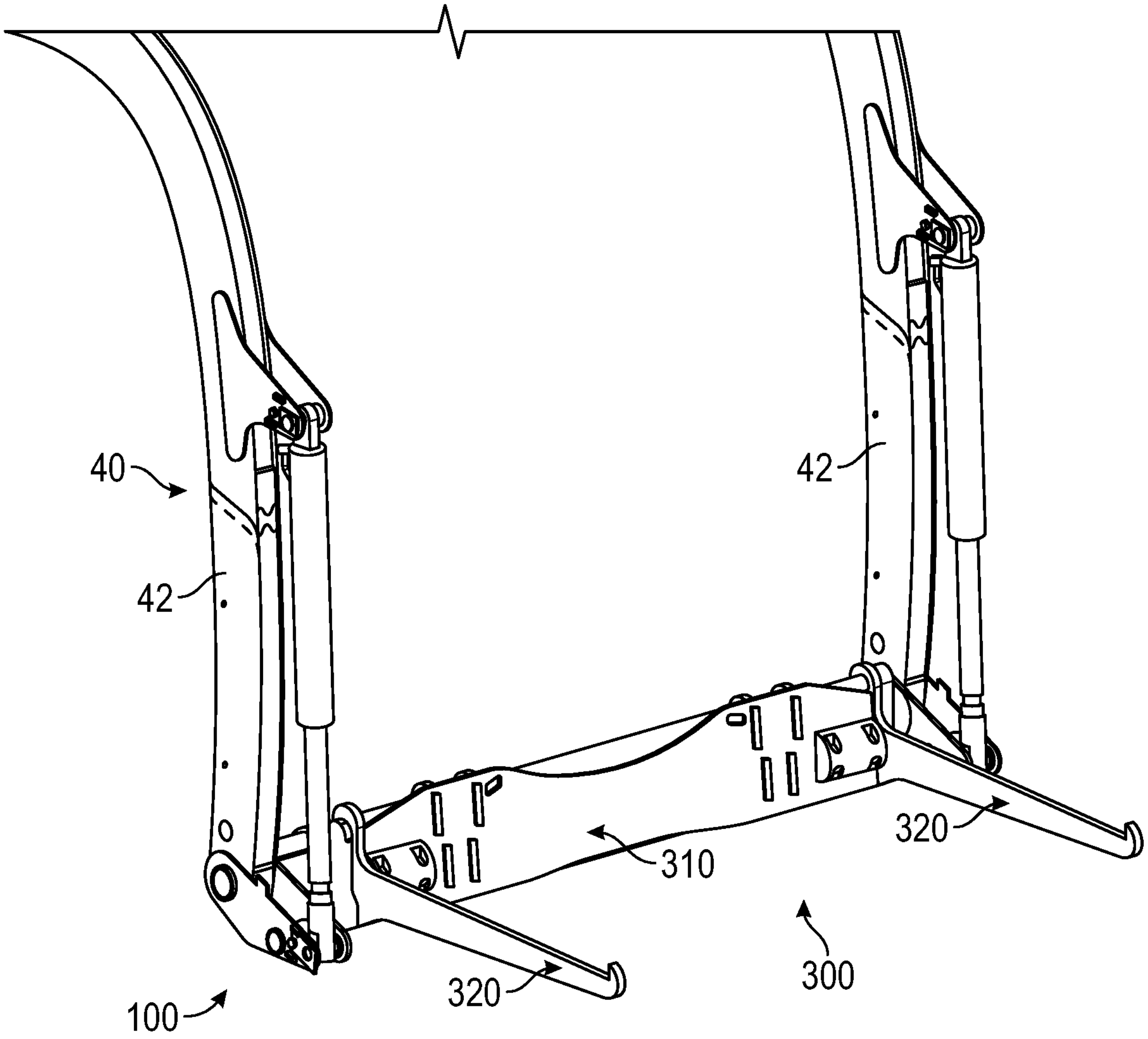
FIG. 16 is a front perspective view of a second attachment coupled to the attachment assembly of FIG. 3, according to an exemplary embodiment.
Figure 17:
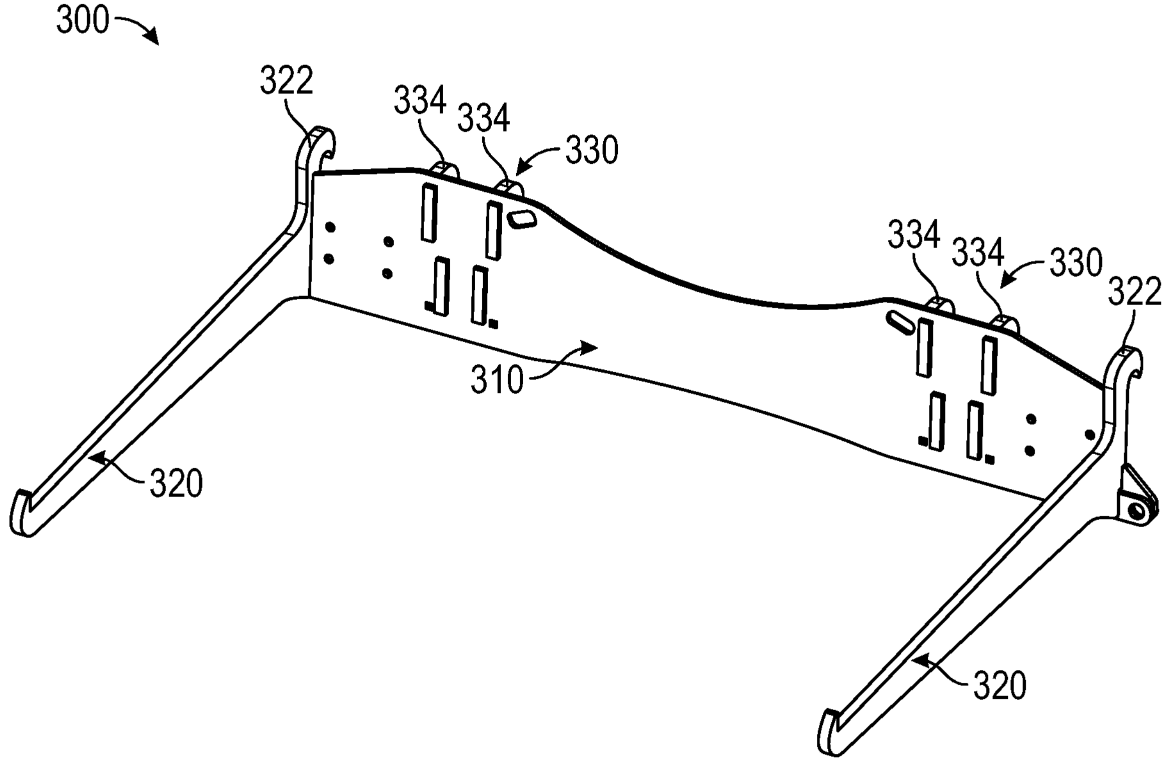
FIGS. 17 and 18 are various perspective views of the second attachment of FIG. 16, according to an exemplary embodiment.

As shown in FIGS. 1, 2, 8, and 16, the attachment assembly 100 is coupled to the lift arms 42 of the lift assembly 40. As shown in FIGS. 1 and 8, the attachment assembly 100 is configured to engage with a first attachment (e.g., a carry can, etc.), shown as container attachment 200, to selectively and releasably secure the container attachment 200 to the lift assembly 40. As shown in FIG. 16, the attachment assembly 100 is configured to engage with a second attachment, shown as fork attachment 300, to selectively and releasably secure the fork attachment 300 to the lift assembly 40. In other embodiments, the attachment assembly 100 is configured to engage with another type of attachment (e.g., a street sweeper attachment, a snow plow attachment, a snowblower attachment, a towing attachment, a wood chipper attachment, a bucket attachment, a cart tipper attachment, a grabber attachment, etc.).

Figure 2:
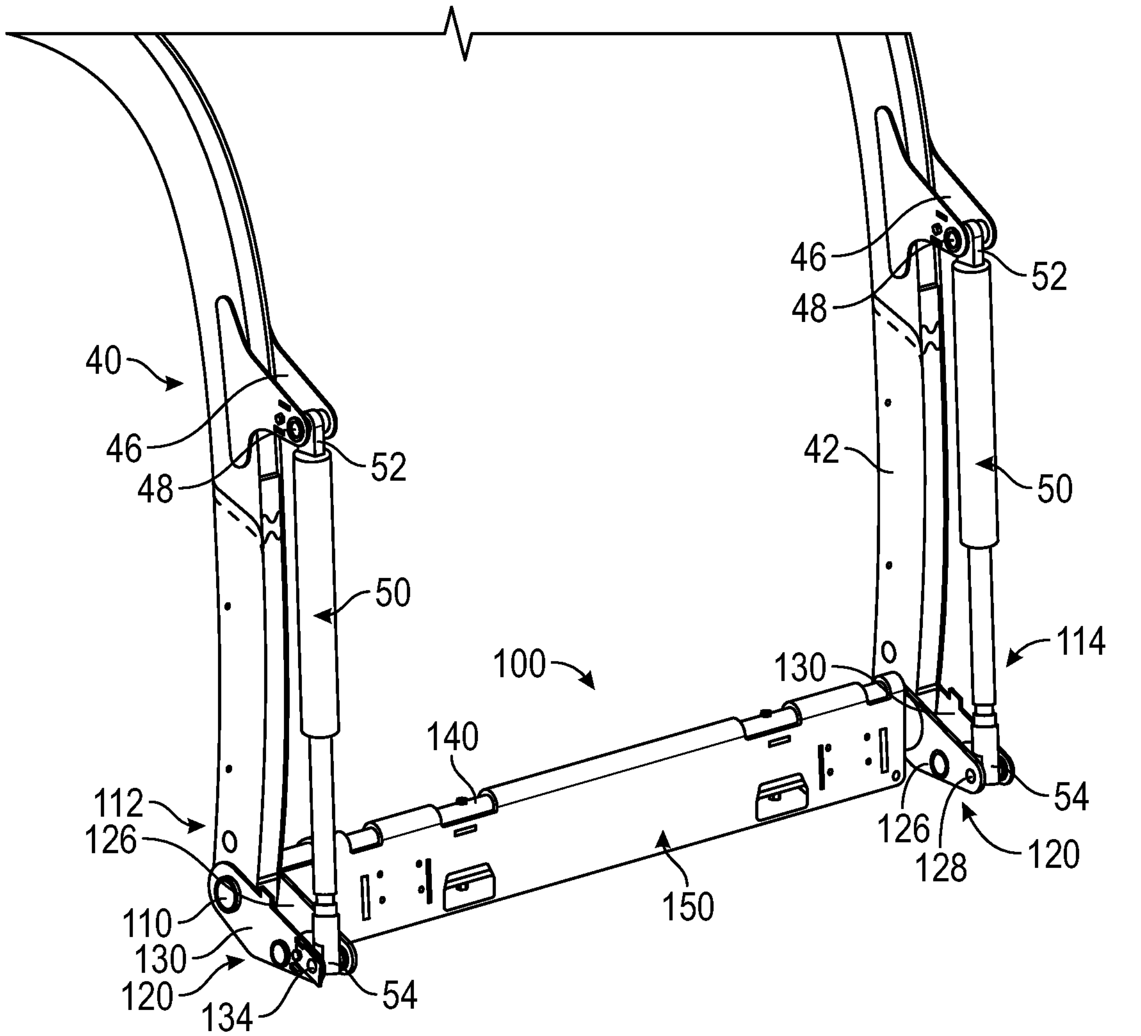
FIG. 2 is a front perspective view of an attachment assembly of a refuse vehicle, according to an exemplary embodiment.

As shown in FIG. 1, the lift arms 42 are rotated by the lift arm actuators 44 to lift the container attachment 200 or other attachment over the cab 16. As shown in FIGS. 1 and 2, the lift assembly 40 includes second actuators, shown as articulation actuators 50 (e.g., hydraulic cylinders, etc.). According to an exemplary embodiment, the articulation actuators 50 are positioned to articulate the attachment assembly 100. Such articulation may assist in tipping refuse out of the container attachment 200 and/or a refuse container (e.g., coupled to the lift assembly 40 by the fork attachment 300, etc.) and into the hopper volume of the refuse compartment 30 through an opening in the cover 36. The lift arm actuators 44 may thereafter rotate the lift arms 42 to return the empty container attachment 200 to the ground. According to an exemplary embodiment, a door, shown as top door 38 is movably coupled along the cover 36 to seal the opening thereby preventing refuse from escaping the refuse compartment 30 (e.g., due to wind, bumps in the road, etc.).

As shown in FIGS. 2-7, the attachment assembly 100 includes a first lateral member, shown as main tube 110, having a first end, shown as right end 112, and an opposing second end, shown as left end 114. As shown in FIGS. 2-5 and 7, the attachment assembly 100 includes a pair of brackets, shown as brackets 120. A first bracket 120 is coupled to the right end 112 of the main tube 110 and a second bracket 120 is coupled to the left end 114 of the main tube 110.

Figure 3:
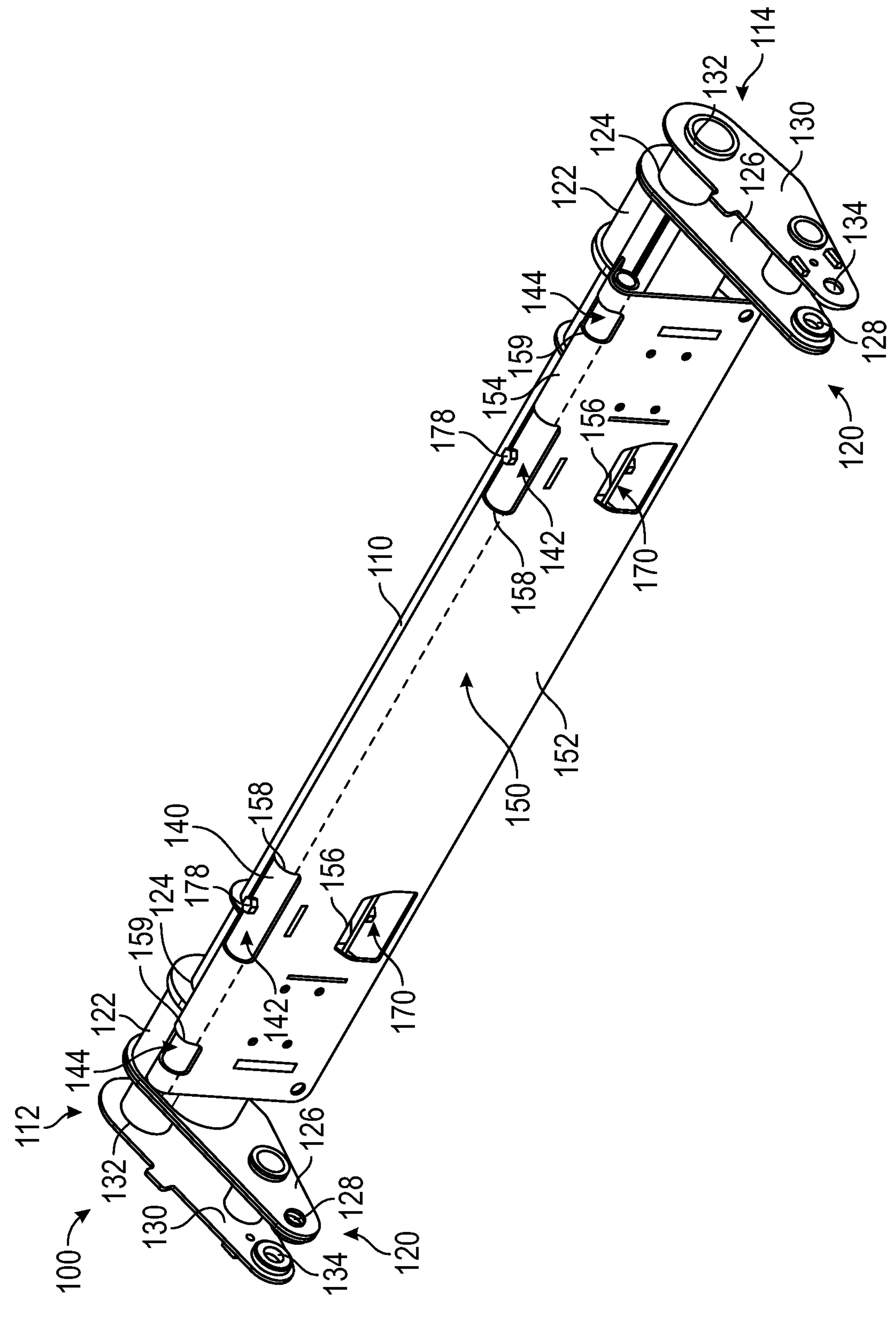
FIG. 3 is a front perspective view of an attachment assembly, according to an exemplary embodiment.
Figure 4:
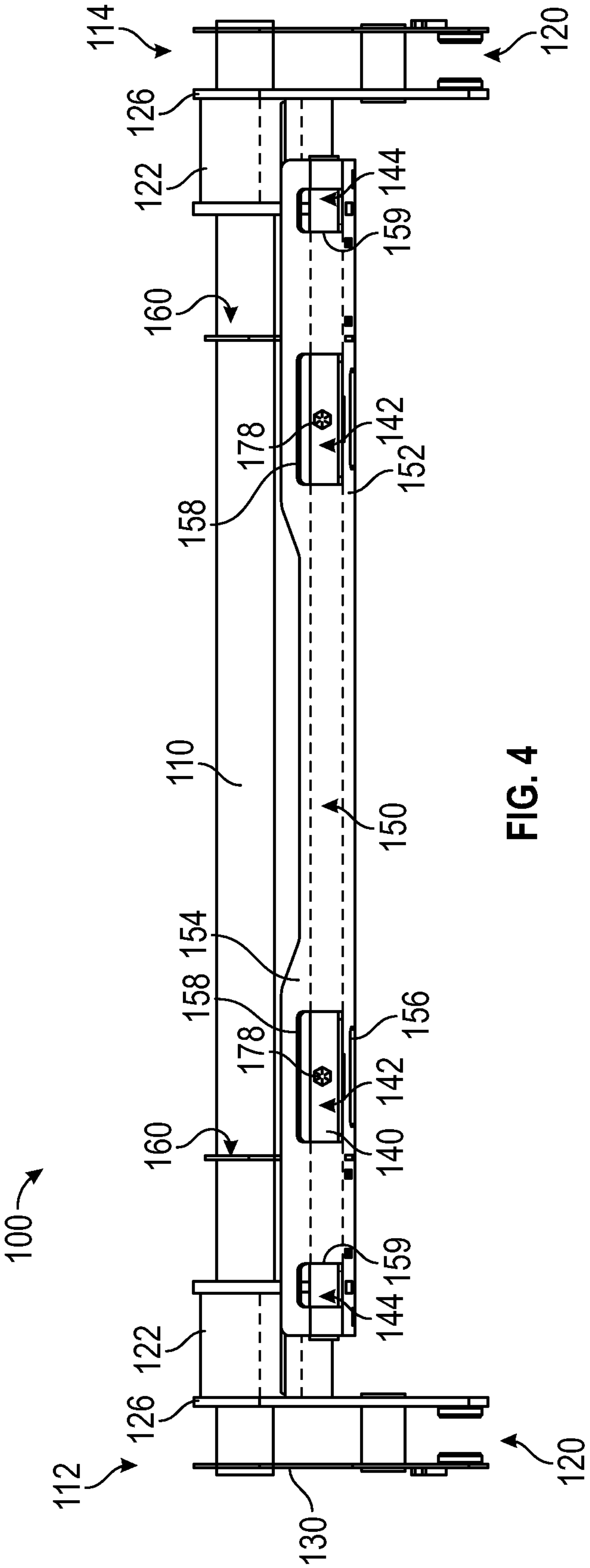
FIG. 4 is a top view of the attachment assembly of FIG. 3, according to an exemplary embodiment.

As shown in FIGS. 2-5 and 7, each of the brackets 120 includes an interface, shown as collar 122; a first plate, shown as inner plate 126, coupled to the collar 122 (e.g., welded thereto, integrally formed therewith, etc.); and a second plate, shown as outer plate 130, spaced from the inner plate 126. As shown in FIG. 3, each of the collars 122 and the inner plates 126 cooperatively define an aperture, shown as through-hole 124. According to an exemplary embodiment, the through-holes 124 of the brackets 120 facilitate sliding the collars 122 onto the main tube 110. The collars 122 may be fixedly secured (e.g., with adhesive, welded, an interface fit, threaded, etc.) onto each of the right end 112 and the left end 114 of the main tube 110. As shown in FIG. 3, each of the outer plates 130 defines an aperture, shown as aperture 132. According to an exemplary embodiment, the apertures 132 facilitate sliding the outer plates 130 onto the main tube 110. The outer plates 130 may be fixedly secured (e.g., with adhesive, welded, an interface fit, threaded, etc.) onto each of the right end 112 and the left end 114 of the main tube 110, forming a space between the inner plates 126 and the outer plates 130. Such a space may facilitate coupling the attachment assembly 100 to the lift assembly 40. As shown in FIG. 2, the ends of the lift arms 42 are disposed between the inner plates 126 and the outer plates 130. According to an exemplary embodiment, the ends of the lift arms 42 each define an aperture that receives the right end 112 and the left end 114, respectively, of the main tube 110. The outer plates 130 may be coupled to the main tube 110 after the main tube 110 is attached to the lift arms 42, thereby securing the attachment assembly 100 to the lift assembly 40.

As shown in FIGS. 2 and 3, each of the inner plates 126 defines an aperture, shown as aperture 128, and each of the outer plates 130 defines a corresponding aperture, shown as aperture 134. The apertures 128 and the apertures 134 cooperatively define a pair of interfaces, one at each of the brackets 120. As shown in FIG. 2, the lift assembly 40 includes a pair of brackets, shown as articulating brackets 46, disposed along the lift arms 42. Each of the articulating brackets 46 defines an interface, shown as through-hole 48. As shown in FIG. 2, each of the articulation actuators 50 includes a first interface, shown as first eyelet 52, positioned at a first end of the articulation actuators 50. Each of the first eyelets 52 is positioned to align with one of the through-holes 48 of the articulating brackets 46 (e.g., to receive a fastener, pin, etc.). According to an exemplary embodiment, the first eyelets 52 pivotally couple the articulation actuators 50 to the articulating brackets 46. As shown in FIG. 2, each of the articulation actuators 50 includes a second interface, shown as second eyelet 54, positioned at an opposing second end of the articulation actuators 50. Each of the second eyelets 54 is positioned to align with one of the interfaces defined by the apertures 128 and the apertures 134 of the brackets 120 (e.g., to receive a fastener, pin, etc.). According to an exemplary embodiment, the second eyelets 54 pivotally couple the articulation actuators 50 to the brackets 120 of the attachment assembly 100.

Figure 5:
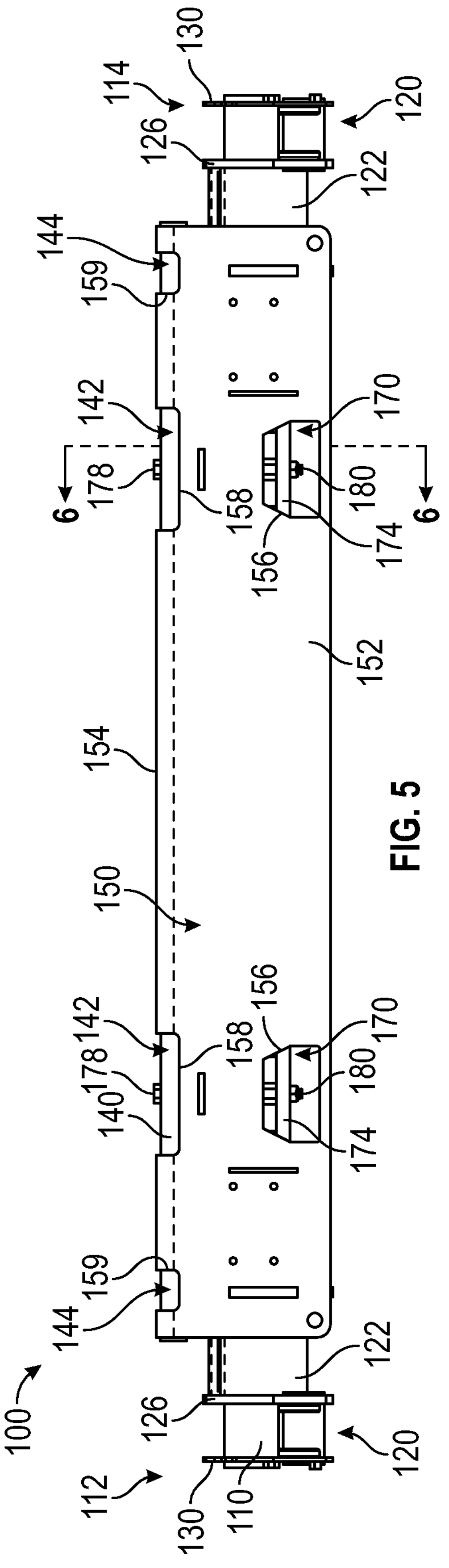
FIG. 5 is a front view of the attachment assembly of FIG. 3, according to an exemplary embodiment.
Figure 6:
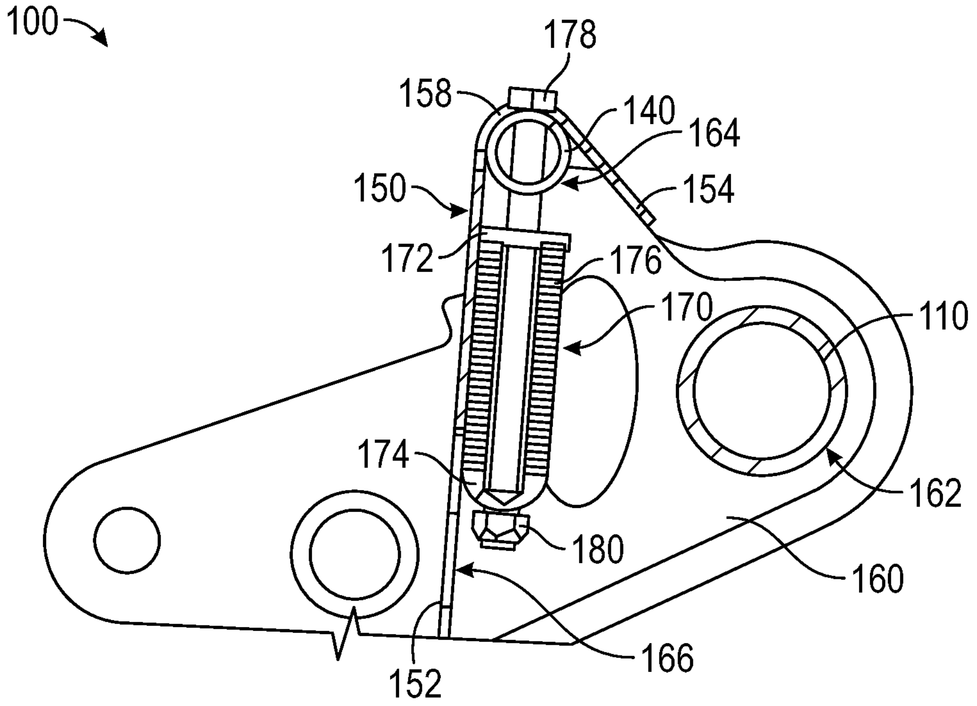
FIG. 6 is a detailed cross-sectional view of the attachment assembly of FIG. 5, according to an exemplary embodiment.

As shown in FIGS. 2-7, the attachment assembly 100 includes a second lateral member, shown as coupling tube 140; a plate, show as attachment plate 150; and a pair of frame members, shown as support plates 160. In other embodiments, the attachment assembly 100 includes a different number of the support plates 160 (e.g., one, three, four, etc.). As shown in FIGS. 3-7, the attachment plate 150 has a plate, shown as plate 152, with a curved portion, shown as flange 154, extending therefrom. As shown in FIGS. 3-7, the flange 154 at least partially curls around and over the coupling tube 140. As shown in FIG. 6, each of the support plates 160 defines an aperture, shown as main aperture 162, positioned to receive the main tube 110. Each of the support plates 160 defines an interface, shown as coupling tube interface 164, configured to engage the coupling tube 140. Each of the support plates 160 includes an edge, shown as front edge 166, positioned along an interior surface of the plate 152 of the attachment plate 150. The support plates 160 may thereby couple the main tube 110, the coupling tube 140, and the attachment plate 150 together. According to an exemplary embodiment, the main tube 110, the coupling tube 140, the attachment plate 150, and/or the support plates 160 form a single weldment. In other embodiments, the components of the attachment assembly 100 are otherwise coupled together (e.g., fastened, adhesively coupled, etc.). In other embodiments, the support plates 160 are differently shaped and/or couple a different combination of components.

As shown in FIGS. 3-7, the plate 152 of the attachment plate 150 defines a first plurality of apertures, shown as first apertures 156. The flange 154 of the attachment plate 150 defines a second plurality of apertures, shown as second apertures 158, positioned to align with the first apertures 156. The second apertures 158 expose first respective portions, shown as first exposed portions 142, of the coupling tube 140. According to the exemplary embodiment shown in FIGS. 3-7, the attachment plate 150 includes two first apertures 156 and two second apertures 158, a first set positioned towards the right end 112 and a second set positioned towards the left end 114. In other embodiments, the attachment plate 150 includes a different number of sets of the first apertures 156 and the second apertures 158 (e.g., one set, three sets, etc.). By way of example, a third set of the first apertures 156 and the second apertures 158 may be positioned in the center of the attachment plate 150 (e.g., centered between the right end 112 and the left end 114, etc.). As shown in FIGS. 3-5 and 7, the flange 154 of the attachment plate 150 defines a third plurality of apertures, shown as third apertures 159. A first of the third apertures 159 is positioned proximate the right end 112 of the attachment plate 150 and a second of the third apertures 159 is positioned proximate the left end 114 of the attachment plate 150 (e.g., the third apertures 159 are positioned further laterally outward than each set of first apertures 156 and second apertures 158, etc.). The third apertures 159 expose second respective portions, shown as second exposed portions 144, of the coupling tube 140.

As shown in FIGS. 3 and 5-7, the attachment assembly 100 includes a plurality of couplers, shown as couplers 170. According to the exemplary embodiment shown in FIGS. 3 and 5-7, the attachment assembly 100 includes a pair of couplers, shown as couplers 170, one positioned to align with each set of the first apertures 156 and the second apertures 158 of the attachment plate 150. In other embodiments, the attachment assembly 100 includes a different number of couplers 170 to correspond with a different number of sets of the first apertures 156 and the second apertures 158 (e.g., one, three, etc.). According to an exemplary embodiment, the couplers 170 are configured to facilitate selectively and releasably securing an attachment (e.g., the container attachment 200, the fork attachment 300, etc.) to the attachment assembly 100.

Figure 7:
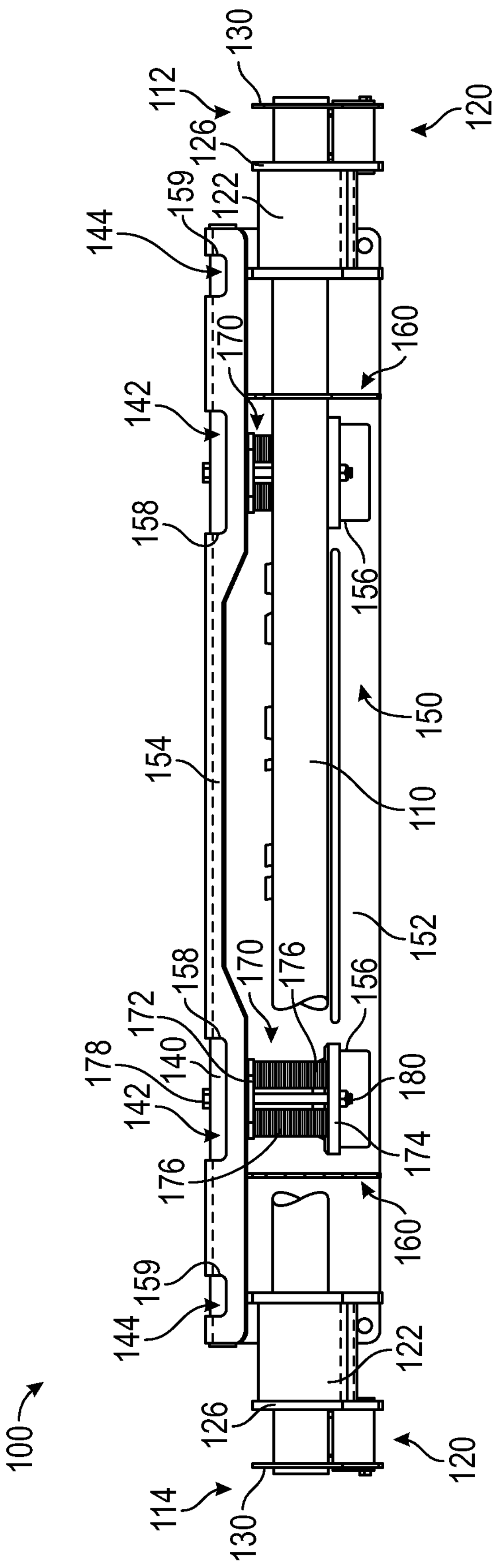
FIG. 7 is a rear view of the attachment assembly of FIG. 3, according to an exemplary embodiment.

As shown in FIGS. 6 and 7, each of the couplers 170 includes a first support (e.g., a plate, etc.), shown as upper support 172. As shown in FIG. 6, the upper supports 172 are coupled (e.g., attached, fixed, fastened, welded, adhesively secured, etc.) to the interior surface of the plate 152 (e.g., indirectly coupled to the coupling tube 140, above the first apertures 156 and below the second apertures 158, etc.). In alternative embodiments, the upper supports 172 are directly coupled (e.g., attached, fixed, fastened, welded, adhesively secured, etc.) to an underside of the coupling tube 140.

As shown in FIGS. 5-7, each of the couplers 170 incudes a second support (e.g., a plate, a bar, a half-moon or semi-circular shaped bar/tube, etc.), shown as lower support 174. As shown in FIGS. 6 and 7, the lower supports 174 are selectively spaced from (e.g., offset relative to, etc.) the upper supports 172, thereby defining a gap therebetween. The top surface of the lower supports 174 are flat and an underside of the lower supports 174 are curved (e.g., half-moon shaped, etc.), according to an exemplary embodiment. As shown in FIGS. 6 and 7, each of the couplers 170 includes a plurality of resilient members, shown as springs 176, disposed within the gap between a bottom surface of the upper supports 172 and the top surface of the lower supports 174. According to an exemplary embodiment, each of the couplers 170 includes a pair of springs 176. In other embodiments, each of the couplers 170 includes a different number of the springs 176 (e.g., one, three, four, etc.). According to an exemplary embodiment, the springs 176 are configured to provide a resilient force to bias the lower supports 174 away from the upper supports 172.

As shown in FIGS. 3-7, each of the couplers 170 includes an adjuster assembly having an adjuster, shown as fastener 178, and a retainer, shown as nut 180. As shown in FIGS. 3-7, the fasteners 178 are accessible through the second apertures 158. As shown in FIG. 6, each of the fasteners 178 extends through the coupling tube 140, the upper supports 172, and the lower supports 174 and engages a respective nut 180 positioned along the underside of a respective lower support 174. In one embodiment, the nuts 180 are free to rotate. In another embodiment, the nuts 180 are fixed (e.g., welded, etc.) to the lower supports 174. In alternative embodiments, the adjuster assemblies do not include the nuts 180. By way of example, the lower supports 174 may define a threaded aperture that threadably engages the fasteners 178. According to an exemplary embodiment, the adjuster assemblies (e.g., the fasteners 178, the nuts 180, etc.) are configured to facilitate selectively reorienting the lower supports 174 relative to the upper supports 172 between a first position (e.g., an extended position, an engagement position, etc.) and a second position (e.g., a compressed position, a disengagement position, etc.). By way of example, adjusting (e.g., tightening, loosening, etc.) the fasteners 178 may bring the lower supports 174 upward, towards the upper supports 172, compressing the springs 176. By way of another example, adjusting (e.g., loosening, tightening, etc.) the fasteners 178 may dismiss the lower supports 174 downward, away from the upper supports 172, relaxing the springs 176.

Figure 9:
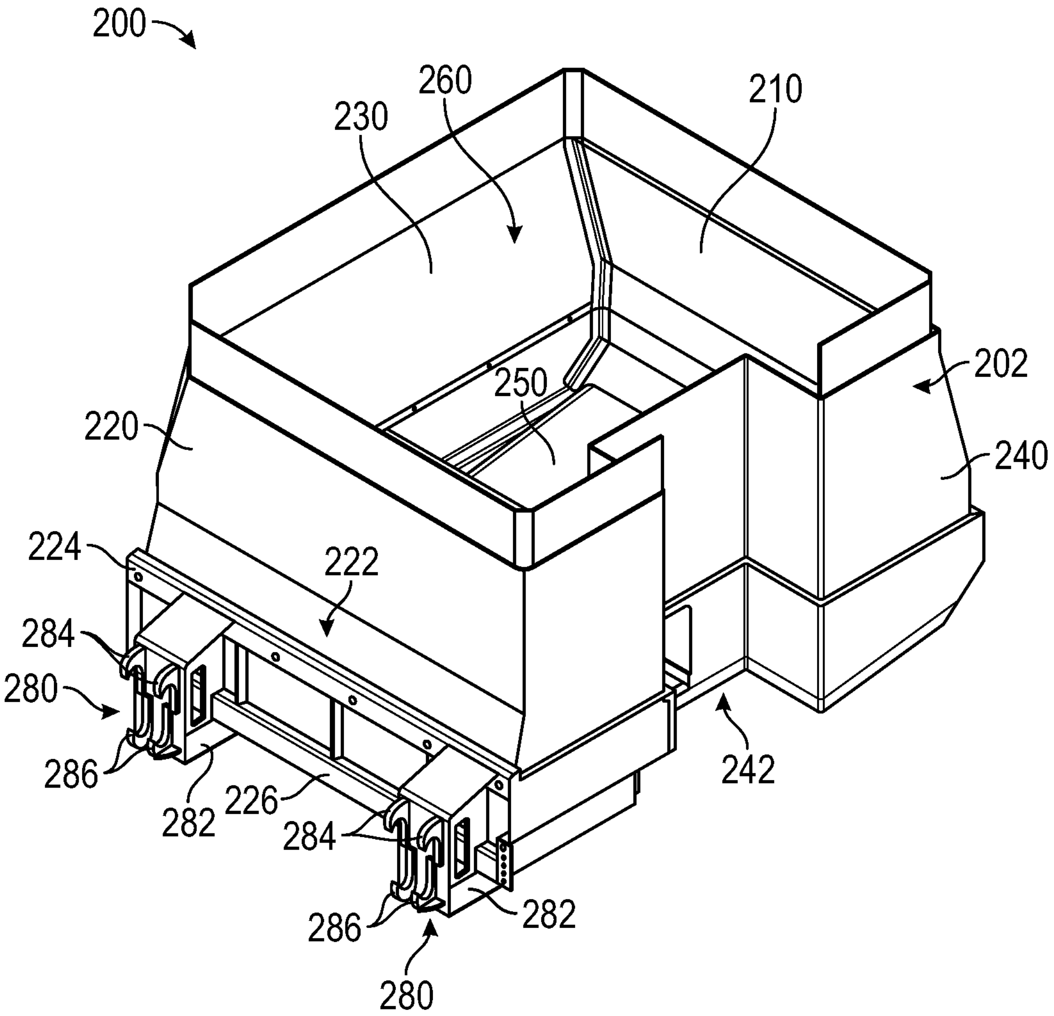
FIG. 9 is a rear perspective view of the first attachment of FIG. 8, according to an exemplary embodiment.
Figure 10:
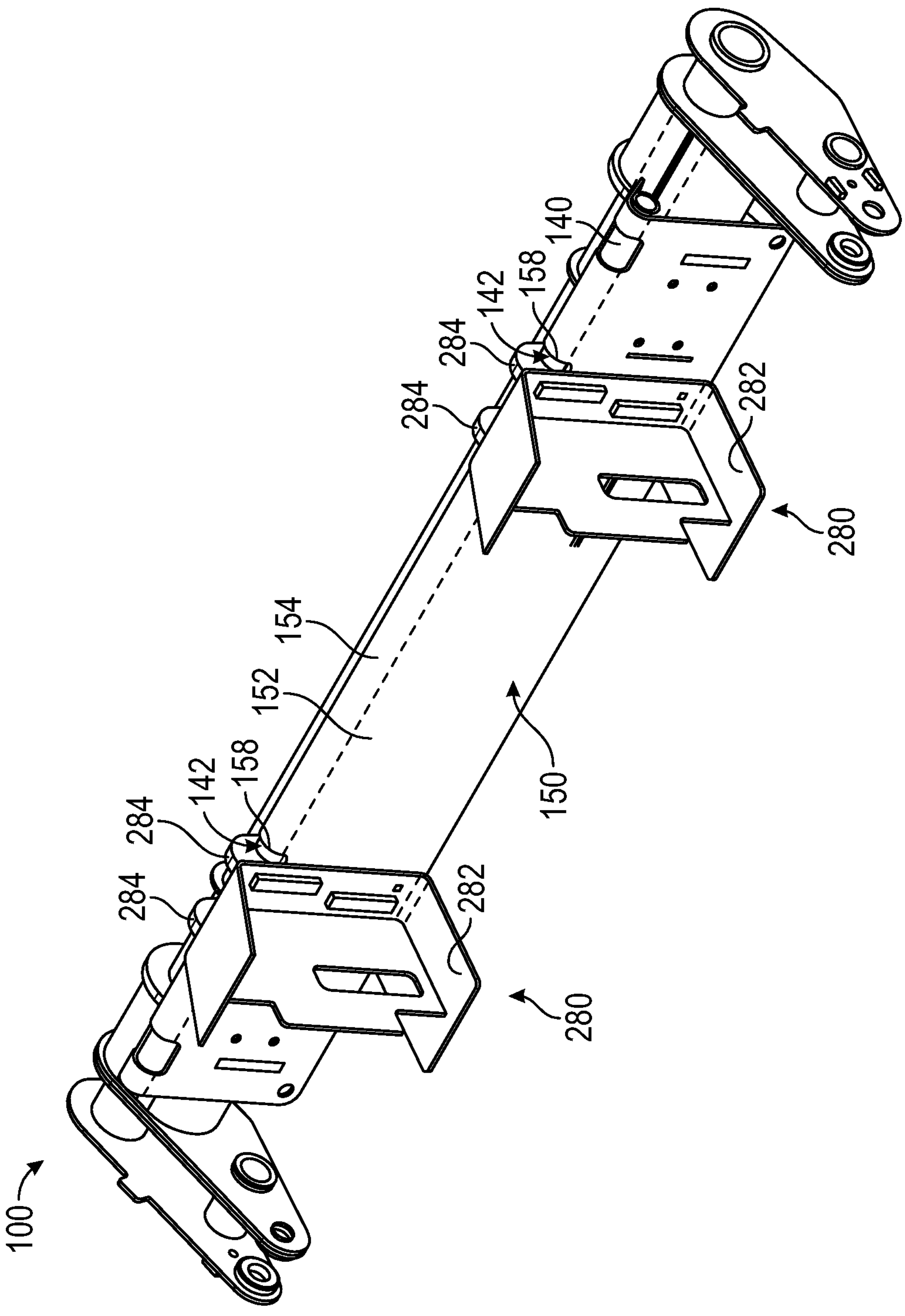
FIGS. 10-15 are various views of an interface of the first attachment of FIG. 8 coupled to the attachment assembly of FIG. 3, according to an exemplary embodiment.

As shown in FIGS. 8 and 9, the container attachment 200 includes a container, shown as refuse container 202; an articulating refuse collection arm, shown as collection arm assembly 270; and a first interface, shown as attachment interface 280. The refuse container 202 has a first wall, shown as front wall 210; an opposing second wall, shown as rear wall 220 (e.g., positioned between the cab 16 and the front wall 210, etc.); a first sidewall, shown as first sidewall 230; an opposing second sidewall, shown as second sidewall 240; and a bottom surface, shown as bottom 250. The front wall 210, the rear wall 220, the first sidewall 230, the second sidewall 240, and the bottom 250 cooperatively define an internal cavity, shown as container refuse compartment 260. According to an exemplary embodiment, the container refuse compartment 260 is configured to receive refuse from a refuse container (e.g., a residential garbage can, a recycling bin, etc.).

As shown in FIGS. 8 and 9, the second sidewall 240 of the refuse container 202 defines a cavity, shown as recess 242. As shown in FIG. 8, the collection arm assembly 270 is coupled to the refuse container 202 and may be positioned within the recess 242. In other embodiments, the collection arm assembly 270 is otherwise positioned (e.g., coupled to the rear wall 220, coupled to the first sidewall 230, coupled to the front wall 210, etc.). According to an exemplary embodiment, the collection arm assembly 270 includes an arm, shown as arm 272; a grabber assembly, shown as grabber 276, coupled to an end of the arm 272; and an actuator, shown as actuator 274. The actuator 274 may be positioned to selectively reorient the arm 272 such that the grabber 276 is extended laterally outward from and retracted laterally inward toward the refuse container 202 to engage (e.g., pick up, etc.) a refuse container (e.g., a garbage can, a reclining bin, etc.) for emptying refuse into the container refuse compartment 260.

As shown in FIG. 9, the container attachment 200 includes a frame member, shown as attachment frame 222, disposed along (e.g., attached to, coupled to, fastened to, welded to, etc.) the rear wall 220 of the refuse container 202. The attachment frame 222 includes a first frame member, shown as upper frame member 224, and a second frame member, shown as lower frame member 226, extending along the rear wall 220. As shown in FIG. 9, the attachment frame 222 is configured to facilitate coupling the attachment interface 280 to the rear wall 220 of the refuse container 202. In other embodiments, the container attachment 200 does not include the attachment frame 222. By way of example, the attachment interface 280 may be directly coupled (e.g., fastened, welded, etc.) to the rear wall 220 of the refuse container 202.

As shown in FIGS. 9-15, the attachment interface 280 includes a plurality of brackets, shown as attachment brackets 282. According to the exemplary embodiment shown in FIGS. 9-15, the attachment interface 280 includes a pair of attachment brackets 282, one positioned to align with (i) each set of the first apertures 156 and the second apertures 158 of the attachment plate 150 and (ii) each coupler 170. In other embodiments, the attachment interface 280 includes a different number of attachment brackets 282 to correspond with a different number of (i) sets of the first apertures 156 and the second apertures 158 and (ii) the couplers 170 (e.g., one, three, etc.). As shown in FIG. 9, the attachment brackets 282 are coupled (e.g., fastened, welded, etc.) to the rear wall 220 of the refuse container 202 (e.g., directly, indirectly by the attachment frame 222, etc.).

In one embodiment, the attachment interface 280 includes a connector. The connector may include a first pair of connectors and a second pair of connectors. As shown in FIGS. 9-12, 14, and 15, each of the attachment brackets 282 includes the first pair of connectors, shown as upper hooks 284, and the second pair of connectors, shown as lower hooks 286, extending therefrom. In other embodiments, the attachment brackets 282 include a different number of upper hooks 284 (e.g., one, three, etc.) and/or a different number of lower hooks 286 (e.g., one, three, etc.). In an alternative embodiment, the attachment interface 280 does not include the attachment brackets 282. By way of example, the upper hooks 284 and the lower hooks 286 may directly couple to and extend from the rear wall 220 of the refuse container 202. In other embodiments, the attachment interface 280 includes one upper hook 284 and/or one lower hook 286 on each of the attachment brackets 282.

Figure 11:
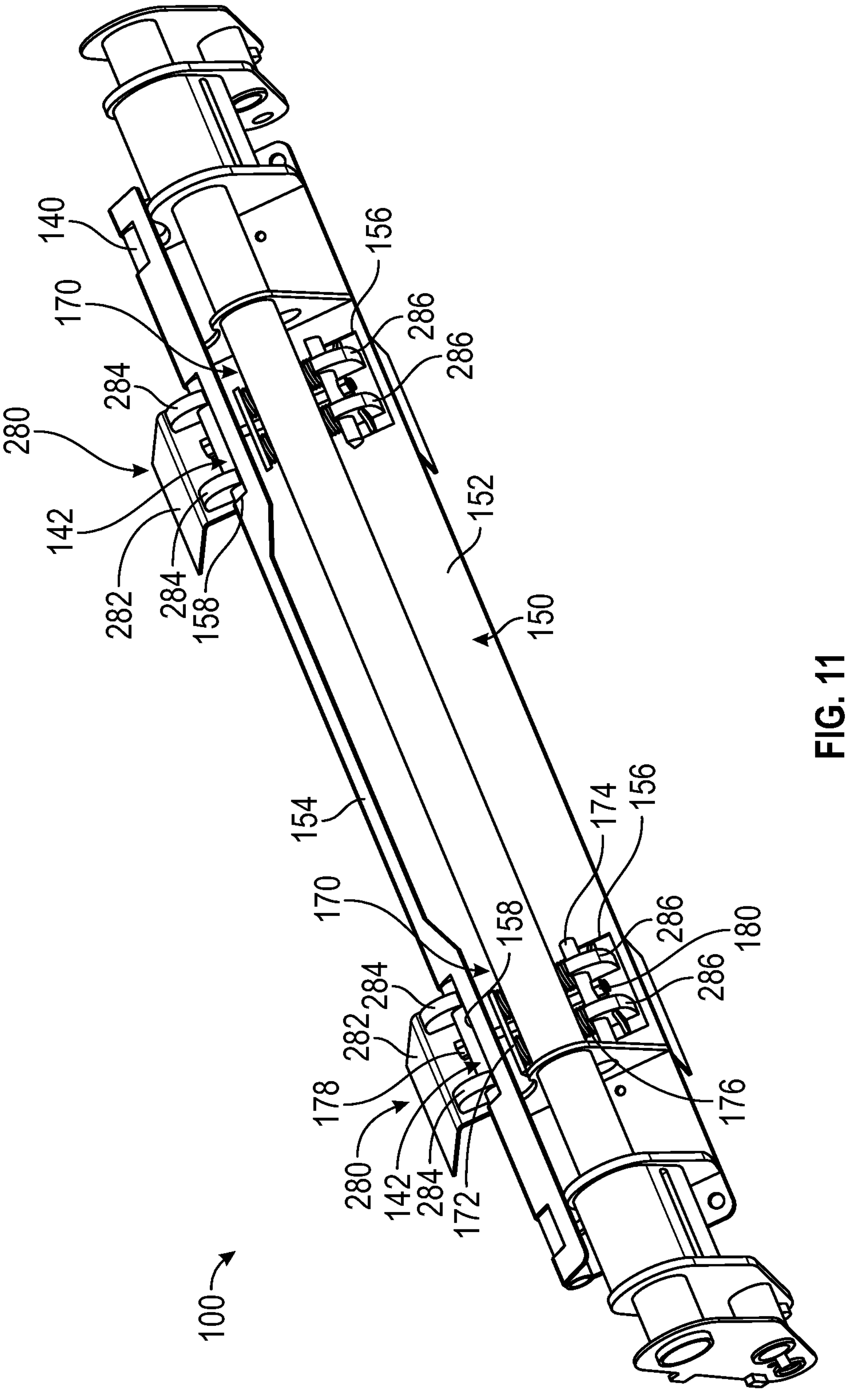
Figure 12:
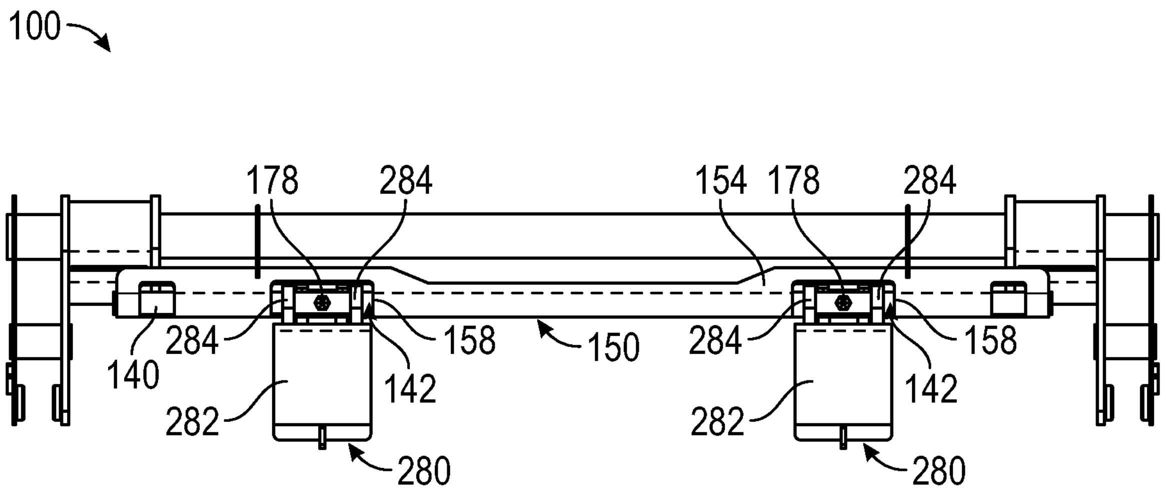
Figure 13:
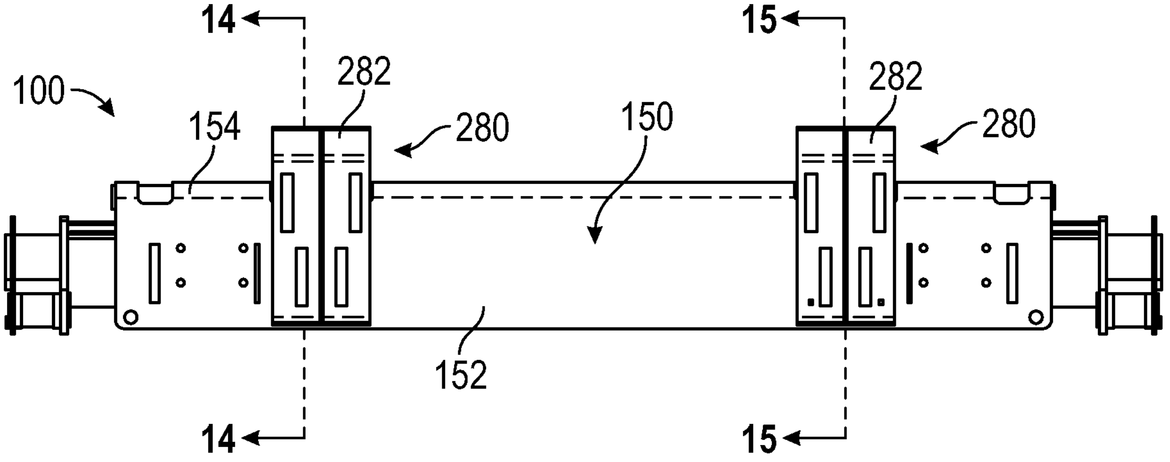
Figure 14:
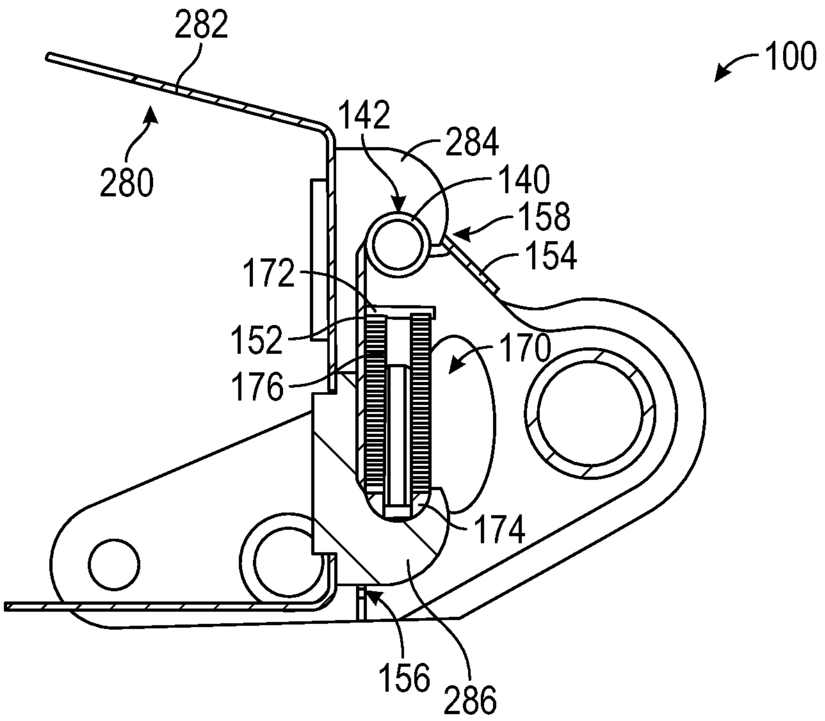
Figure 15:
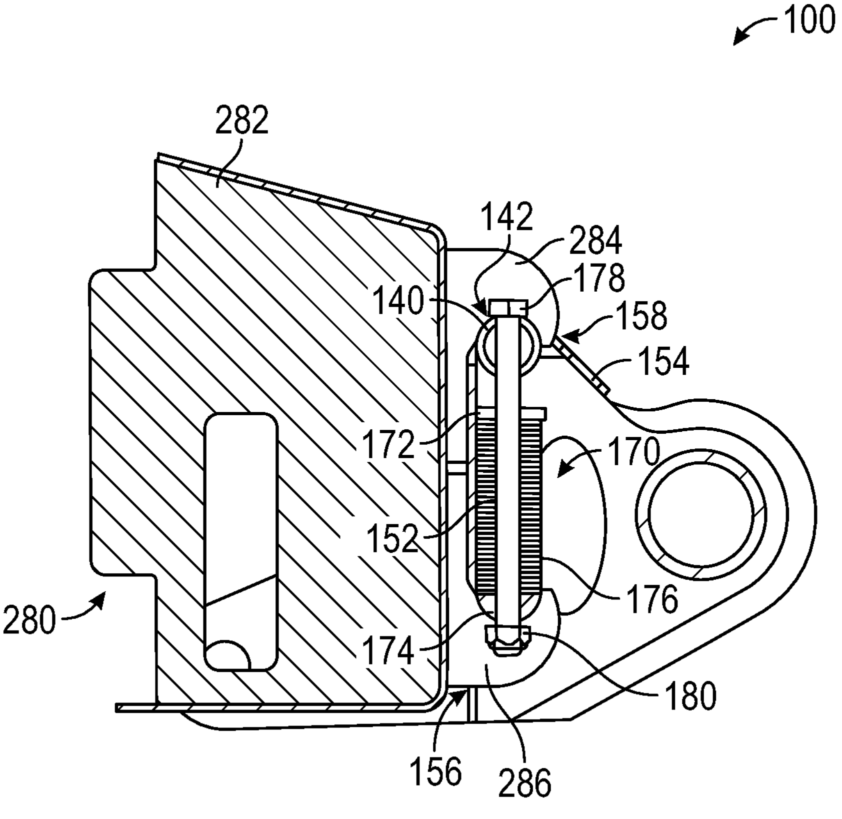

As shown in FIGS. 10-12, 14, and 15, the upper hooks 284 are configured to extend through and be received by the second apertures 158 such that the upper hooks 284 engage the first exposed portions 142 of the coupling tube 140. In other embodiments, the upper hooks 284 engage the flange 154 (e.g., the flange 154 may not define the second apertures 158, etc.). As shown in FIGS. 11, 14, and 15, the lower hooks 286 are configured to extend through and be received by the first apertures 156 such that the lower hooks 286 engage the underside of the lower supports 174. According to an exemplary embodiment, the lower supports 174 are configured to engage the lower hooks 286 when selectively reoriented into the first position (e.g., the extended position, the engagement position, etc.) and disengage from the lower hooks 286 when selectively reoriented into the second position (e.g., the compressed position, the disengagement position, etc.).

In operation, the container attachment 200 may be coupled to the attachment assembly 100 using the following method. First, the fasteners 178 of the couplers 170 may be adjusted (e.g., tightened, etc.) to draw the lower supports 174 upward into the second position (e.g., the compressed position, the disengagement position, etc.). Second, the container attachment 200 may be interfaced with the attachment assembly 100 such that the upper hooks 284 extend through the second apertures 158 of the attachment plate 150 and engage the first exposed portions 142 of the coupling tube 140. The lower hooks 286 may extend freely through the first apertures 156 of the attachment plate 150. Third, the fasteners 178 of the couplers 170 may be adjusted (e.g., loosened, etc.) to relax the springs 176 and dismiss the lower supports 174 to the first position (e.g., the extended position, the engagement position, etc.) such that the lower supports 174 engage the lower hooks 286. Such engagement between (i) the upper hooks 284 with the coupling tube 140 and (ii) the lower hooks 286 and the lower supports 174 may selectively secure the container attachment 200 to the attachment assembly 100. Such attachment may facilitate the refuse vehicle 10 in carrying the container attachment 200 (e.g., such that the lift assembly 40 may lift the container attachment 200 to empty refuse within the container refuse compartment 260 of the refuse container 202 into the refuse compartment 30 of the refuse vehicle 10, etc.).

As shown in FIGS. 16-20, the fork attachment 300 includes a plate, shown as fork plate 310; a pair of forks, shown as forks 320, extending from the fork plate 310; and an interface, shown as attachment interface 330. According to an exemplary embodiment, the forks 320 are coupled (e.g., attached, fastened, welded, etc.) to the fork plate 310. The forks 320 may have a generally rectangular cross-sectional shape and are configured to engage a refuse container (e.g., protrude through fork pockets of a commercial refuse container, a carry can, a container assembly with a robotic arm, etc.). During operation of the refuse vehicle 10, the forks 320 are positioned to engage the refuse container (e.g., the refuse vehicle 10 is driven into position such that the forks 320 protrude through fork pockets within the refuse container, etc.). As shown in FIGS. 17-20, each of the forks 320 includes a connector, shown as fork hook 322.

Figure 18:
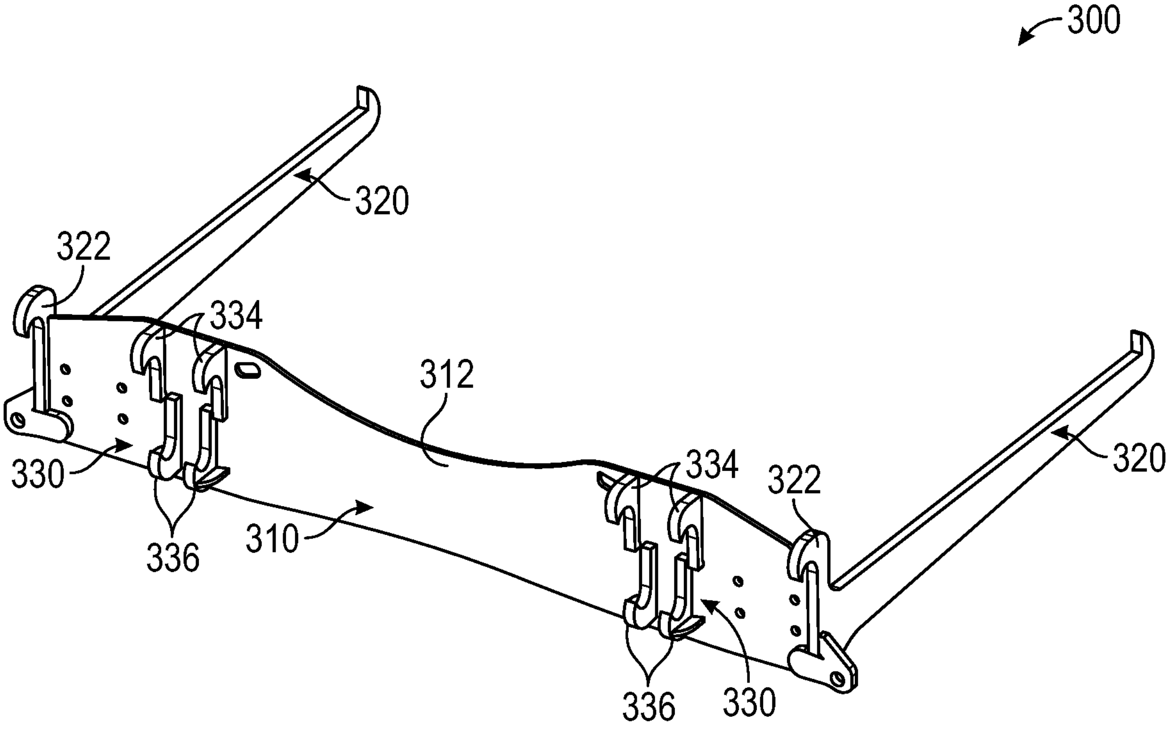
Figure 19:
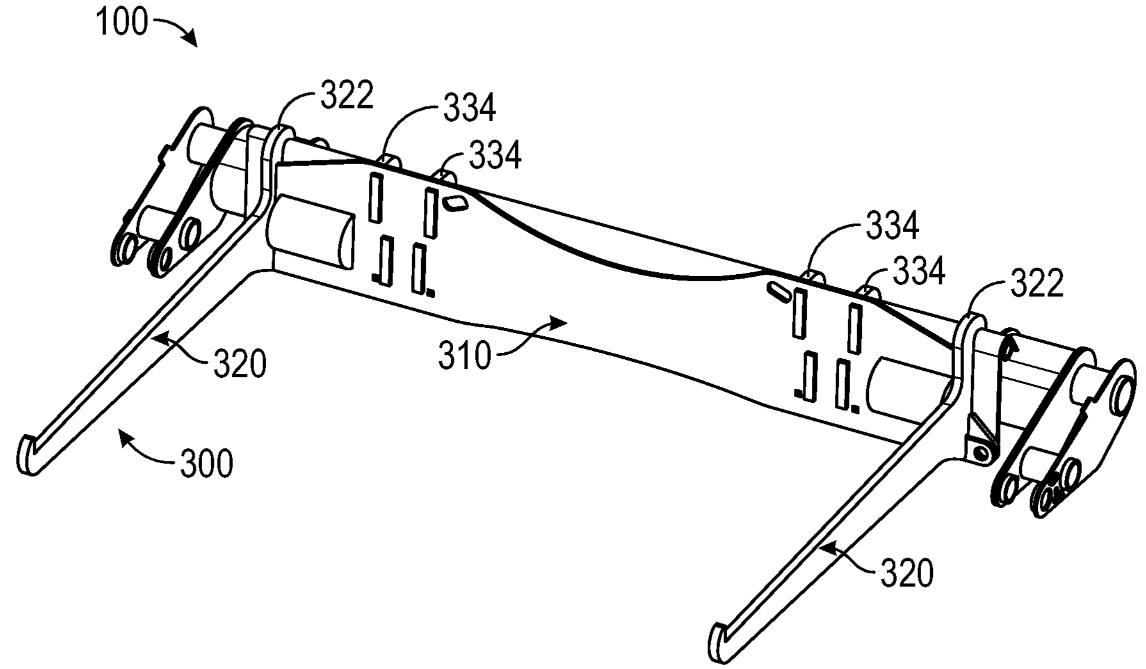
FIGS. 19 and 20 are various perspective views of an interface of the second attachment of FIG. 16 coupled to the attachment assembly of FIG. 3, according to an exemplary embodiment.

As shown in FIG. 18, the attachment interface 330 is directly coupled (e.g., fastened, welded, etc.) to a rear surface, shown as rear face 312, of the fork plate 310. In one embodiment, the attachment interface 330 includes a connector. The connector may include a first plurality of connectors and a second plurality of connectors. As shown in FIGS. 17-20, the fork plate 310 includes the first plurality of connectors, shown as upper hooks 334, and the second plurality of connectors, shown as lower hooks 336, extending therefrom. According to the exemplary embodiment shown in FIGS. 17-20, the attachment interface 330 includes two sets of upper hooks 334 and two sets of lower hooks 336, one set of each positioned to align with (i) each set of the first apertures 156 and the second apertures 158 of the attachment plate 150 and (ii) each coupler 170. In other embodiments, the attachment interface 330 includes a different number of sets of the upper hooks 334 and sets of lower hooks 336 to correspond with a different number of (i) sets of the first apertures 156 and the second apertures 158 and (ii) the couplers 170 (e.g., one, three, etc.). According to the exemplary embodiment shown in FIGS. 17-20, each set of upper hooks 334 and lower hooks 336 includes two hooks. In other embodiments, each set of upper hooks 334 and/or lower hooks 336 includes a different number of hooks (e.g., one, three, etc.). In an alternative embodiment, the attachment interface 330 includes attachment brackets (e.g., similar to the attachment brackets 282 of the attachment interface 280, etc.).

Figure 20:
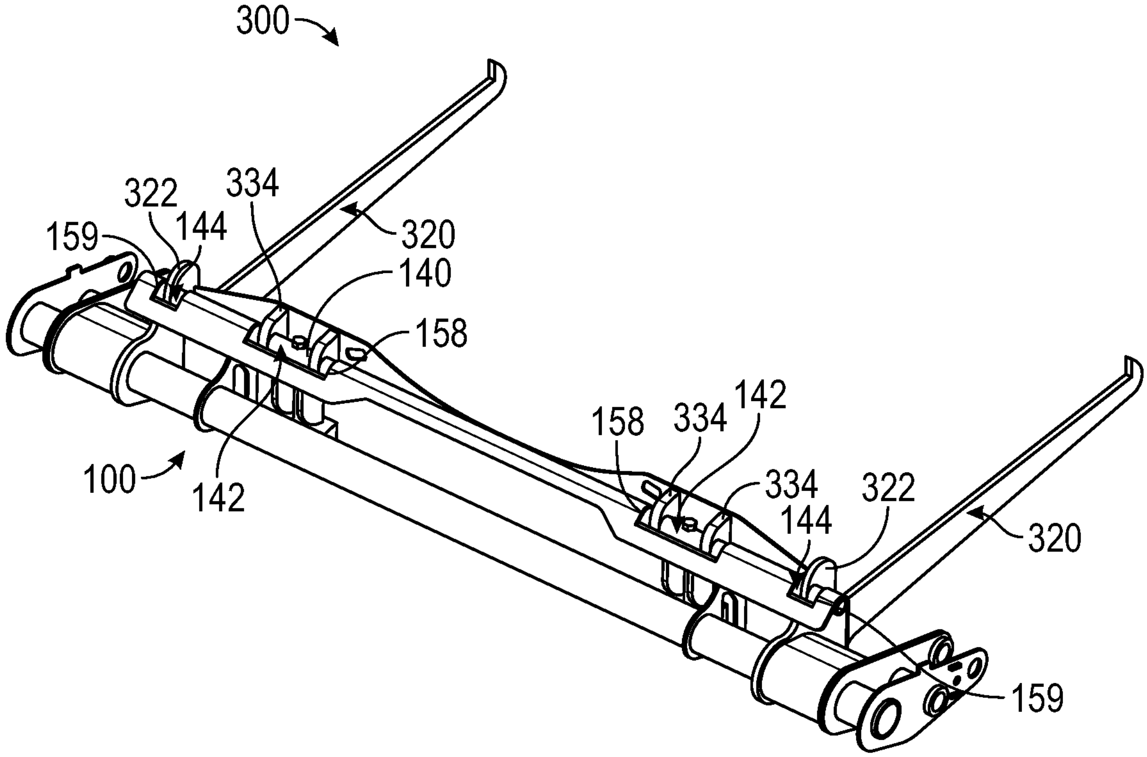

As shown in FIG. 20, the upper hooks 334 are configured to extend through and be received by the second apertures 158 such that the upper hooks 334 engage the first exposed portions 142 of the coupling tube 140. In other embodiments, the upper hooks 334 engage the flange 154 (e.g., the flange 154 may not define the second apertures 158, etc.). According to an exemplary embodiment, the lower hooks 336 are configured to extend through and be received by the first apertures 156 such that the lower hooks 336 engage the underside of the lower supports 174 (e.g., similar to the lower hooks 286 of the attachment interface 280, etc.). The lower supports 174 are configured to engage the lower hooks 336 when selectively reoriented into the first position (e.g., the extended position, the engagement position, etc.) and disengage from the lower hooks 336 when selectively reoriented into the second position (e.g., the compressed position, the disengagement position, etc.). As shown in FIG. 20, the fork hooks 322 are configured to extend through and be received by the third apertures 159 such that the fork hooks 322 engage the second exposed portions 144 of the coupling tube 140. In other embodiments, the fork hooks 322 engage the flange 154 (e.g., the flange 154 may not define the third apertures 159, etc.).

In operation, the fork attachment 300 may be coupled to the attachment assembly 100 using the following method. First, the fasteners 178 of the couplers 170 may be adjusted (e.g., tightened, etc.) to draw the lower supports 174 upward into the second position (e.g., the compressed position, the disengagement position, etc.). Second, the fork attachment 300 may be interfaced with the attachment assembly 100 such that (i) the upper hooks 334 extend through the second apertures 158 of the attachment plate 150 and engage the first exposed portions 142 of the coupling tube 140 and (ii) the fork hooks 322 extend through the third apertures 159 of the attachment plate 150 and engage the second exposed portions 144 of the coupling tube 140. The lower hooks 336 may extend freely through the first apertures 156 of the attachment plate 150. Third, the fasteners 178 of the couplers 170 may be adjusted (e.g., loosened, etc.) to relax the springs 176 and dismiss the lower supports 174 to the first position (e.g., the extended position, the engagement position, etc.) such that the lower supports 174 engage the lower hooks 336. Such engagement between (i) the upper hooks 334 and/or the fork hooks 322 with the coupling tube 140 and (ii) the lower hooks 336 and the lower supports 174 may selectively secure the fork attachment 300 to the attachment assembly 100. Such attachment may facilitate the refuse vehicle 10 carrying the fork attachment 300 (e.g., such that the lift assembly 40 may interface with and lift a refuse container; the forks 320 protrude through fork pockets of a commercial refuse container, a carry can, a container assembly with a robotic arm; to empty refuse within a refuse container into the refuse compartment 30 of the refuse vehicle 10; etc.).

Figure 21:
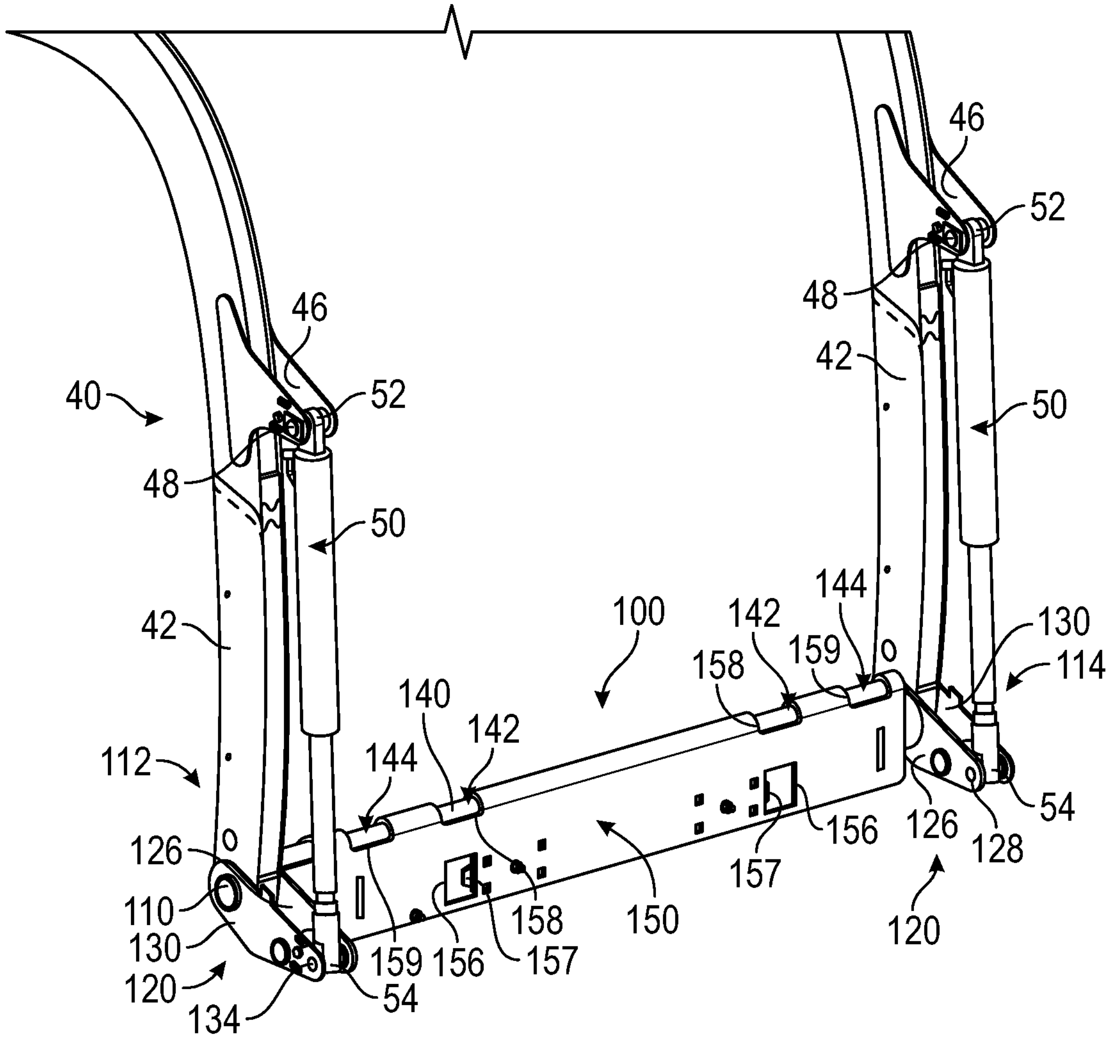
FIG. 21 is a front perspective view of an attachment assembly of a refuse vehicle, according to another exemplary embodiment.

According to the exemplary embodiment shown in FIG. 21, the attachment assembly 100 includes an alternative coupler. As shown in FIG. 21, the attachment assembly 100 includes a locking mechanism, shown as movable retainers 157 (e.g., a movable tab, a movable bar, a movable pin, etc.), coupled to the interior surface of the plate 152 of the attachment plate 150. The movable retainers 157 are positioned to selectively extend across the first apertures 156 of the plate 152 of the attachment plate 150 between a first position (e.g., a retracted position, an unlocked position, etc.) and a second position (e.g., an extended position, a locked position, etc.). According to an exemplary embodiment, the movable retainers 157 are configured to selectively engage with pockets of the container attachment 200, the fork attachment 300, etc. to couple (e.g., attach, secure, etc.) the respective attachment to the refuse vehicle 10.

Figure 22:
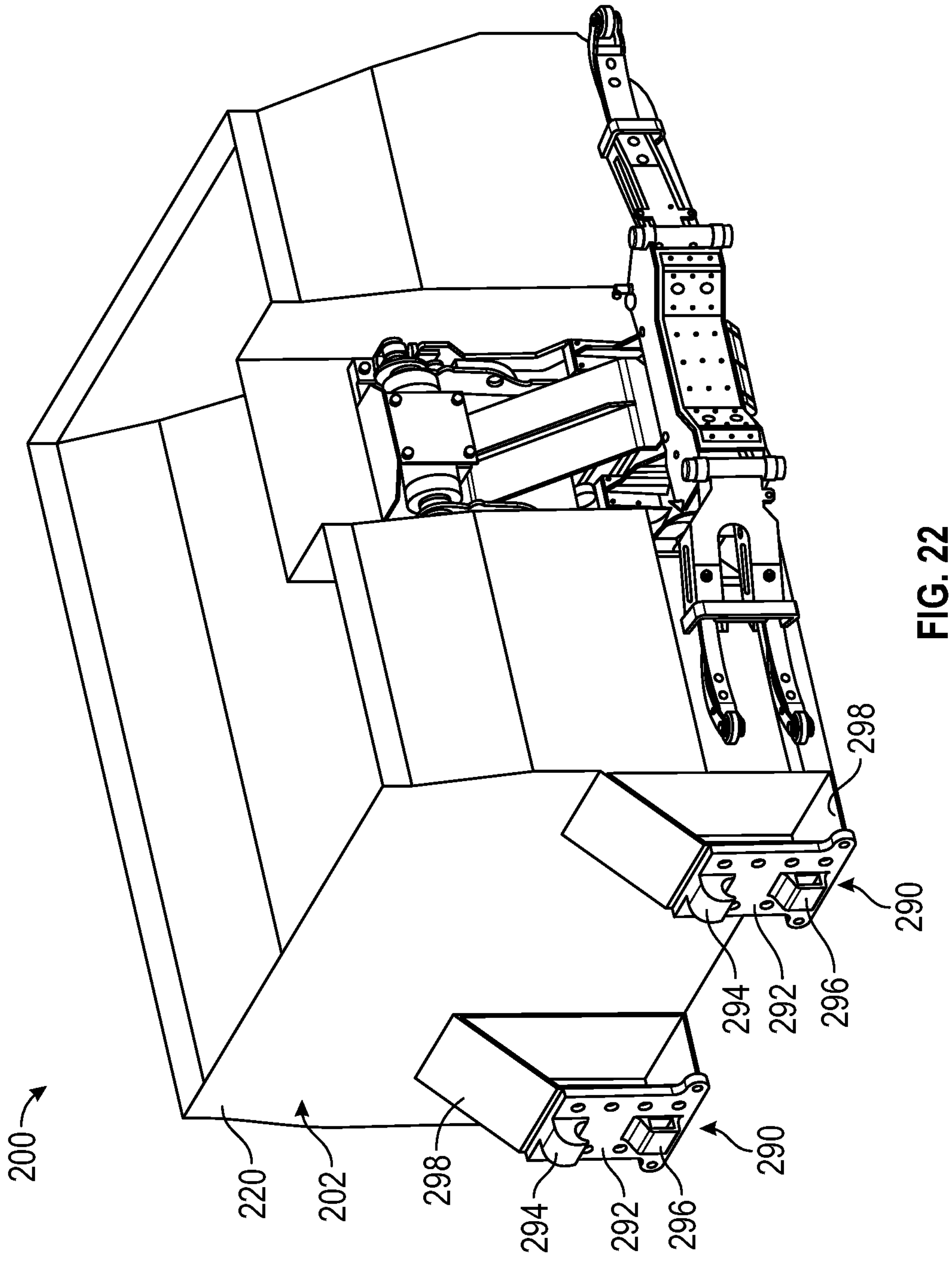
FIG. 22 is a rear perspective view of the first attachment of FIG. 8, according to another exemplary embodiment.

According to the exemplary embodiment shown in FIG. 22, the container attachment 200 includes an alternative or second interface, shown as attachment interface 290. As shown in FIG. 22, the attachment interface 290 includes a plurality of brackets, shown as attachment brackets 298. According to the exemplary embodiment shown in FIG. 22, the attachment interface 290 includes a pair of attachment brackets 298, one positioned to align with each set of the first apertures 156 and the second apertures 158 of the attachment plate 150 and (ii) each movable retainer 157. In other embodiments, the attachment interface 290 includes a different number of attachment brackets 298 to correspond with a different number of (i) sets of the first apertures 156 and the second apertures 158 and (ii) the movable retainers 157 (e.g., one, three, etc.). As shown in FIG. 22, the attachment brackets 298 are coupled (e.g., fastened, welded, etc.) to the rear wall 220 of the refuse container 202.

As shown in FIG. 22, the attachment interface 290 includes a pair of plates, shown as plates 292. One of the plates 292 is coupled (e.g., attached, fastened, welded, etc.) to each of the attachment brackets 298. In other embodiments, the attachment interface 290 includes a different number of plates 292 (e.g., one, three, etc.) to correspond with the number of attachment brackets 298. In an alternative embodiment, the attachment interface 290 does not include the attachment brackets 298. By way of example, the plates 292 may be directly coupled to the rear wall 220 of the refuse container 202. As shown in FIG. 22, each of the plates 292 includes a first connector, shown as upper hook 294, and a second connector, shown as lower pocket 296, extending therefrom. In other embodiments, the plates 292 include a different number of upper hooks 294 (e.g., two, three, etc.). According to an exemplary embodiment, the upper hooks 294 are configured to extend through and be received by the second apertures 158 such that the upper hooks 294 engage the first exposed portions 142 of the coupling tube 140. According to an exemplary embodiment, the lower pockets 296 are configured to extend through and be received by the first apertures 156. The lower pockets 296 are configured to receive the movable retainers 157 to secure the container attachment 200 to the attachment assembly 100, according to an exemplary embodiment.

Figure 23:
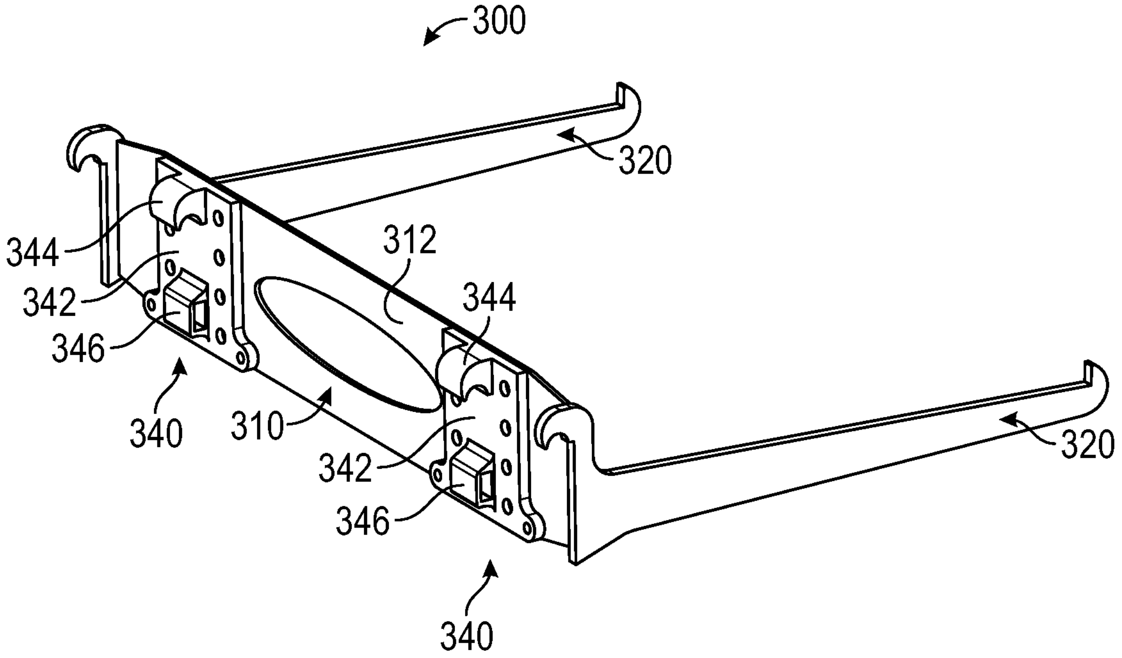
FIG. 23 is a rear perspective view of the second attachment of FIG. 16, according to another exemplary embodiment.

According to the exemplary embodiment shown in FIG. 23, the fork attachment 300 includes an alternative interface, shown as attachment interface 340. As shown in FIG. 23, the attachment interface 340 includes a plurality of plates, shown as plates 342. According to the exemplary embodiment shown in FIG. 23, the attachment interface 340 includes a pair of plates 342, one positioned to align with (i) each set of the first apertures 156 and the second apertures 158 of the attachment plate 150 and (ii) each movable retainer 157. In other embodiments, the attachment interface 340 includes a different number of plates 342 to correspond with a different number of (i) sets of the first apertures 156 and the second apertures 158 and (ii) the movable retainers 157 (e.g., one, three, etc.). As shown in FIG. 23, the plates 342 are coupled (e.g., fastened, welded, etc.) to the rear face 312 of the fork plate 310.

As shown in FIG. 23, each of the plates 342 includes a first connector, shown as upper hook 344, and a second connector, shown as lower pocket 346, extending therefrom. In other embodiments, the plates 342 include a different number of upper hooks 294 (e.g., two, three, etc.). According to an exemplary embodiment, the upper hooks 344 are configured to extend through and be received by the second apertures 158 such that the upper hooks 344 engage the first exposed portions 142 of the coupling tube 140. According to an exemplary embodiment, the lower pockets 346 are configured to extend through and be received by the first apertures 156. The lower pockets 346 are configured to receive the movable retainers 157 to secure the fork attachment 300 to the attachment assembly 100, according to an exemplary embodiment. By way of example, the movable retainers 157 of the attachment assembly 100 may replace the coupler 170 (e.g., when the container attachment 200 includes the attachment interface 290, when the fork attachment 300 includes the attachment interface 340, etc.).

Figure 24:
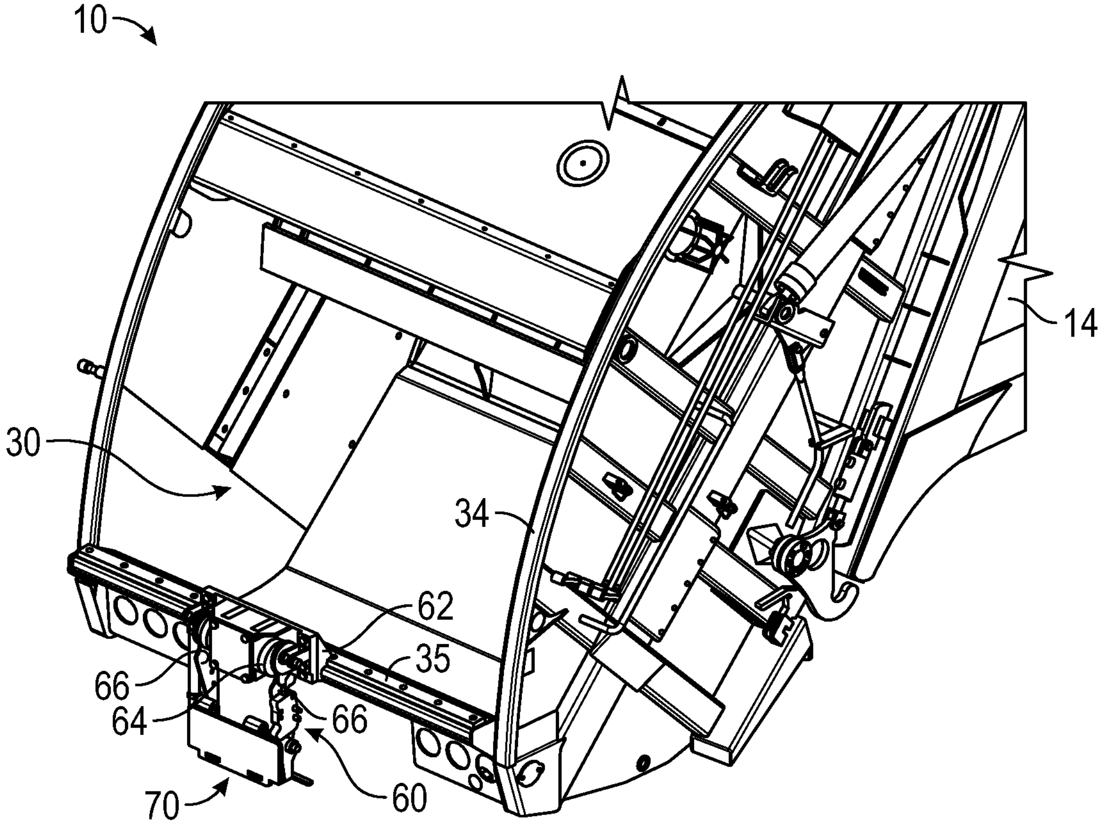
FIG. 24 is a rear perspective view of an attachment assembly of a refuse vehicle, according to still another exemplary embodiment.
Figure 25:
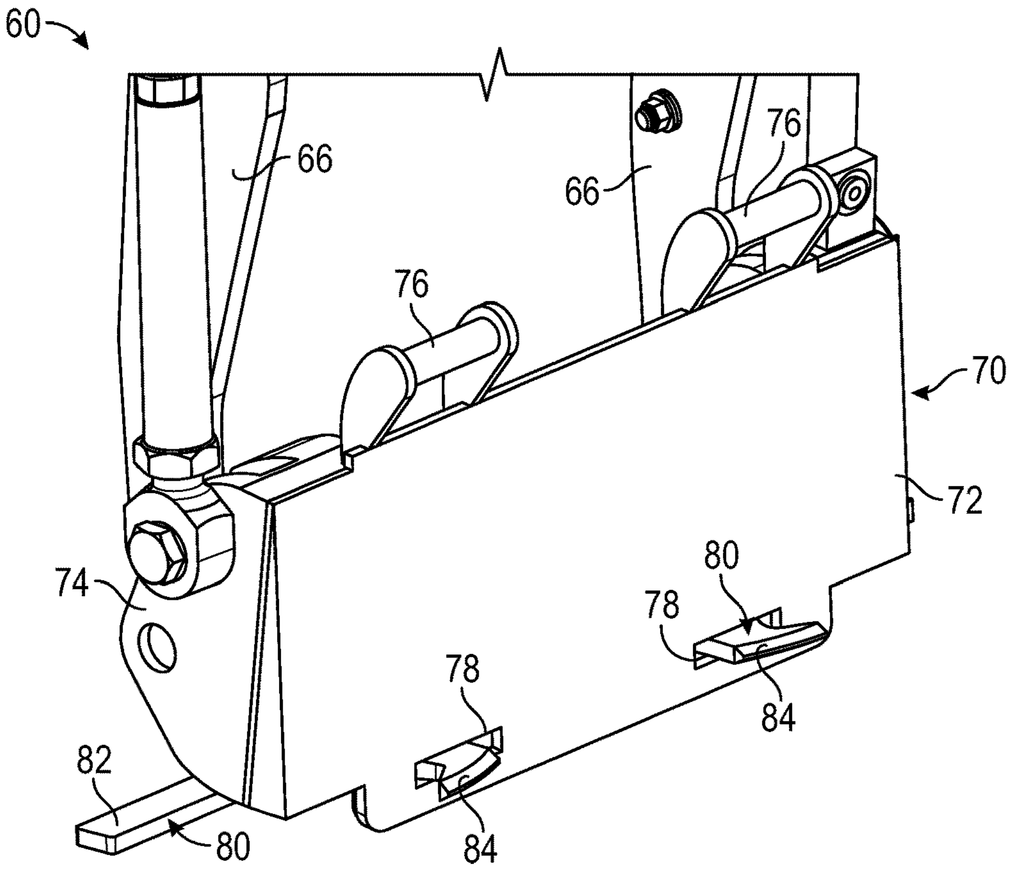
FIG. 25 is a front perspective view of the attachment assembly of FIG. 24, according to an exemplary embodiment.
Figure 26:
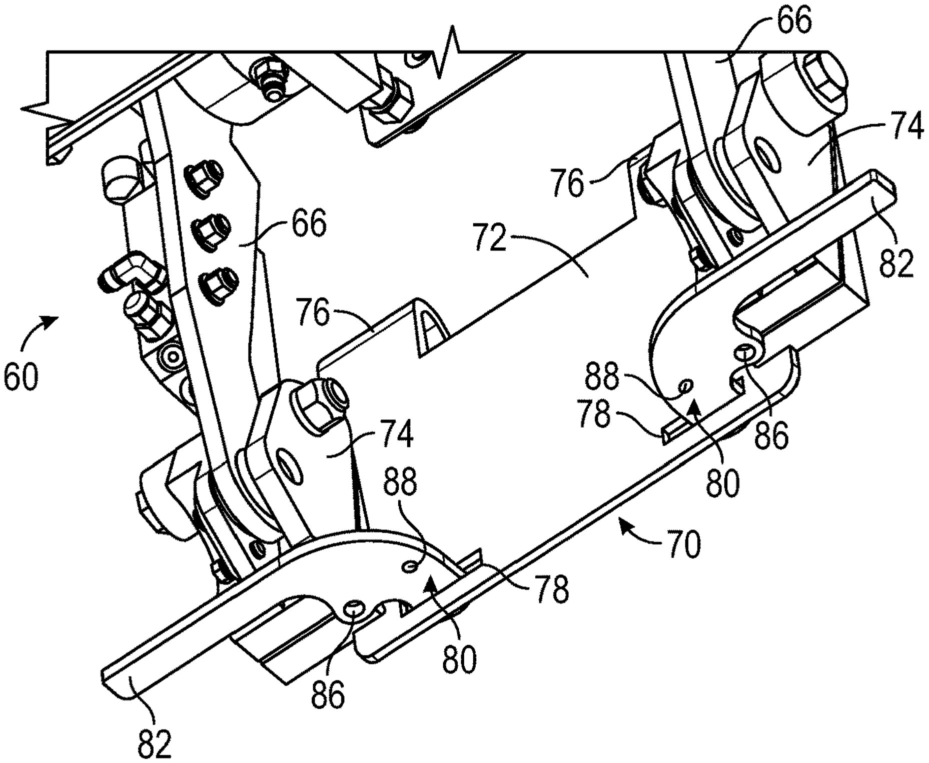
FIG. 26 is a rear perspective view of the attachment assembly of FIG. 24, according to an exemplary embodiment.
Figure 27:
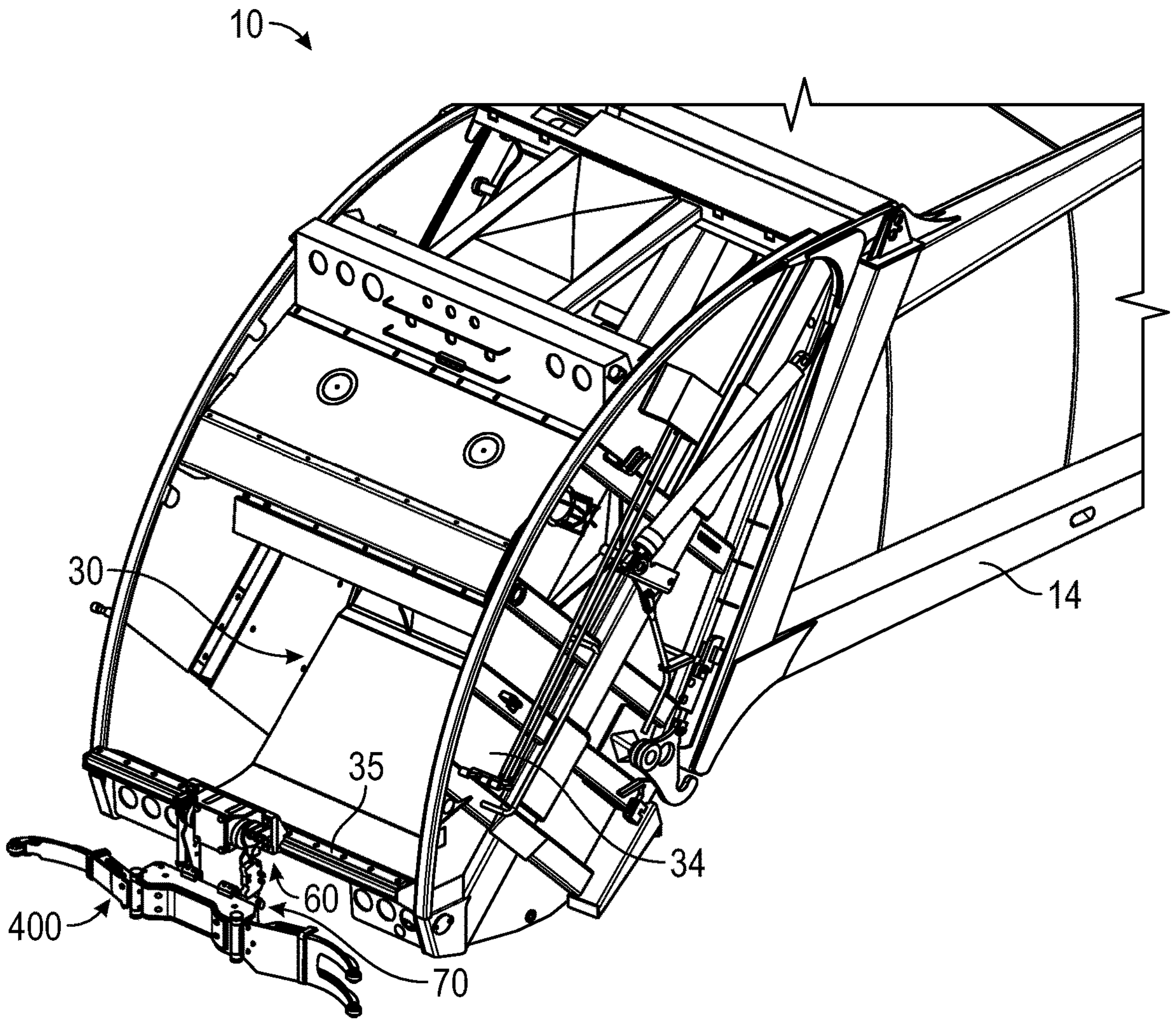
FIG. 27 is a perspective view of a third attachment coupled to the attachment assembly of FIG. 24, according to an exemplary embodiment.
Figure 28:
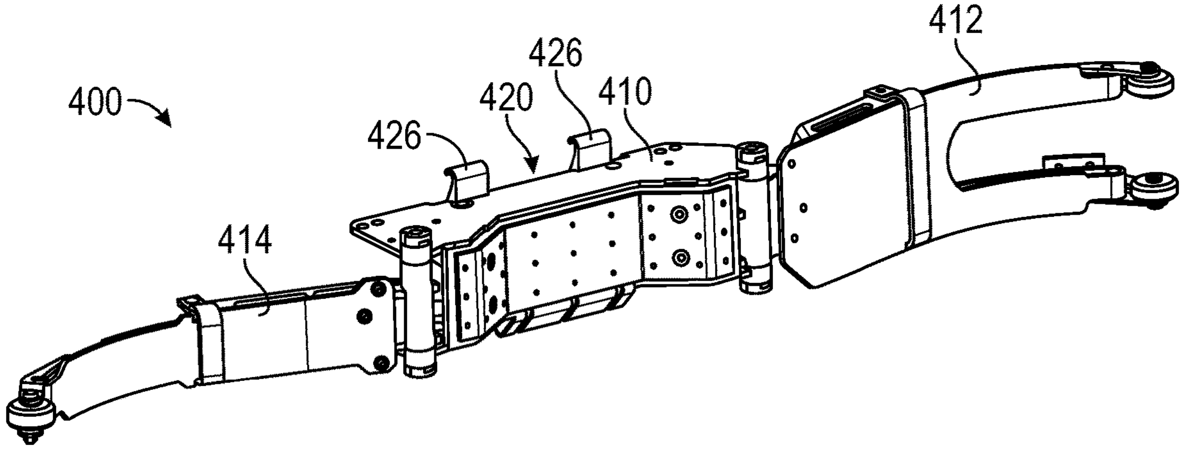
FIG. 28 is a front perspective view of the third attachment of FIG. 27, according to an exemplary embodiment.
Figure 29:
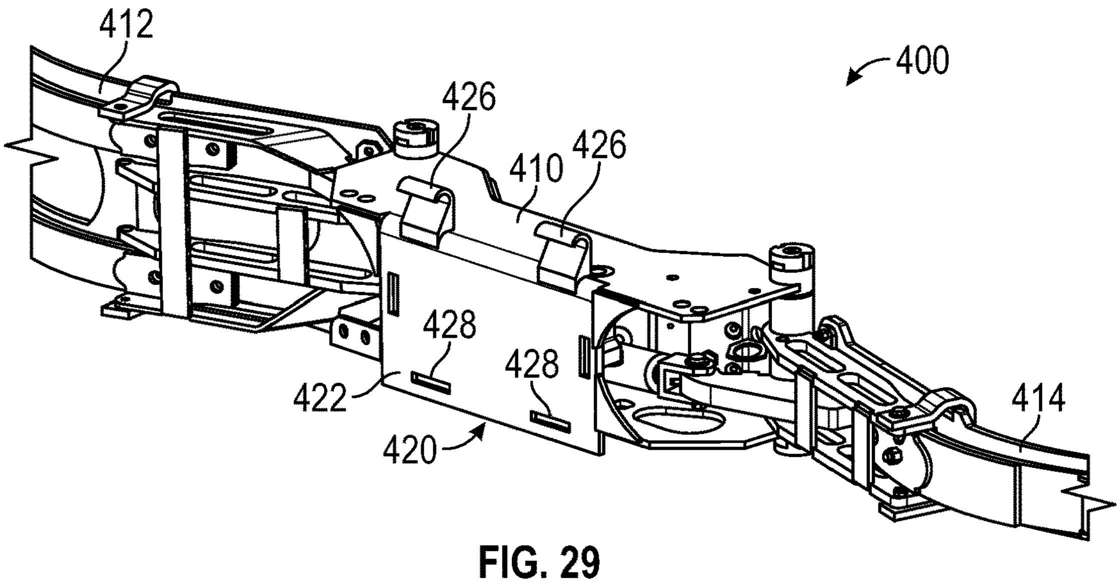
FIG. 29 is a rear perspective view of the third attachment of FIG. 27, according to an exemplary embodiment.
Figure 30:
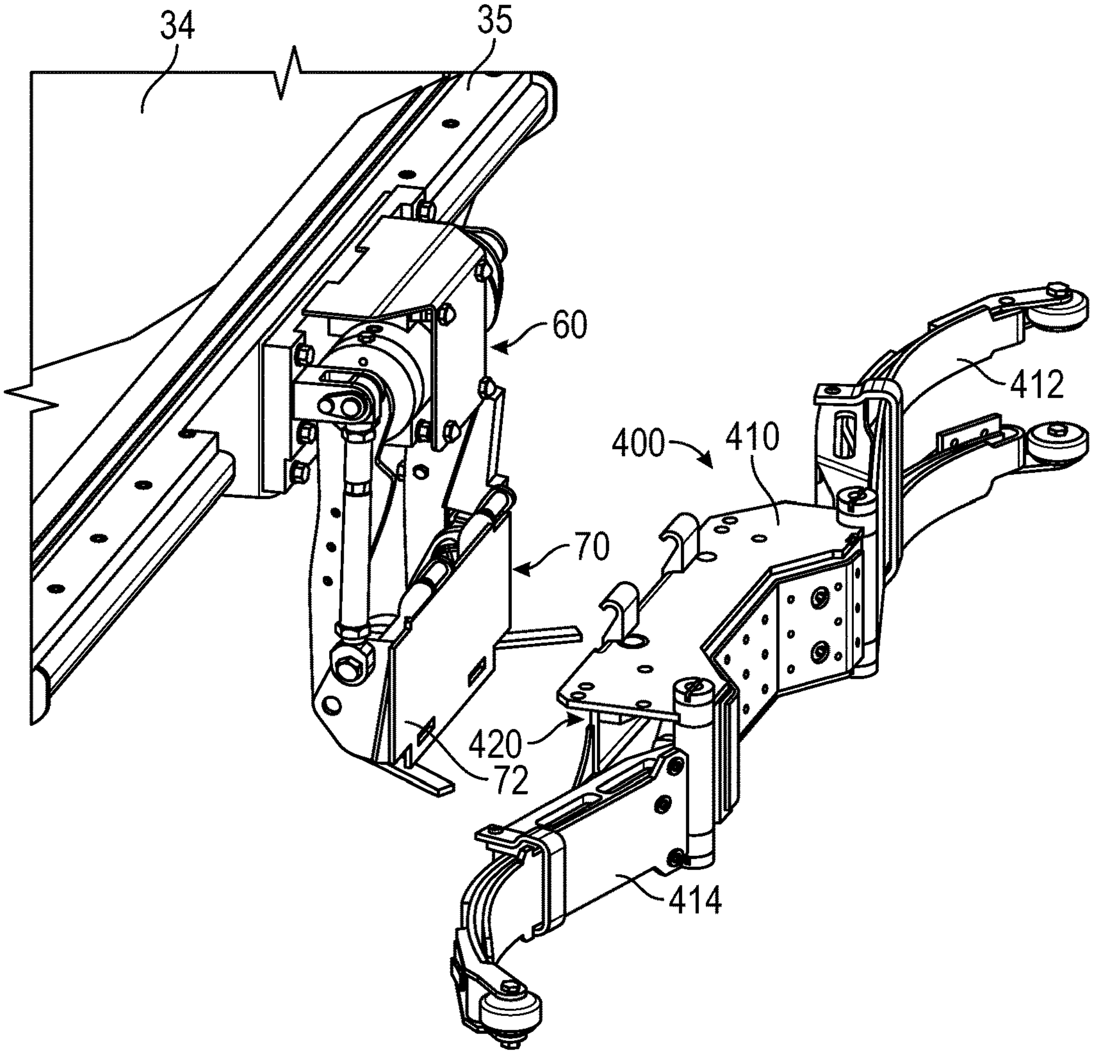
FIGS. 30-33 are various views visually detailing a method for coupling the third attachment to the attachment assembly of FIG. 24, according to an exemplary embodiment.

According to the exemplary embodiment shown in FIGS. 24-38, the refuse vehicle 10 is configured as a rear-loading refuse truck having a second attachment assembly, shown as attachment assembly 70. As shown in FIGS. 24-26, the refuse vehicle 10 includes a second lift mechanism/system (e.g., a rear-loading lift assembly, etc.), shown as lift assembly 60. The lift assembly 60 includes a base, shown as base 62; an driver, shown as lift actuator 64, and a pair of arms, shown as lift arms 66. As shown in FIG. 24, the base 62 is coupled to (e.g., fixed, fastened, secured, etc.) to a ledge, shown as rear bumper 35, of the tailgate 34. The lift arms 66 extend from the base 62. According to an exemplary embodiment, the lift actuator 64 is positioned to facilitate selectively pivoting the lift arms 66 about the base 62 such that the lift arms 66 may pivot towards and away from an opening of the refuse compartment 30 within the tailgate 34 (e.g., such that refuse may be dumped into the refuse compartment 30 from a refuse container through the tailgate 34 using the lift assembly 60, etc.).

As shown in FIGS. 24-27, 30-34, 37, and 38, the attachment assembly 70 is configured to couple to the lift assembly 60. In some embodiments, the attachment assembly 70 is additionally or alternatively configured to couple to the lift assembly 40. In some embodiments, the attachment assembly 100 is additionally or alternatively configured to couple to the lift assembly 60. As shown in FIGS. 25, 26, 30-33, 37, and 38, the attachment assembly 70 includes a plate, shown as attachment plate 72. As shown in FIGS. 25, 26, 31, 33, and 37, the attachment assembly 70 includes a pair of brackets, shown as coupling brackets 74, coupled at opposing sides of a rear surface of the attachment plate 72. Each of the coupling brackets 74 is configured to receive an end of a respective lift arm 66 to couple (e.g., pivotally couple, etc.) the attachment assembly 70 to the lift assembly 60. As shown in FIGS. 25, 26, 31, 33, and 37, the attachment plate 72 (*i*) has a first pair of interfaces, shown as arms 76, extending from a top end thereof and (ii) defines a second pair of interfaces, shown as first apertures 78, positioned proximate the bottom end thereof. In other embodiments, the attachment plate 72 includes a different number of arms 76 and/or first apertures 78 (e.g., one, three, four, etc.).

Figure 31:
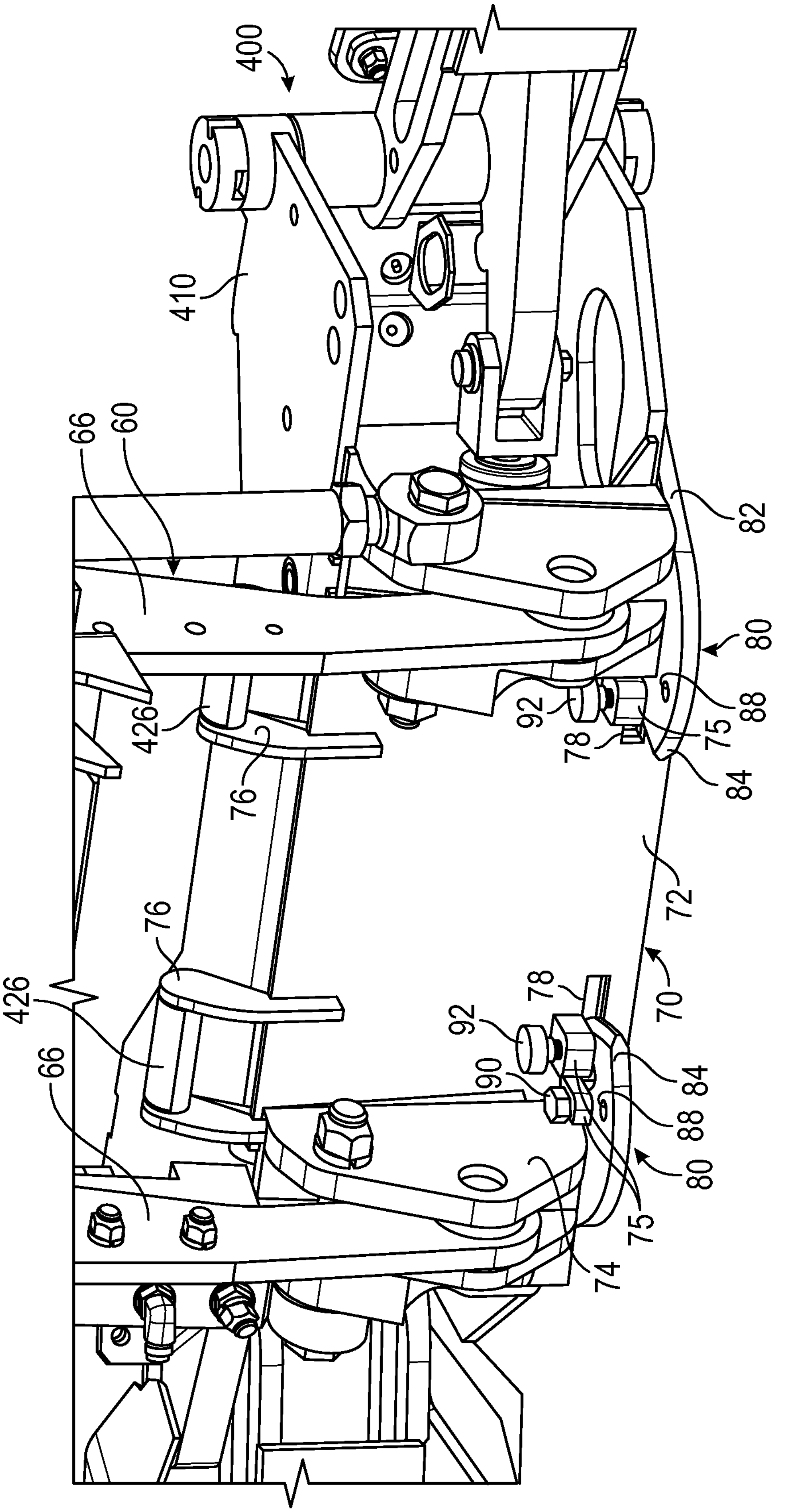

As shown in FIGS. 25, 26, 31-33, 37, and 38, the attachment assembly 70 includes a pair of locking mechanisms or latches, shown as locking levers 80, having a first portion (e.g., a handle portion, etc.), shown as handle 82, and a second portion (e.g., a latch portion, etc.), shown as retainer 84. As shown in FIGS. 26, 31, 32, and 38, the locking levers 80 define a first aperture, shown as pivot aperture 86, and a second aperture, shown as locking aperture 88. As shown in FIGS. 31-33, 37, and 38, the attachment assembly 70 includes a first pair of pins, shown as pivot pins 90. Each of the pivot pins 90 is positioned to extend through (i) a first aperture of a support, shown as mount 75, extending from each of the coupling brackets 74 and/or the attachment plate 72 and (ii) the pivot aperture 86 of a respective locking levers 80 to pivotally couple each of the locking levers 80 to a respective mount 75 of the attachment assembly 70. The handle 82 of the locking levers 80 facilitates manually pivoting the locking levers 80 about the pivot pins 90 between a first orientation or position (e.g., an unlocked orientation, a disengaged orientation, as shown in FIG. 31, etc.) and a second orientation or position (e.g., a locked orientation, an engaged orientation, as shown in FIGS. 25, 26, 32, 33, 37, and 38, etc.). As shown in FIG. 31, the retainers 84 of the locking levers 80 are configured to retract from the first apertures 78 of the attachment plate 72 when the locking levers 80 are arranged in the first orientation. As shown in FIGS. 25, 26, 32, 33, 37, and 38, the retainers 84 of the locking levers 80 are configured to extend through the first apertures 78 of the attachment plate 72 when the locking levers 80 are arranged in the second orientation.

As shown in FIGS. 31-33, 37, and 38, the attachment assembly 70 includes a second pair of pins, shown as locking pins 92. Each of the locking pins 92 is positioned to selectively extend through (i) a second aperture of a respective mount 75 and (ii) the locking aperture 88 of a respective locking levers 80 to pivotally secure the locking levers 80 in the second orientation. According to an exemplary embodiment, the locking pins 92 are spring loaded pins the snap into place (e.g., extend through the locking apertures 88, etc.) in response to the locking levers 80 being positioned into the second orientation. The locking pins 92 may thereafter be pulled on or lifted to release the locking levers 80 from the second orientation.

Figure 37:
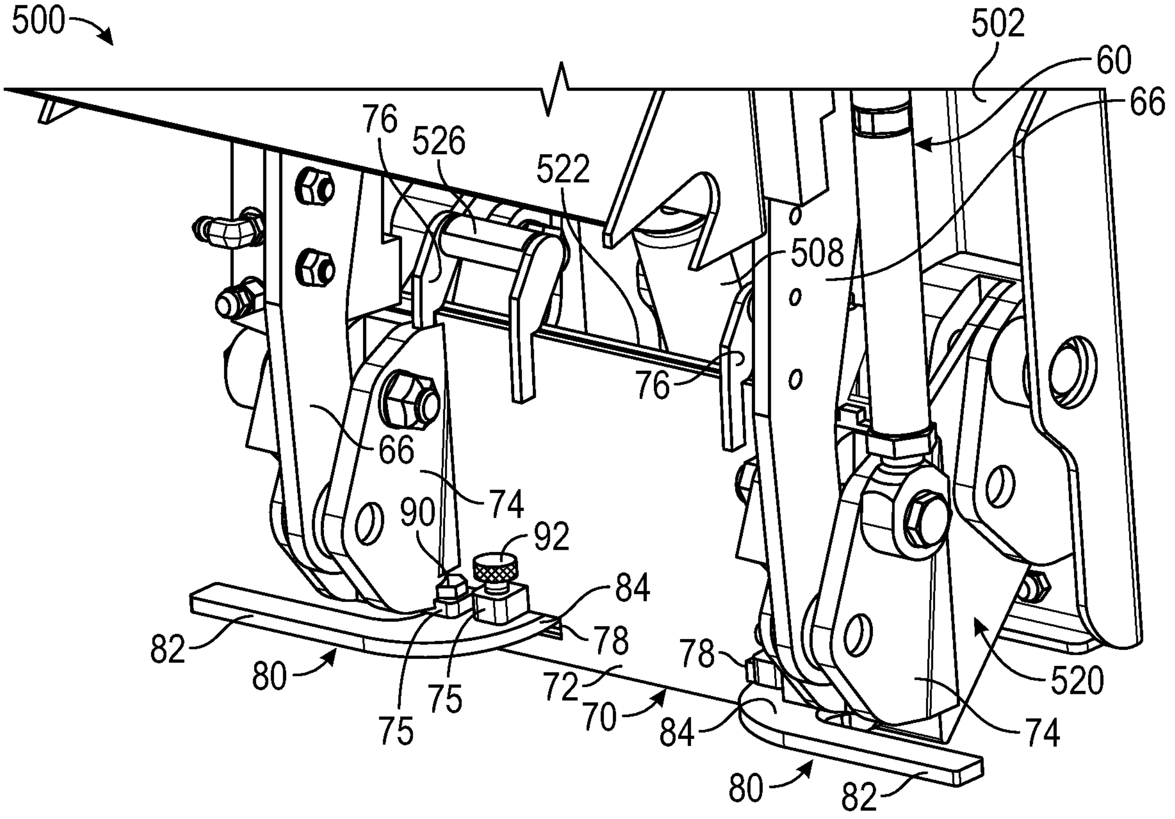
FIGS. 37 and 38 are various views of the fourth attachment coupled the attachment assembly of FIG. 24, according to an exemplary embodiment.
Figure 38:
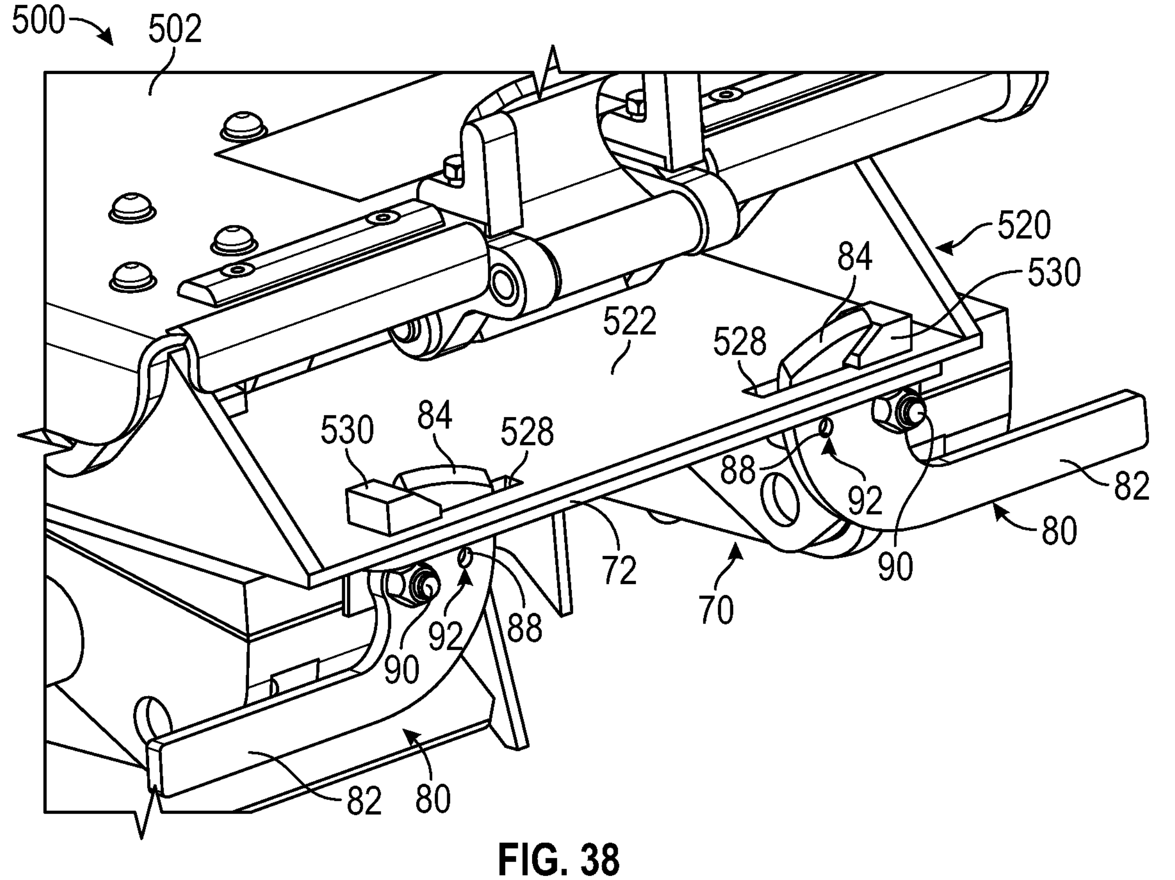

As shown in FIGS. 27 and 30-33, the attachment assembly 70 is configured to engage with a third attachment, shown as grabber attachment 400, to selectively and releasably secure the grabber attachment 400 to the lift assembly 60. As shown in FIGS. 34, 37, and 38, the attachment assembly 70 is configured to engage with a fourth attachment, shown as cart tipper attachment 500, to selectively and releasably secure the cart tipper attachment 500 to the lift assembly 60. In other embodiments, the attachment assembly 70 is configured to engage with another type of attachment (e.g., a salt dispenser attachment, a towing attachment, a wood chipper attachment, a bucket attachment, the container attachment 200, the fork attachment 300, etc.).

As shown in FIGS. 28-33, the grabber attachment 400 includes a main portion, shown as base 410, having a first extension, shown as first arm 412, and a second extension, shown as second arm 414, pivotally coupled thereto. According to an exemplary embodiment, the first arm 412 and the second arm 414 are selectively pivotable (e.g., with actuators, etc.) to facilitate grabbing an object (e.g., a refuse container, a trash can, a recycling bin, etc.). As shown in FIGS. 28-32, the grabber attachment 400 includes an interface, shown as attachment interface 420 including a plate, shown as backplate 422, coupled to (e.g., fastened, fixed, secured, welded, integral with, etc.) the rear of the base 410. The backplate 422 has a first pair of interfaces, shown as hooks 426, extending from a top end thereof and (ii) defines a second pair of interfaces, shown as second apertures 428, positioned proximate the bottom end thereof. In other embodiments, the backplate 422 includes a different number of hooks 426 and/or second apertures 428 (e.g., one, three, four, etc.).

Figure 32:
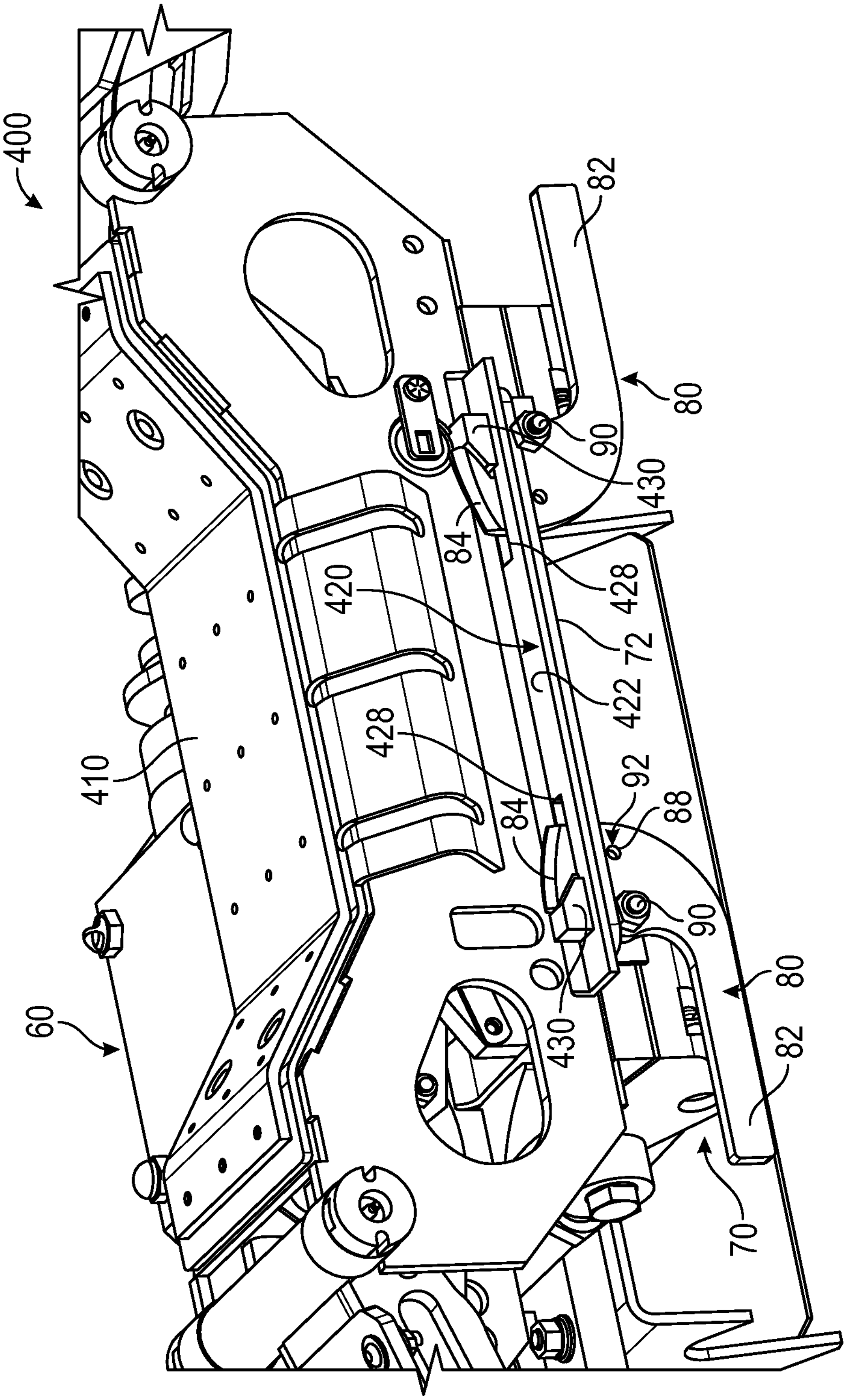
Figure 33:
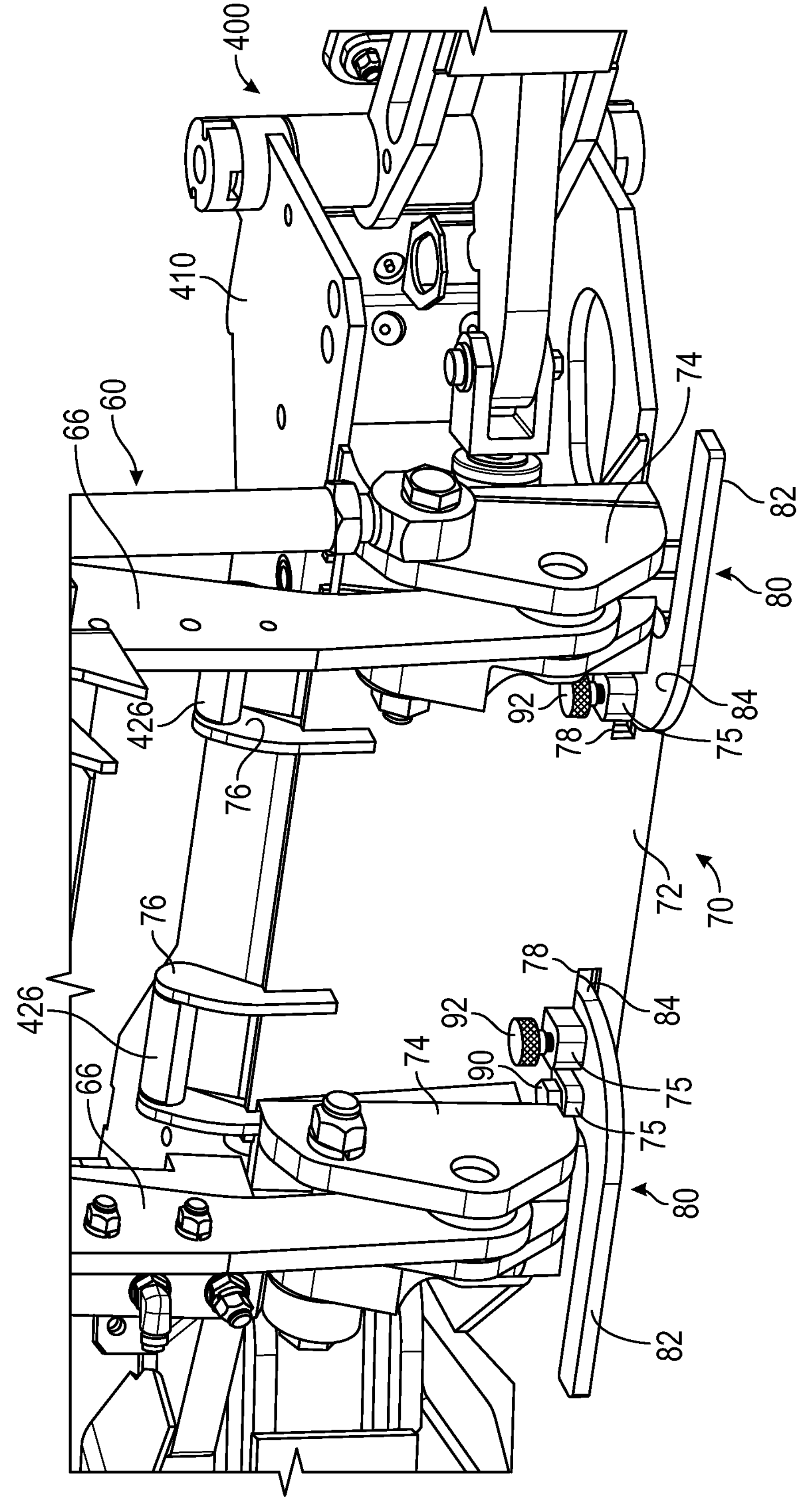
Figure 34:
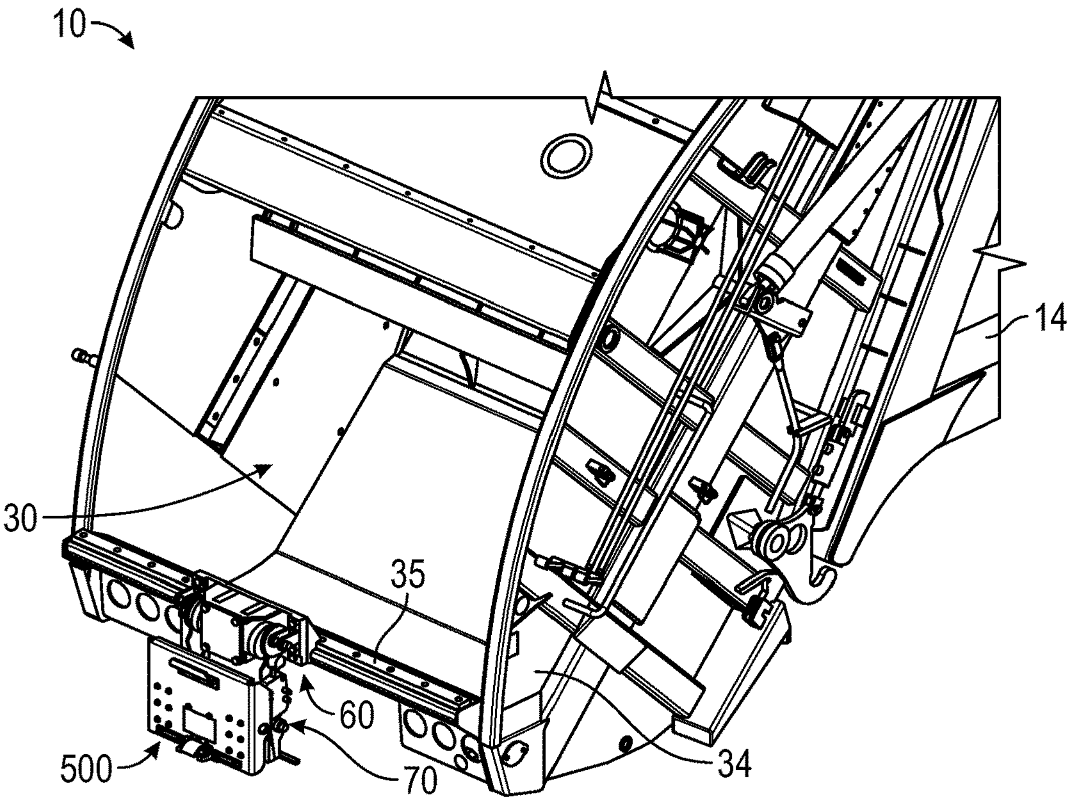
FIG. 34 is a perspective view of a fourth attachment coupled to the attachment assembly of FIG. 24, according to an exemplary embodiment.

As shown in FIGS. 30-33, the attachment interface 420 of the grabber attachment 400, the attachment plate 72 of the attachment assembly 70, and the locking levers 80 of the attachment assembly 70 facilitate releasably coupling and securing the grabber attachment 400 to the attachment assembly 70. As shown in FIGS. 31-33, the backplate 422 of the attachment interface 420 is configured to engage with the attachment plate 72 of the attachment assembly 70 such that the hooks 426 of the backplate 422 engage with the arms 76 of the attachment plate 72 and the second apertures 428 of the backplate 422 align with the first apertures 78 of the attachment plate 72. As shown in FIGS. 32 and 33, the retainers 84 of the locking levers 80 are configured to extend through the first apertures 78 of the attachment plate 72 and the second apertures 428 of the backplate 422 when in the second orientation such that each of the retainers 84 engage a respective protrusion, shown as tab 430, extending from the backplate 422. According to the exemplary embodiment shown in FIG. 32, the retainers 84 and the tabs 430 have complementary angled profiles. According to an exemplary embodiment, engagement between the retainers 84 and the tabs 430 pulls (e.g., compresses, etc.) the backplate 422 of the grabber attachment 400 against the attachment plate 72 of the attachment assembly 70 to releasably secure the grabber attachment 400 to the attachment assembly 70.

In operation, the grabber attachment 400 may be coupled to the attachment assembly 70 using the following method. First, the locking levers 80 may be arranged in the first orientation (e.g., the unlocked orientation, etc.). Second, the grabber attachment 400 may be interfaced with the attachment assembly 70 such that (i) the hooks 426 of the backplate 422 interface with the arms 76 of the attachment plate 72 and (ii) the second apertures 428 of the backplate 422 align with the first apertures 78 of the attachment plate 72. Third, the locking levers 80 may be manually pivoted from the first orientation to the second orientation (e.g., the locked orientation, etc.) such that the retainers 84 extend through the first apertures 78 of the attachment plate 72 and the second apertures 428 of the backplate 422. Pivoting the locking levers 80 from the first orientation to the second orientation causes the retainers 84 to engage the tabs 430 on the backplate 422 such that the backplate 422 is pulled towards the attachment plate 72 and secured thereto. Further, the locking pins 92 may be manually inserted or automatically actuated into the locking apertures 88 of the locking levers 80 to secure the locking levers 80 in the second orientation and prevent inadvertent disengagement between the retainers 84 and the tabs 430. Fourth, the locking pins 92 may be removed from the locking apertures 88 and the locking levers 80 pivoted from the second orientation back to the first orientation to release the grabber attachment 400 from the attachment assembly 70 such that the grabber attachment 400 may be maintained, repaired, replaced, swapped, etc.

Figure 35:
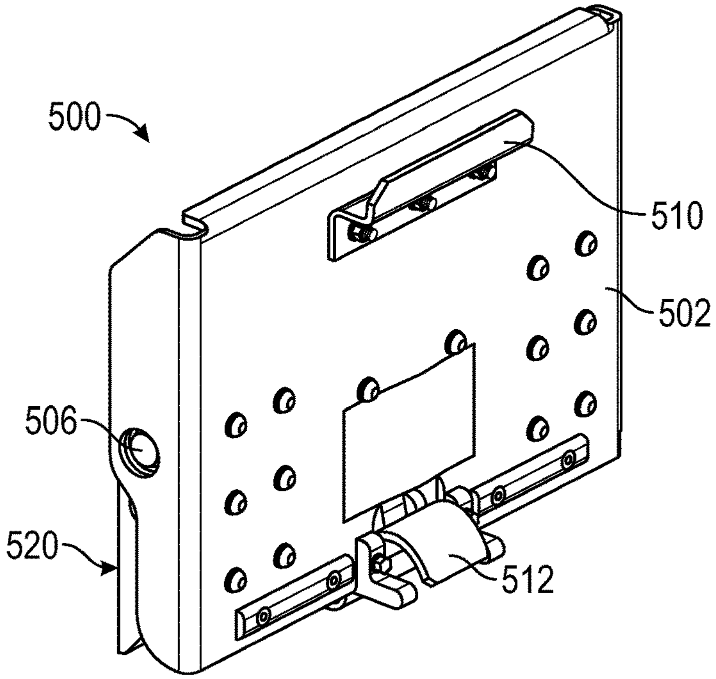
FIG. 35 is a front perspective view of the fourth attachment of FIG. 34, according to an exemplary embodiment.
Figure 36:
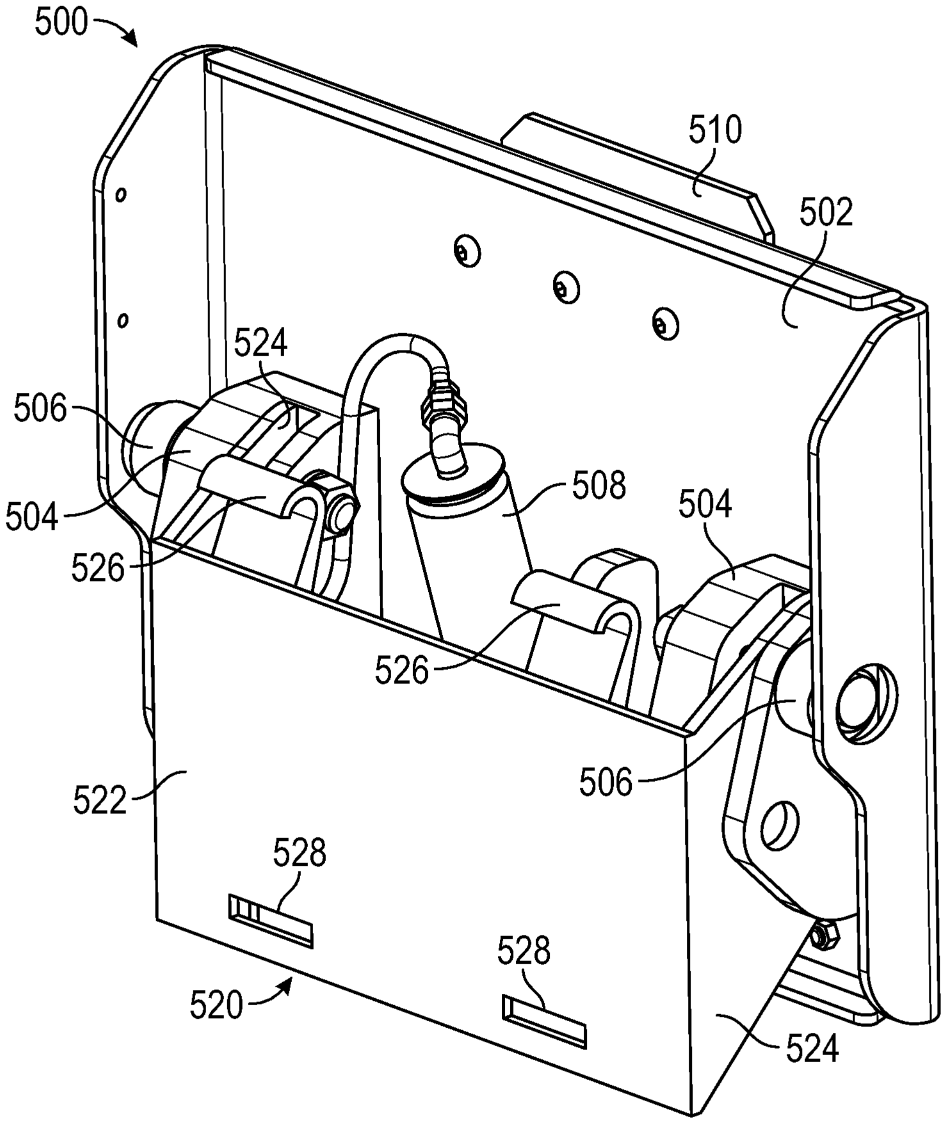
FIG. 36 is a rear perspective view of the fourth attachment of FIG. 34, according to an exemplary embodiment.

As shown in FIGS. 35-38, the cart tipper attachment 500 includes a first plate, shown as front plate 502, and an interface, shown as attachment interface 520, including a second plate, shown as backplate 522. As shown in FIG. 36, the cart tipper attachment 500 include a pair of brackets, shown as coupling brackets 504, coupled at opposing sides of a rear surface of the front plate 502. The backplate 522 of the attachment interface 520 includes a pair of extensions, shown as flanges 524, that extend perpendicularly from opposing end of the backplate 522. The flanges 524 are configured to interface with the coupling brackets 504, coupling the front plate 502 and the backplate 522. According to the exemplary embodiment shown in FIG. 36, each set of coupling brackets 504 and flanges 524 cooperatively receives a respective pin, shown as pivot pin 506, such that the front plate 502 is pivotally coupled to the backplate 522. In other embodiments, the front plate 502 is fixed relative to the backplate 522. As shown in FIG. 36, the cart tipper attachment 500 includes an actuator (e.g., hydraulic cylinder, pneumatic cylinder, etc.), shown as tipper actuator 508, positioned between the front plate 502 and the backplate 522. According to an exemplary embodiment, the tipper actuator 508 is positioned to pivot the front plate 502 relative to the backplate 522. As shown in FIGS. 35 and 36, the cart tipper attachment 500 includes a first interface, shown as upper flange 510, and a second interface, shown as lower flange 512 configured to facilitate interlocking with and lifting an object (e.g., a refuse container, a trash can, a recycling bin, a cart, etc.) with the cart tipper attachment 500.

As shown in FIGS. 36-38, the backplate 522 has a first pair of interfaces, shown as hooks 526, extending from a top end thereof and (ii) defines a second pair of interfaces, shown as second apertures 528, positioned proximate the bottom end thereof. In other embodiments, the backplate 522 includes a different number of hooks 526 and/or second apertures 528 (e.g., one, three, four, etc.). According to an exemplary embodiment, the attachment interface 520 of the cart tipper attachment 500, the attachment plate 72 of the attachment assembly 70, and the locking levers 80 of the attachment assembly 70 facilitate releasably coupling and securing the cart tipper attachment 500 to the attachment assembly 70. As shown in FIGS. 37 and 38, the backplate 522 of the attachment interface 520 is configured to engage with the attachment plate 72 of the attachment assembly 70 such that the hooks 526 of the backplate 522 engage with the arms 76 of the attachment plate 72 and the second apertures 528 of the backplate 522 align with the first apertures 78 of the attachment plate 72. The retainers 84 of the locking levers 80 are configured to extend through the first apertures 78 of the attachment plate 72 and the second apertures 528 of the backplate 522 when in the second orientation such that each of the retainers 84 engage a respective protrusion, shown as tab 530, extending from the backplate 522. According to the exemplary embodiment shown in FIG. 38, the retainers 84 and the tabs 530 have complementary angled profiles. According to an exemplary embodiment, engagement between the retainers 84 and the tabs 530 pulls (e.g., compresses, etc.) the backplate 522 of the cart tipper attachment 500 against the attachment plate 72 of the attachment assembly 70 to releasably secure the cart tipper attachment 500 to the attachment assembly 70.

In operation, the cart tipper attachment 500 may be coupled to the attachment assembly 70 using the following method. First, the locking levers 80 may be arranged in the first orientation (e.g., the unlocked orientation, etc.). Second, the cart tipper attachment 500 may be interfaced with the attachment assembly 70 such that (i) the hooks 526 of the backplate 522 interface with the arms 76 of the attachment plate 72 and (ii) the second apertures 528 of the backplate 522 align with the first apertures 78 of the attachment plate 72. Third, the locking levers 80 may be manually pivoted from the first orientation to the second orientation (e.g., the locked orientation, etc.) such that the retainers 84 extend through the first apertures 78 of the attachment plate 72 and the second apertures 528 of the backplate 522. Pivoting the locking levers 80 from the first orientation to the second orientation causes the retainers 84 to engage the tabs 530 on the backplate 522 such that the backplate 522 is pulled towards the attachment plate 72 and secured thereto. Further, the locking pins 92 may be manually inserted or automatically actuated into the locking apertures 88 of the locking levers 80 to secure the locking levers 80 in the second orientation and prevent inadvertent disengagement between the retainers 84 and the tabs 530. Fourth, the locking pins 92 may be removed from the locking apertures 88 and the locking levers 80 pivoted from the second orientation back to the first orientation to release the cart tipper attachment 500 from the attachment assembly 70 such that the cart tipper attachment 500 may be maintained, repaired, replaced, swapped, etc.

Figure 39:
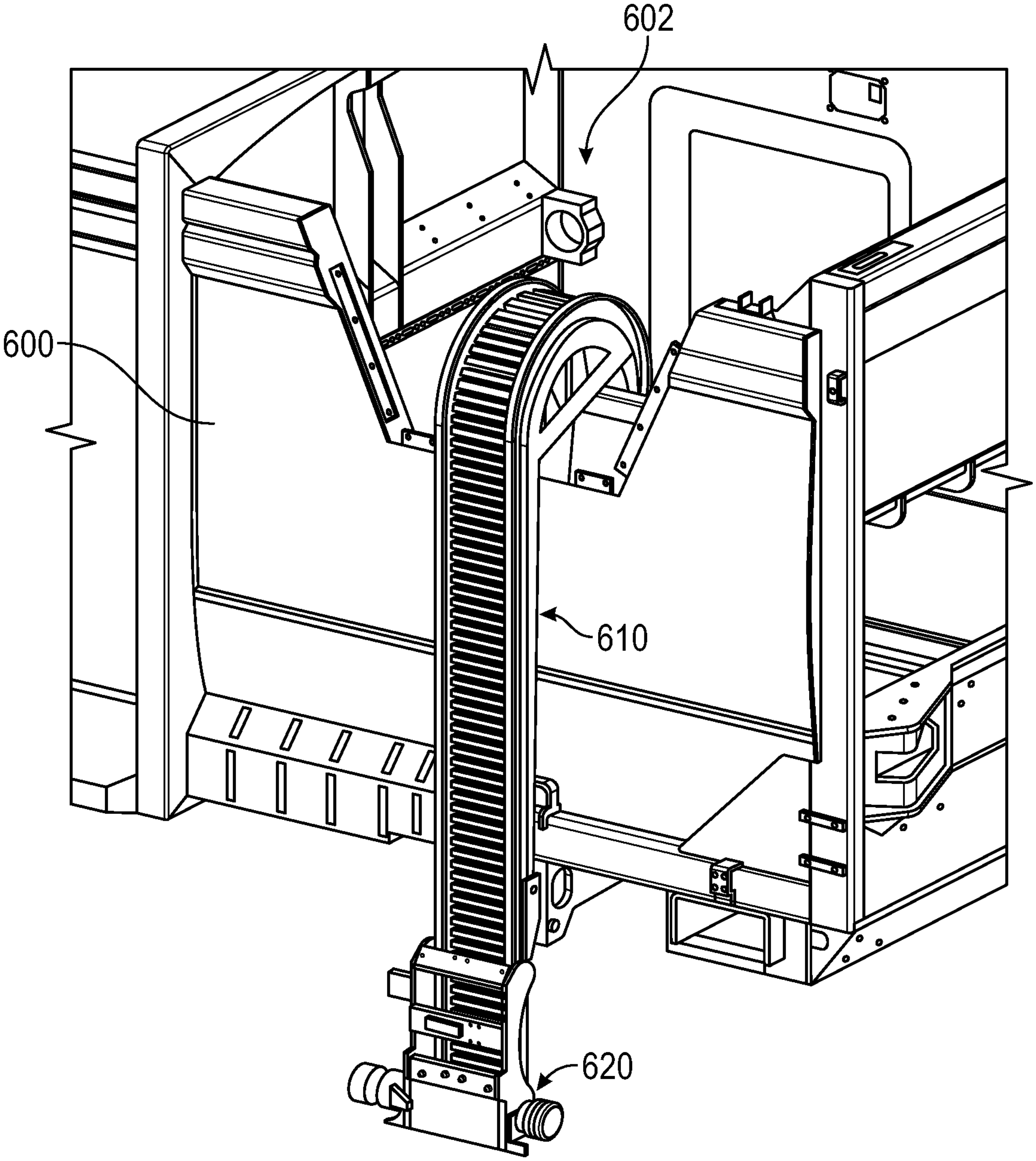
FIG. 39 is a side perspective view of an attachment assembly of a refuse vehicle, according to yet another exemplary embodiment.
Figure 40:
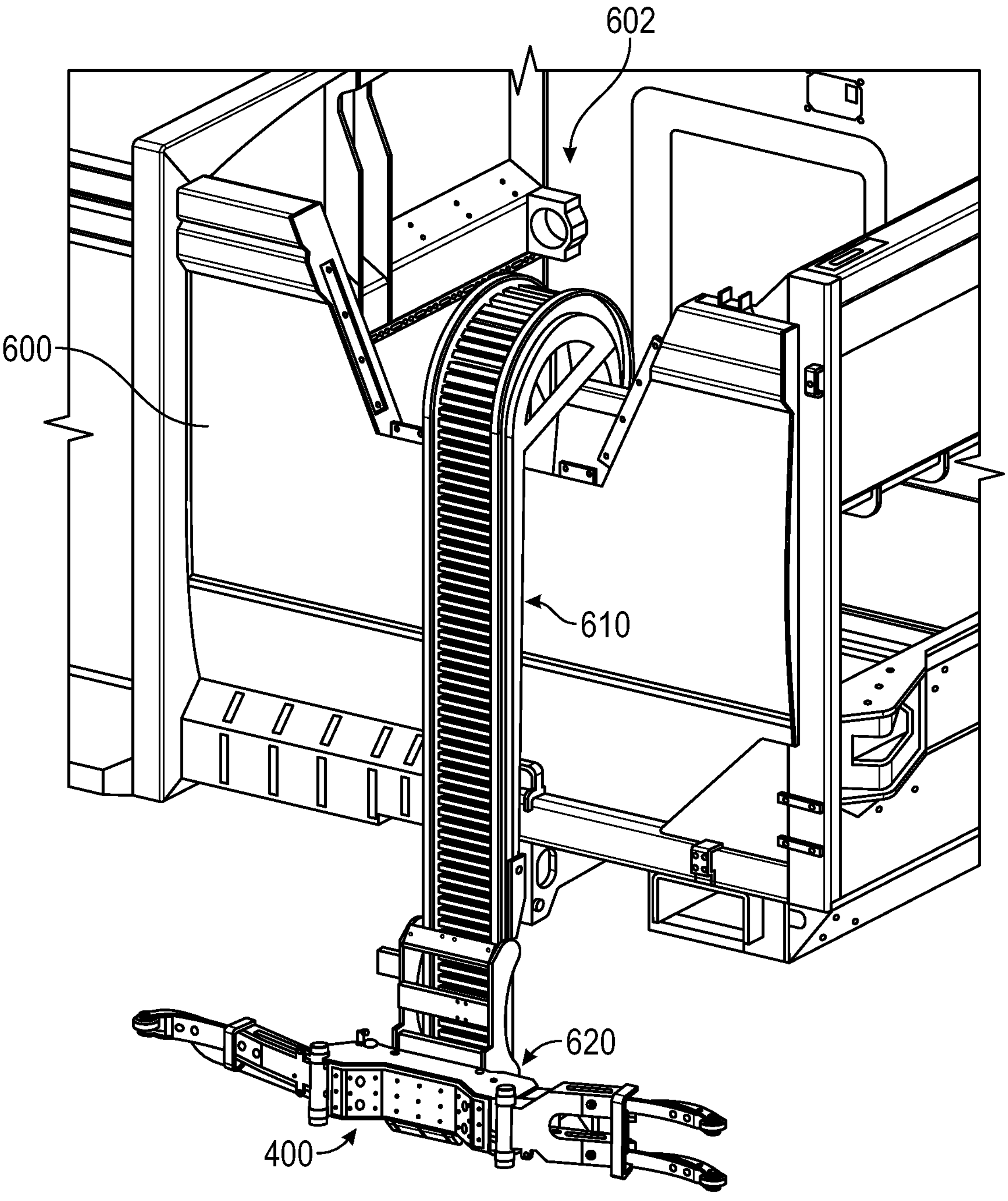
FIG. 40 is a side perspective view of the third attachment of FIG. 27 coupled to the attachment assembly of FIG. 39, according to an exemplary embodiment.
Figure 41:
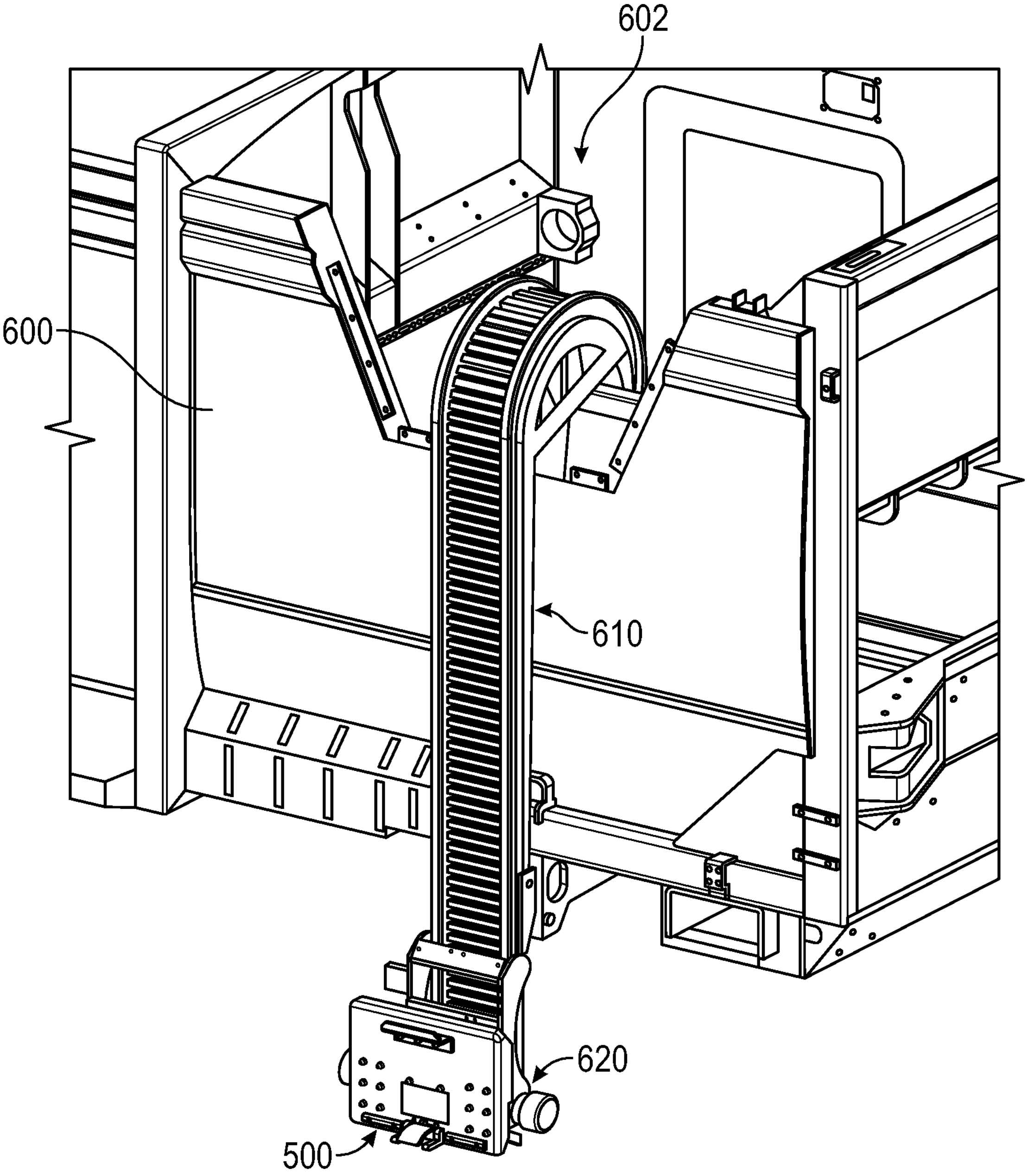
FIG. 41 is a side perspective view of the fourth attachment of FIG. 34 coupled to the attachment assembly of FIG. 39, according to an exemplary embodiment.

According to the exemplary embodiment shown in FIGS. 39-41, the refuse vehicle 10 is configured as a side-loading refuse truck having a container (e.g., similar to refuse container 202, etc.), shown as refuse container 600, including a third lift mechanism/system (e.g., a side-loading lift assembly, etc.), shown as lift assembly 610, and third attachment assembly, shown as attachment assembly 620. The attachment assembly 620 may be similar to the attachment assembly 70 and/or the attachment assembly 100. As shown in FIG. 40 the attachment assembly 620 is configured to engage with the grabber attachment 400 to selectively and releasably secure the grabber attachment 400 to the lift assembly 610. As shown in FIG. 41, the attachment assembly 620 is configured to engage with the cart tipper attachment 500 to selectively and releasably secure the cart tipper attachment 500 to the lift assembly 610. In other embodiments, the attachment assembly 620 is configured to engage with another type of attachment (e.g., a bucket attachment, the container attachment 200, the fork attachment 300, etc.). According to an exemplary embodiment, the lift assembly 610 is configured to facilitate lifting an object (e.g., a refuse container, a trash can, a recycling bin, etc.) such that the contents therein (e.g., refuse, trash, garbage, etc.) may be dumped into a cavity, shown as refuse compartment 602, of the refuse container 600.

According to the exemplary embodiment shown in FIGS. 42-49, (i) the attachment assembly 100 does not include the coupling tube 140, the attachment plate 150, the support plates 160, or the couplers 170, (ii) the container attachment 200 (e.g., a carry can attachment) does not include the attachment interface 280 or the attachment interface 290, and (iii) the fork attachment 300 does not include the fork hooks 322 or the attachment interface 330. Rather, (i) the attachment assembly 100 includes an attachment interface, shown as attachment interface 700, and (ii) the container attachment 200 and the fork attachment 300 include another alternative or third interface, shown as attachment interface 800. As described in more detail herein, the attachment interface 700 and the attachment interface 800 are configured to facilitate selectively and releasably coupling the container attachment 200 and the fork attachment 300 to the attachment assembly 100 and, thereby, the refuse vehicle 10.

Figure 42:
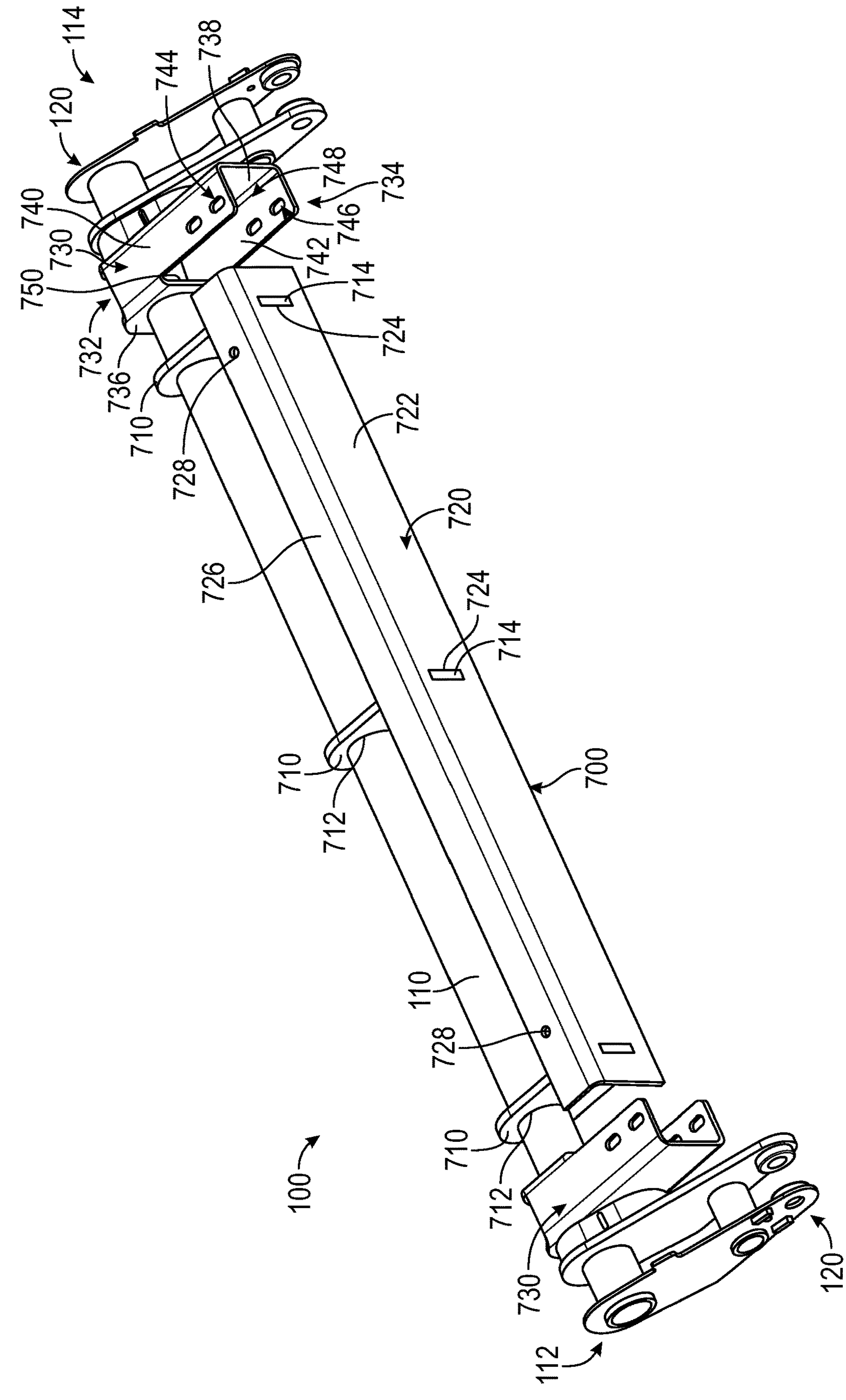
FIG. 42 is a front perspective view of an attachment assembly of a refuse vehicle, according to another exemplary embodiment.
Figure 43:
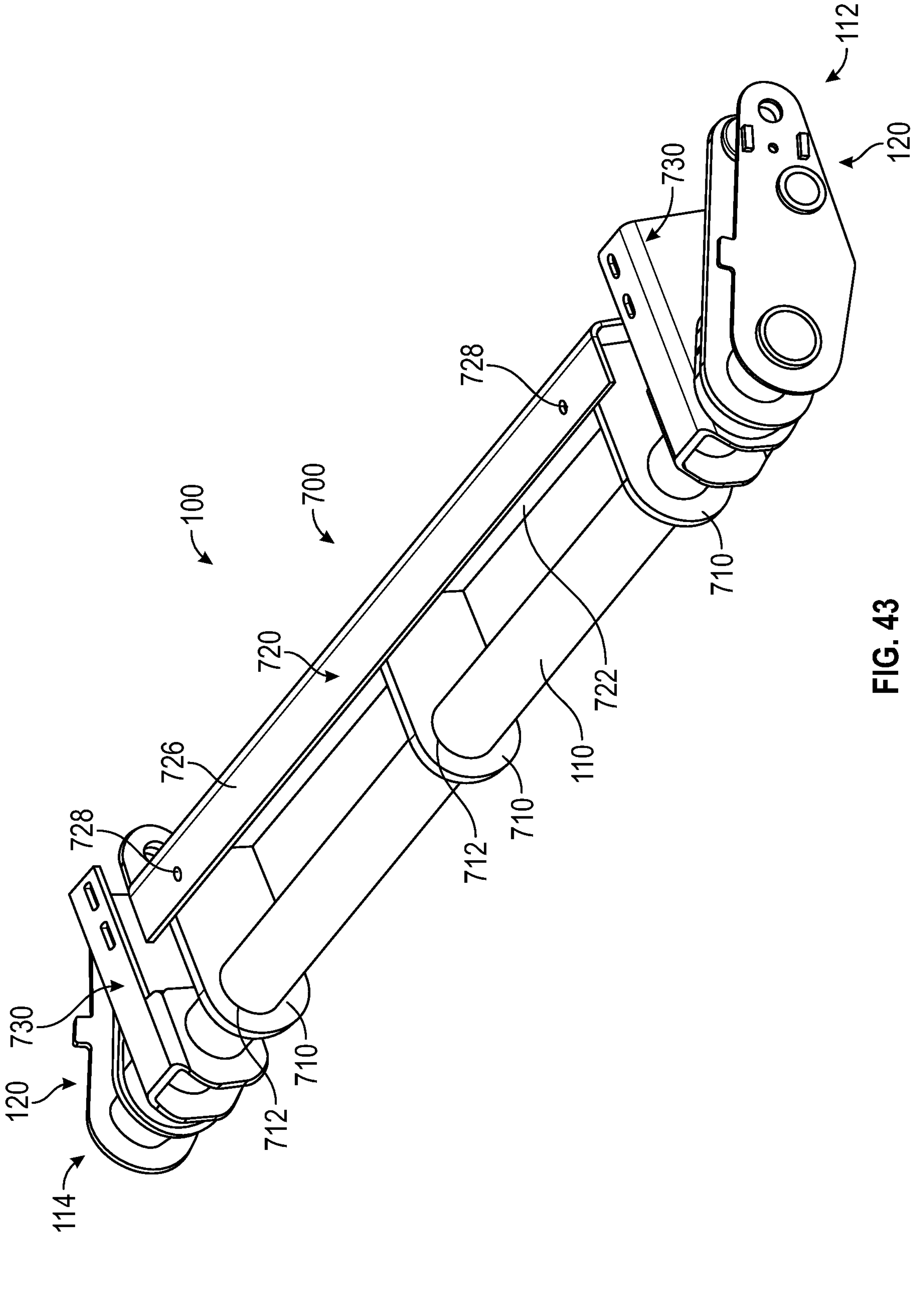
FIG. 43 is a rear perspective view of the attachment assembly of FIG. 42, according to an exemplary embodiment.

As shown in FIGS. 42 and 43, the attachment interface 700 of the attachment assembly 100 includes (i) a plurality of frame members or arms, shown as support plates 710, coupled to the main tube 110; (ii) a first bracket, shown as central bump stop 720, coupled to the support plates 710; and (iii) a plurality of second brackets or interfaces (e.g., a pair of second brackets, etc.), shown as receivers 730, coupled to the main tube 110. The receivers 730 include (i) a first receiver 730 positioned between the central bump stop 720 and a first bracket 120 positioned at the right end 112 of the main tube 110 and (ii) a second receiver 730 positioned between the central bump stop 720 and a second bracket 120 positioned at the left end 114 of the main tube 110. While shown as including three support plates 710, the attachment assembly 100 may include a different number of the support plates 710 (e.g., one, two, four, etc.). According to an exemplary embodiment, the main tube 110, the brackets 120, the support plates 710, the central bump stop 720, and/or the receivers 730 form a single weldment. In other embodiments, one or more components of the attachment assembly 100 are otherwise coupled together (e.g., fastened, adhesively coupled, etc.).

As shown in FIGS. 42 and 43, the central bump stop 720 includes a first plate, shown as backing plate 722, and a second plate, shown as top plate 726, extending rearward from an upper end of the backing plate 722. According to an exemplary embodiment, the top plate 726 is perpendicular to or substantially perpendicular to the backing plate 722 such that the central bump stop 720 has a generally "L-shaped" structure. In some embodiments, the top plate 726 extends at an upward angle from the upper end of the backing plate 722. In other embodiments, the central bump stop 720 does not include the top plate 726.

As shown in FIGS. 42 and 43, (i) a first end (e.g., a rear end, etc.) of each of the support plates 710 defines an aperture, shown as main aperture 712, that receives the main tube 110 and (ii) an opposing second end (e.g., a front end, etc.) of each of the support plates 710 is positioned along a rear or interior surface of the backing plate 722 and the top plate 726 of the central bump stop 720. As shown in FIG. 42, (i) the backing plate 722 of the central bump stop 720 defines a plurality of interfaces, shown as apertures 724, that correspond with the quantity of support plates 710 and (ii) the opposing second end of each of the support plates 710 defines an interface, shown as protrusion 714, positioned to extend into and engage with a respective one of the apertures 724 of the backing plate 722 of the central bump stop 720. As shown in FIGS. 42 and 43, the top plate 726 defines one or more first coupling apertures (e.g., positioned at opposing ends of the top plate 726, etc.), shown as coupling apertures 728. In some embodiments, the top plate 726 does not define the coupling apertures 728.

Figure 48:
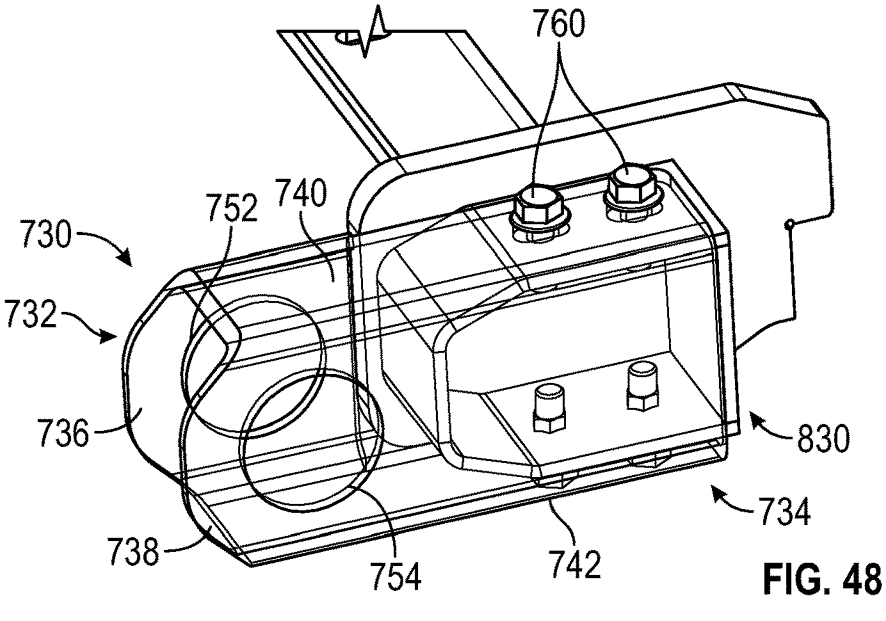
FIG. 48 is a detailed view of the attachment interface of the attachment assembly of FIG. 46 engaged with the attachment interface of the first attachment and the second attachment of FIG. 47, according to an exemplary embodiment.

As shown in FIGS. 42 and 48, each of the receivers 730 has a first end, shown as tube end 732, and an opposing second end, shown as receiving end 734. Each of the receivers 730 includes a first wall, shown as inner sidewall 736, a second wall, shown as outer sidewall 738, a third wall, shown as upper wall 740, and a fourth wall, shown as lower wall 742. The inner sidewall 736, the outer sidewall 738, the upper wall 740, and the lower wall 742 are coupled together or integrally formed to provide a generally rectangular cross-sectional shape for the receivers 730. In other embodiments, the receivers 730 have another cross-sectional shape (e.g., square, hexagonal, circular, oval, etc.). Each of the inner sidewall 736 and the outer sidewall 738 defines an aperture, shown as main aperture 752 and main aperture 754, respectively, positioned proximate the tube end 732 of the receivers 730 and that receives the main tube 110 to couple the receivers 730 to the main tube 110.

As shown in FIG. 42, (i) the receiving end 734 of each of the receivers 730 defines an aperture, shown as opening 748, and (ii) the inner sidewall 736 is shorter than the outer sidewall 738 and, therefore, the inner sidewall 736 does not extend all the way to the receiving end 734 such that a cutout, shown as cutout 750, is defined in each of the receivers 730. The opening 748 and the cutout 750, therefore, cooperatively define a "L-shaped" opening into the interior slot or passage of each of the receivers 730. The upper wall 740 of each of the receivers 730 defines one or more second coupling apertures, shown as coupling apertures 744, and the lower wall 742 of each of the receivers 730 defines one or more third coupling apertures, shown as coupling apertures 746.

Figure 44:
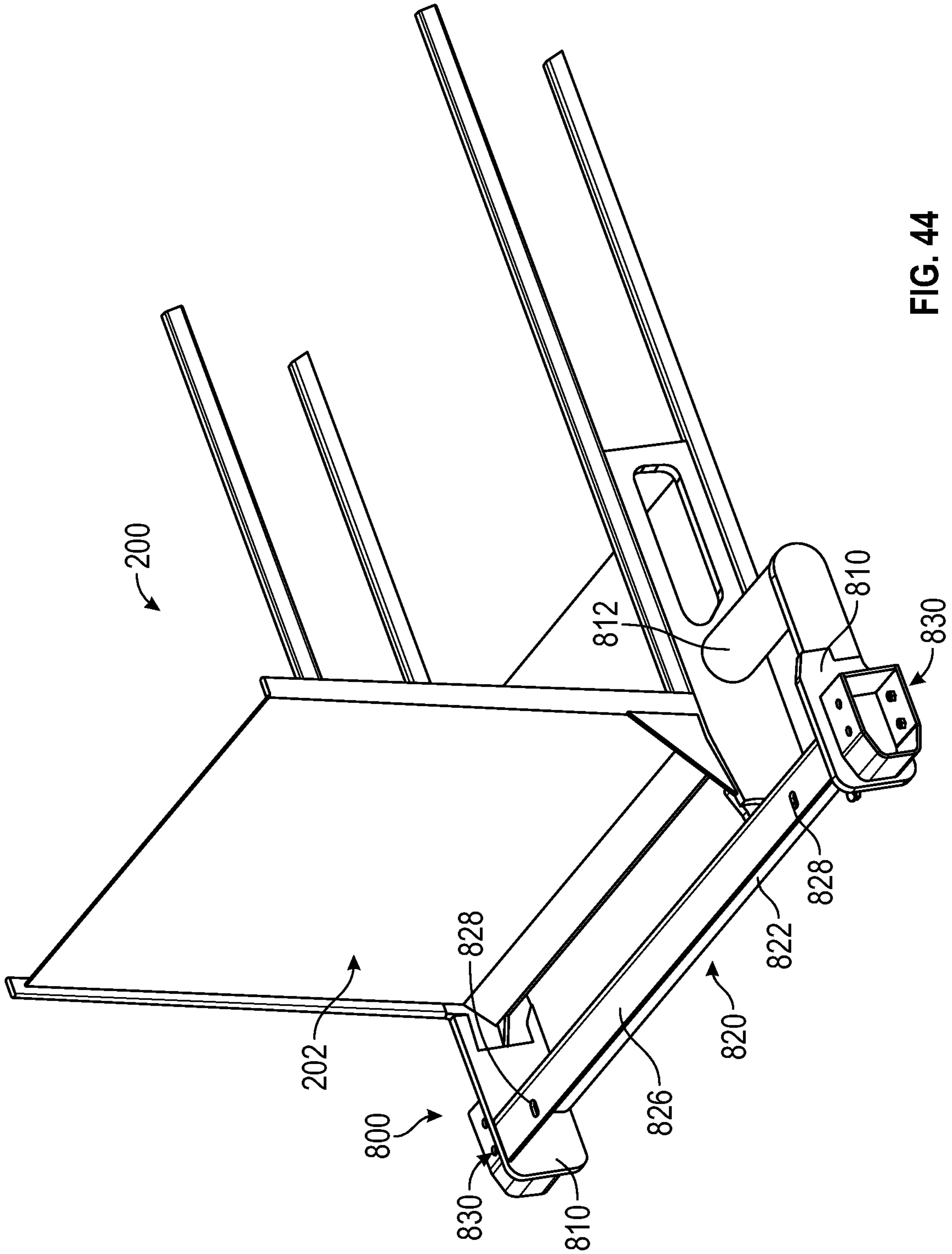
FIG. 44 is a rear perspective view of the first attachment, according to another exemplary embodiment.
Figure 45:
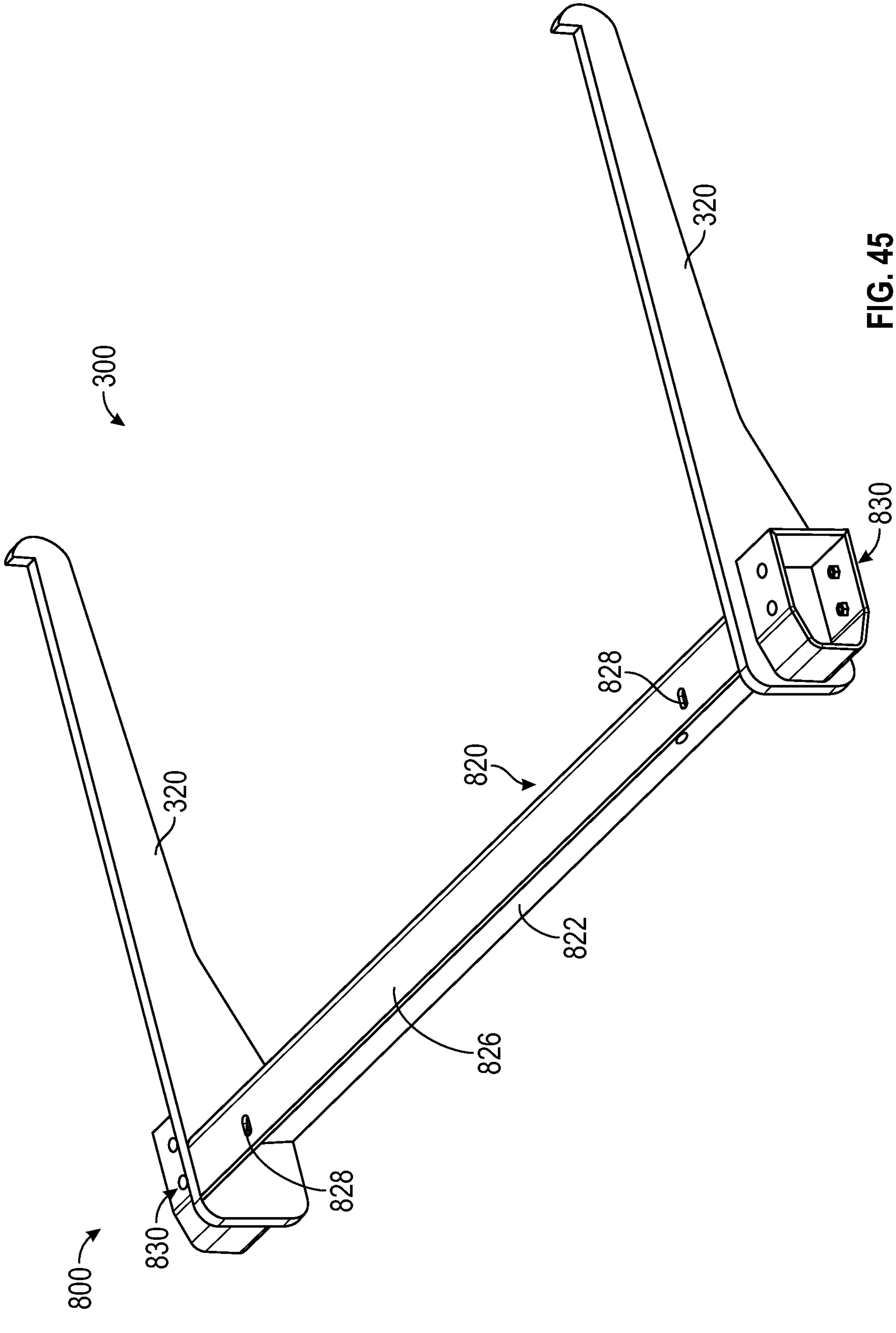
FIG. 45 is a rear perspective view of the second attachment, according to another exemplary embodiment.
Figure 46:
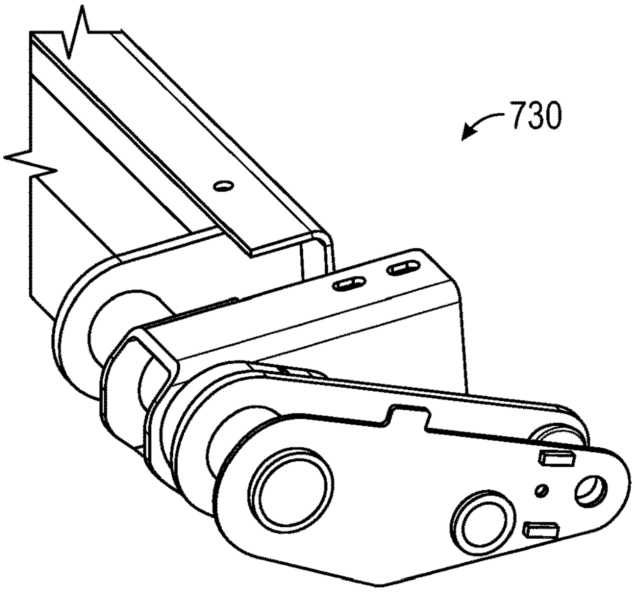
FIG. 46 is a detailed view of an attachment interface of the attachment assembly of FIG. 42, according to an exemplary embodiment.
Figure 47:
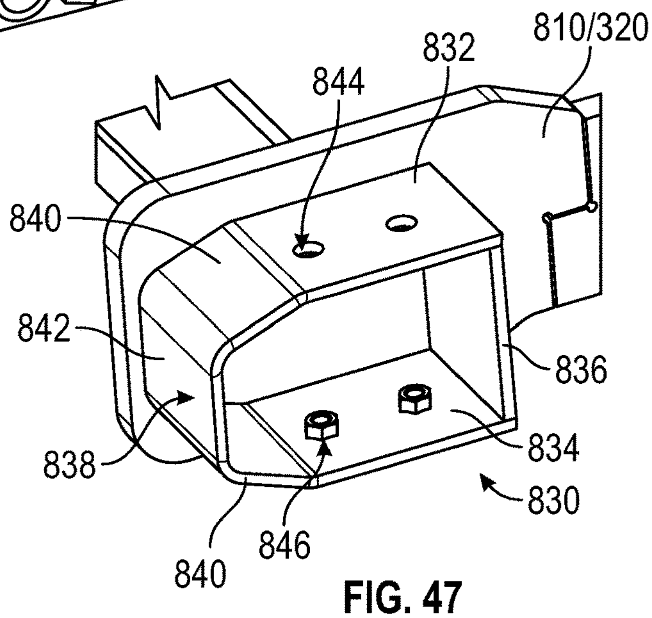
FIG. 47 is a detailed view of an attachment interface of the first attachment and the second attachment of FIGS. 44 and 45, according to an exemplary embodiment.

As shown in FIGS. 44 and 47, the attachment interface 800 of the container attachment 200 includes a pair of plates or arms, shown as support plates 810, coupled to and extending from the refuse container 202; an engagement member, shown as engagement bracket 820, extending between the inward facing surfaces of the support plates 810; and a pair of inserts, shown as inserts 830, coupled to and extending from the outward facing surfaces of the support plates 810. As shown in FIG. 44, (i) a first one of the support plates 810 (e.g., a left support plate) is coupled to and flush with a first sidewall (e.g., the first sidewall 230) of the refuse container 202 and (ii) a second one of the support plates 810 (e.g., a right support plate) is coupled to and spaced laterally outward from an opposing second sidewall (e.g., the second sidewall 240) of the refuse container 202 by an extension or spacer, shown as spacer bar 812. In some embodiments, the attachment interface 800 does not include the spacer bar 812, but rather the second one of the support plates 810 is coupled to and flush with the opposing second sidewall of the refuse container 202. As shown in FIG. 45, the attachment interface 800 of the fork attachment 300 is substantially similar to the attachment interface 800 of the container attachment 200, except the support plates 810 are replaced with the forks 320.

As shown in FIGS. 44 and 45, the engagement bracket 820 includes a first plate, shown as front plate 822, and a second plate, shown as top plate 826, extending rearward from an upper end of the front plate 822. According to an exemplary embodiment, the top plate 826 is perpendicular to or substantially perpendicular to the front plate 822 such that the engagement bracket 820 has a generally "L-shaped" structure. In some embodiments, the top plate 826 extends at an upward angle from the upper end of the front plate 822. In other embodiments, the engagement bracket 820 does not include the top plate 826. As shown in FIGS. 44 and 45, the top plate 826 defines one or more fourth coupling apertures (e.g., positioned at opposing ends of the top plate 826, etc.), shown as coupling apertures 828. In some embodiments, the top plate 826 does not define the coupling apertures 828.

As shown in FIG. 47, the inserts 830 include a first plate, shown as upper plate 832; a second plate, shown as lower plate 834; a third plate, shown as front plate 836, connecting front ends of the upper plate 832 and the lower plate 834; and a fourth plate, shown as interface plate 838, (i) connecting rear ends of the upper plate 832 and the lower plate 834 and (ii) having (a) a pair of flanges, shown as flanges 840, extending rearward from the rear ends of the upper plate 832 and the lower plate 834 at an angle toward each other and (b) a connecting plate, shown as rear plate 842, connecting the flanges 840 such that the interface plate 838 has a tapered, "C-shaped," or a trapezoidal/semi-hexagon shaped profile. In other embodiments, the interface plate 838 has another type of tapered or curved profile (e.g., a "V-shaped" profile, a semi-circle shaped profile, etc.). According to an exemplary embodiment, the tapered or curved profile of the interface plate 838 provides improved or easier coupling of the attachment interface 800 to the attachment interface 700 of the attachment assembly 100. As shown in FIG. 47, the upper plate 832 of the inserts 830 defines one or more fifth coupling apertures, shown as coupling apertures 844, and the lower plate 834 of the inserts 830 defines one or more sixth coupling apertures, shown as coupling apertures 846.

Figure 49:
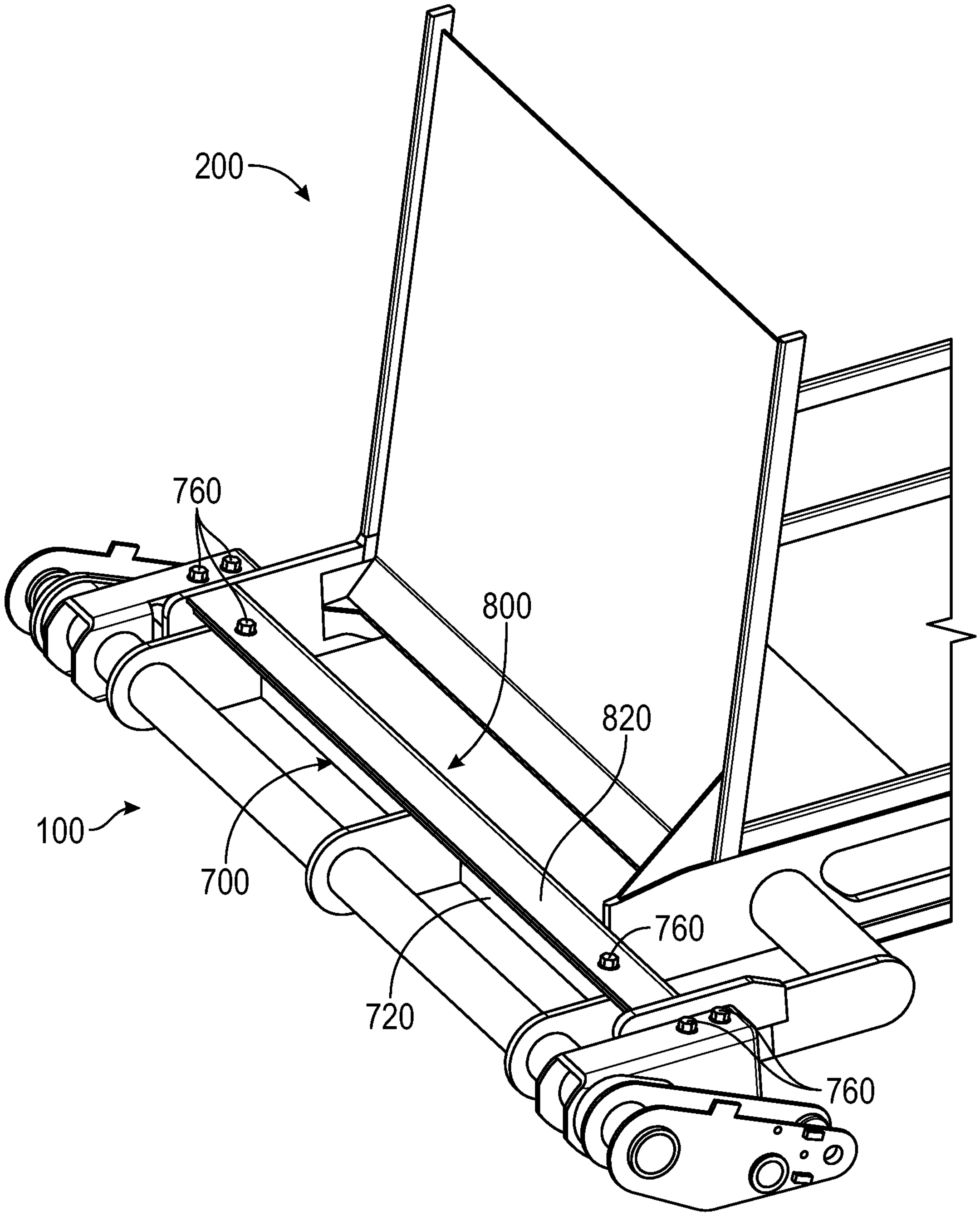
FIG. 49 is a rear perspective view of the attachment assembly of FIG. 42 engaged with the first attachment of FIG. 44, according to an exemplary embodiment.

As shown in FIGS. 48 and 49, the attachment interface 700 of the attachment assembly 100 is configured to releasably receive and interface with the attachment interface 800 to facilitate selectively coupling a desired attachment (e.g., the container attachment 200, the fork attachment 300, a plow attachment, a bucket attachment, a street sweeper attachment, a grabber attachment, a cart tipper attachment, etc.) to the vehicle 10. Specifically, (i) the front plate 822 and the top plate 826 of the engagement bracket 820 are configured to interface with the backing plate 722 and the top plate 726 of the central bump stop 720, respectively, such that the coupling apertures 728 of the central bump stop 720 and the coupling apertures 828 of the engagement bracket 820 align and (ii) the inserts 830 are configured to slide through the opening 748 and the cutout 750 into the interior slot or passage of the receivers 730 such that (a) the coupling apertures 744 and the coupling apertures 746 of the receivers 730 and (b) the coupling apertures 844 and the coupling apertures 846 of the inserts 830 align. As shown in FIGS. 48 and 49, the various aligned coupling apertures of the attachment interface 700 and the attachment interface 800 selectively receive a plurality of fasteners (e.g., bolts, pins, etc.), shown as fasteners 760, to selectively secure the attachment interface 800 to the attachment interface 700 and, thereby, the desired attachment to the attachment assembly 100.

According to the exemplary embodiment shown in FIGS. 50-55, (i) the attachment assembly 100 does not include the coupling tube 140, the attachment plate 150, the support plates 160, the couplers 170, or the attachment interface 700 and (ii) the container attachment 200 (e.g., a carry can attachment) does not include the attachment interface 280, the attachment interface 290, or the attachment interface 800. Rather, (i) the attachment assembly 100 includes an alternative attachment interface, shown as attachment interface 900, and (ii) the container attachment 200 include another alternative or fourth interface, shown as attachment interface 1000. As described in more detail herein, the attachment interface 900 and the attachment interface 1000 are configured to facilitate selectively and releasably coupling the container attachment 200 to the attachment assembly 100 and, thereby, the refuse vehicle 10.

As shown in FIGS. 50 and 52-55, the attachment interface 900 of the attachment assembly 100 includes (i) a plurality of positioning, guide, or support members, shown as guide plates 910, coupled to the main tube 110 and (ii) a plurality of brackets or interfaces, shown as connecting plates 920, coupled to the main tube 110. The connecting plates 920 include (i) a first or right connecting plate 920 positioned between a first or right guide plate 910 and a first or right bracket 120 positioned at the right end 112 of the main tube 110 and (ii) a second or left connecting plate 920 positioned between a second or left guide plate 910 and a second or left bracket 120 positioned at the left end 114 of the main tube 110. While shown as including two guide plates 910, the attachment assembly 100 may include a different number of the guide plates 910 (e.g., one, three, four, etc.). According to an exemplary embodiment, the main tube 110, the brackets 120, the guide plates 910, and/or the connecting plates 920 form a single weldment. In other embodiments, one or more components of the attachment assembly 100 are otherwise coupled together (e.g., fastened, adhesively coupled, etc.).

Figure 54:
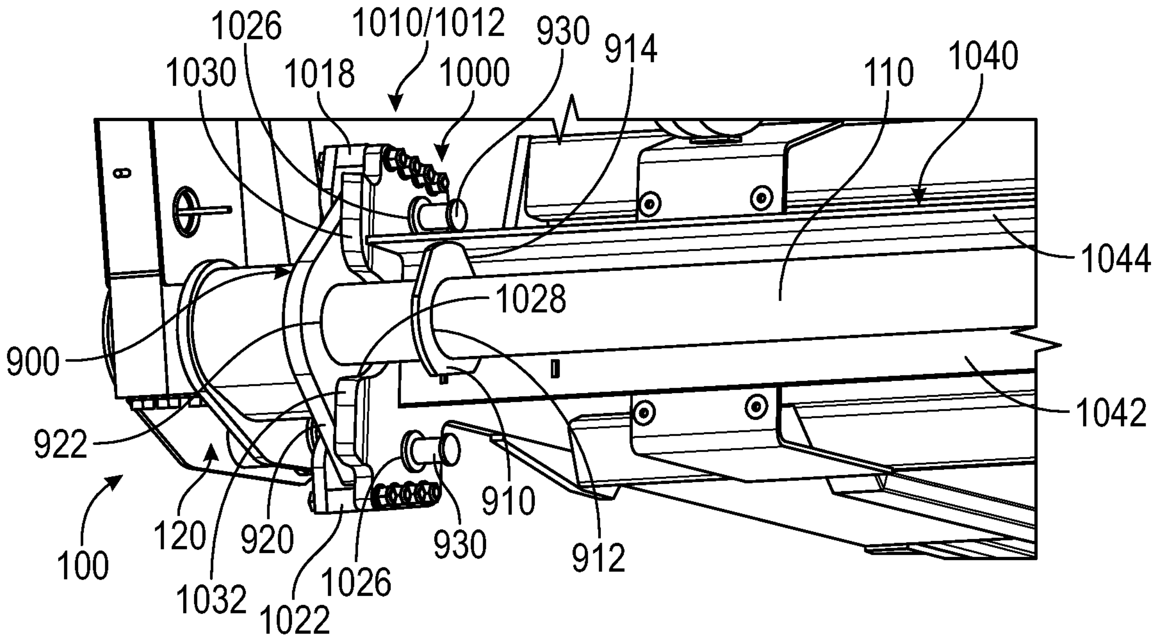
Figure 55:
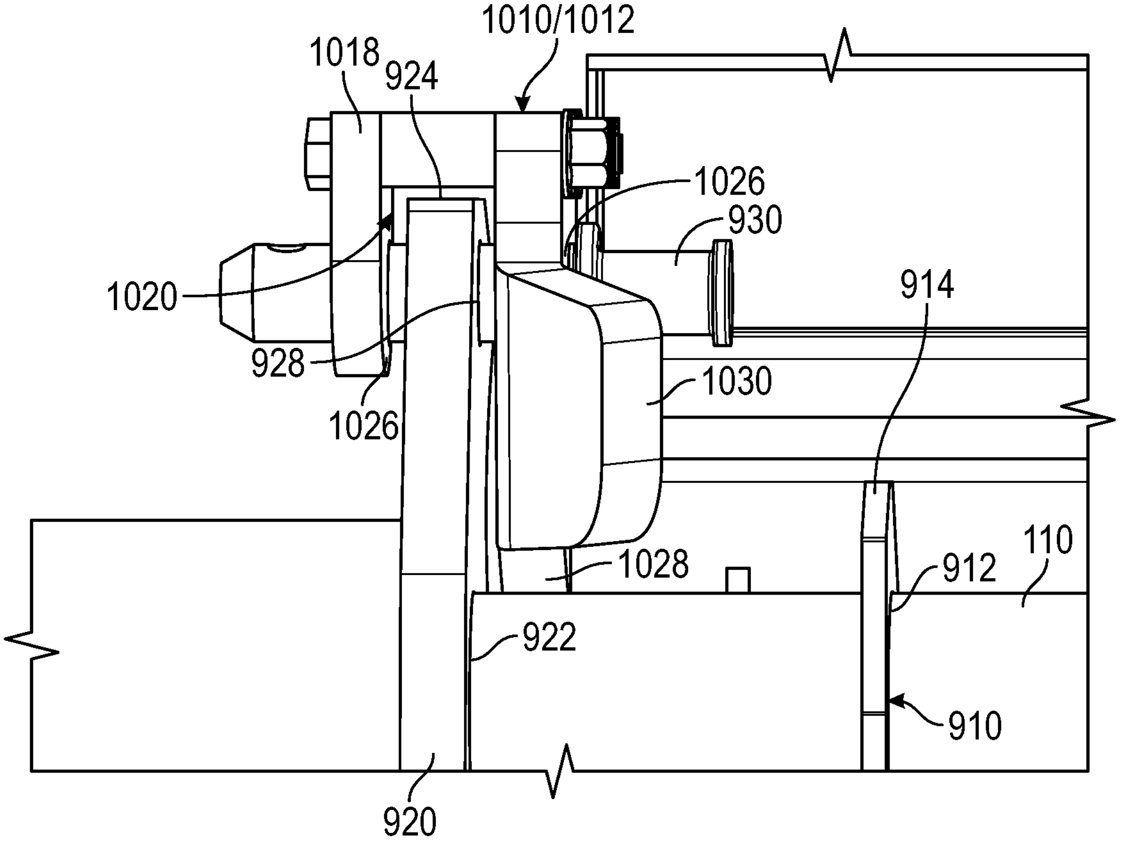

As shown in FIGS. 54 and 55, each of the guide plates 910 (*i*) defines an aperture, shown as main aperture 912, that receives the main tube 110 and (ii) has an exterior shape or surface profile, shown as profile 914. According to an exemplary embodiment, the profile 914 is oblong shaped with an upper portion thereof extending upward from the main tube 110 more than a bottom portion thereof extending downward from the main tube 110. In other embodiments, the upper portion and the bottom portion of the profile 914 are symmetric.

Figure 50:
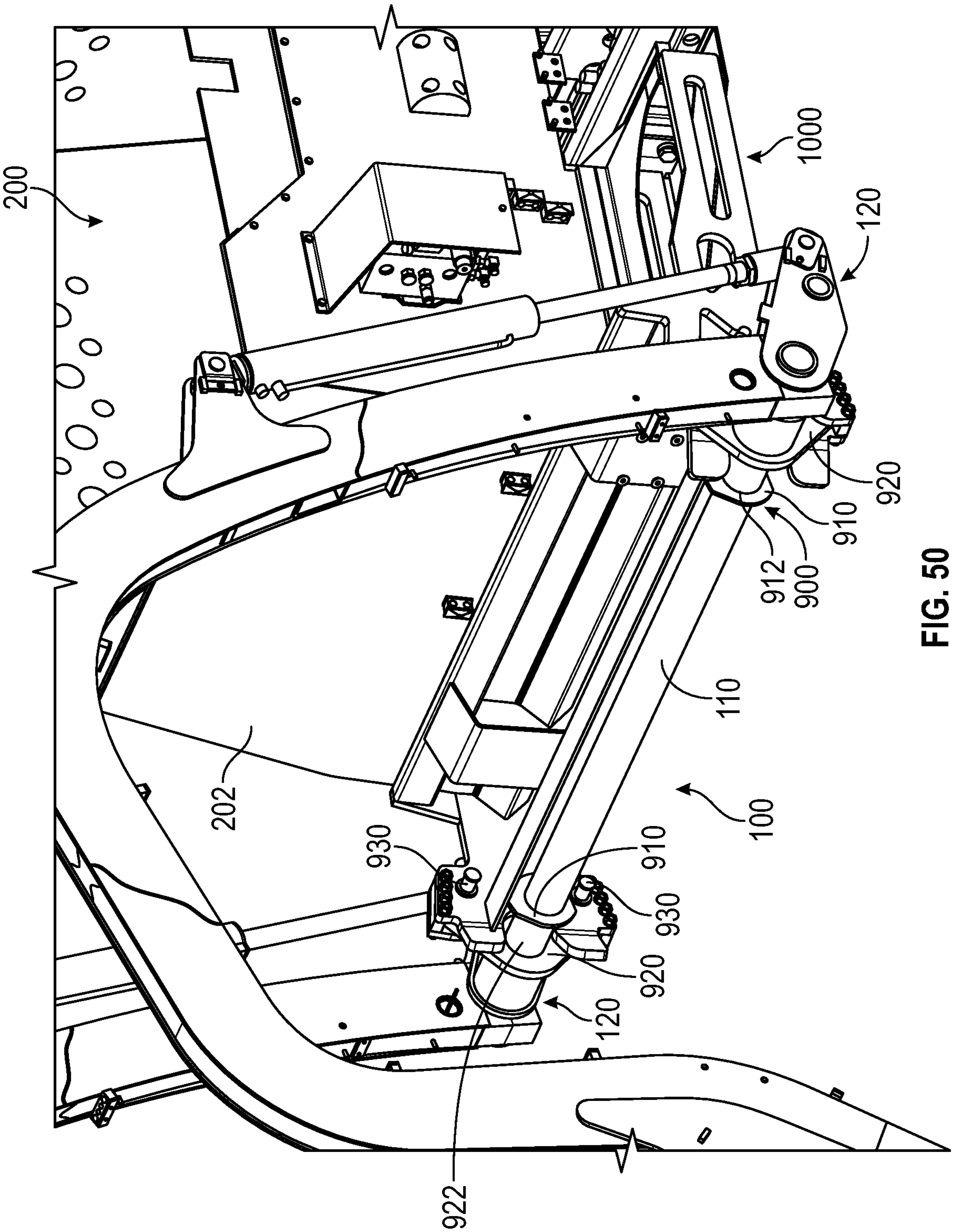
FIG. 50 is a perspective view of an attachment assembly of a refuse vehicle, according to another exemplary embodiment.
Figure 52:
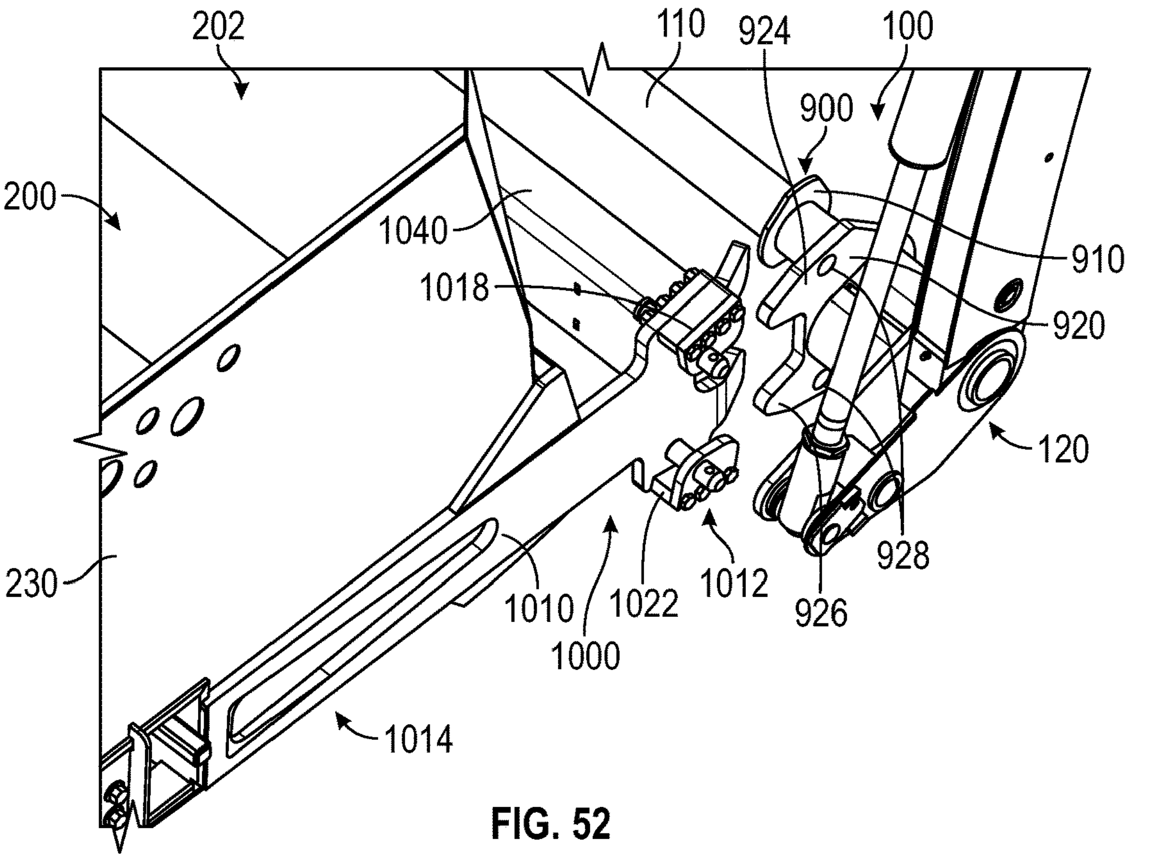
FIG. 52 is a detailed view of the attachment interface of the attachment assembly of FIG. 50 disengaged from the attachment interface of the first attachment of FIG. 51, according to an exemplary embodiment.
Figure 53:
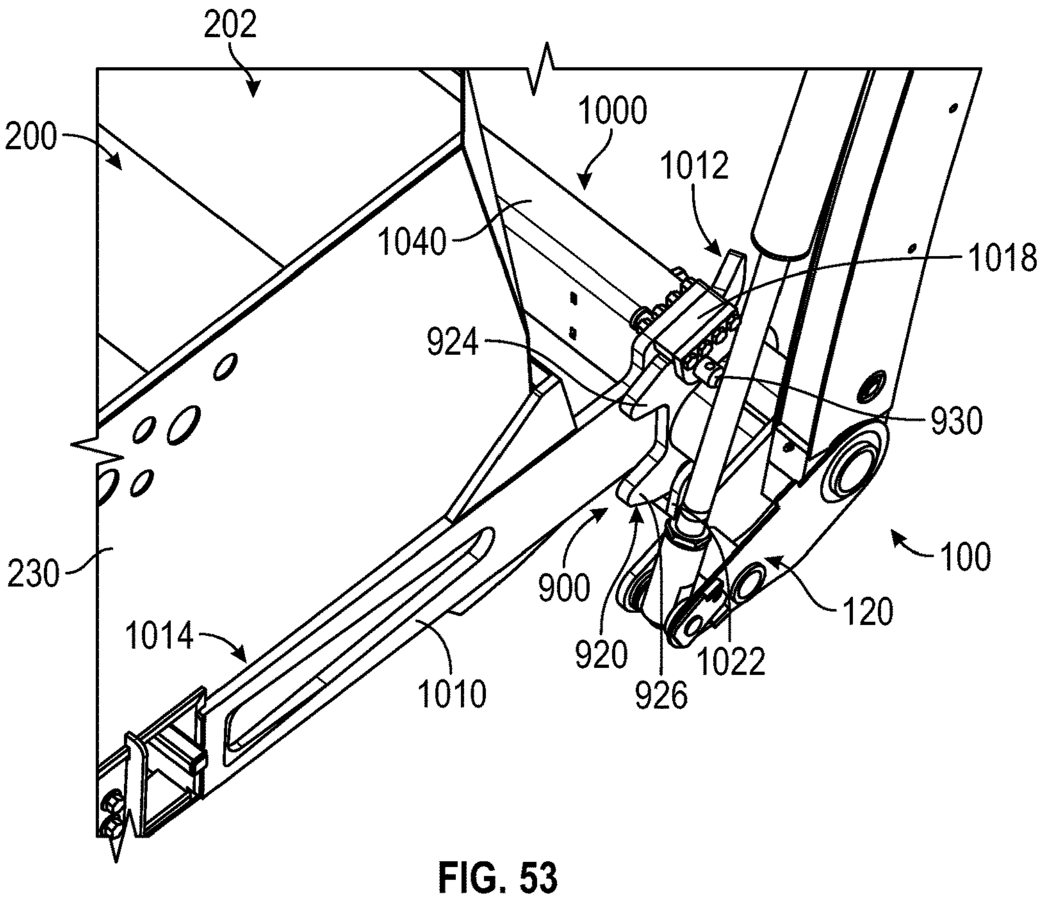
FIGS. 53-55 are various view of the attachment interface of the attachment assembly of FIG. 50 engaged with the attachment interface of the first attachment of FIG. 51, according to an exemplary embodiment.

As shown in FIGS. 50, 54, and 55, a first end (e.g., a rear end, etc.) of each of connecting plates 920 defines an aperture, shown as main aperture 922, that receives the main tube 110 to couple the connecting plates 920 to the main tube 110. As shown in FIGS. 52, 53, and 55, an opposing second end (e.g., a front end, etc.) of each of the connecting plates 920 includes a first interface, shown as upper extension 924, and a second interface, shown as lower extension 926, extending forward from the upper and lower ends thereof, respectively. According to an exemplary embodiment, the upper extension 924 and the lower extension 926 have a tapered or sloped profile. As shown in FIGS. 52 and 55, both (i) the upper end and/or the upper extension 924 of the connecting plates 920 and (ii) the lower end and/or the lower extension 926 of the connecting plates 920 define one or more apertures, shown as coupling apertures 928.

Figure 51:
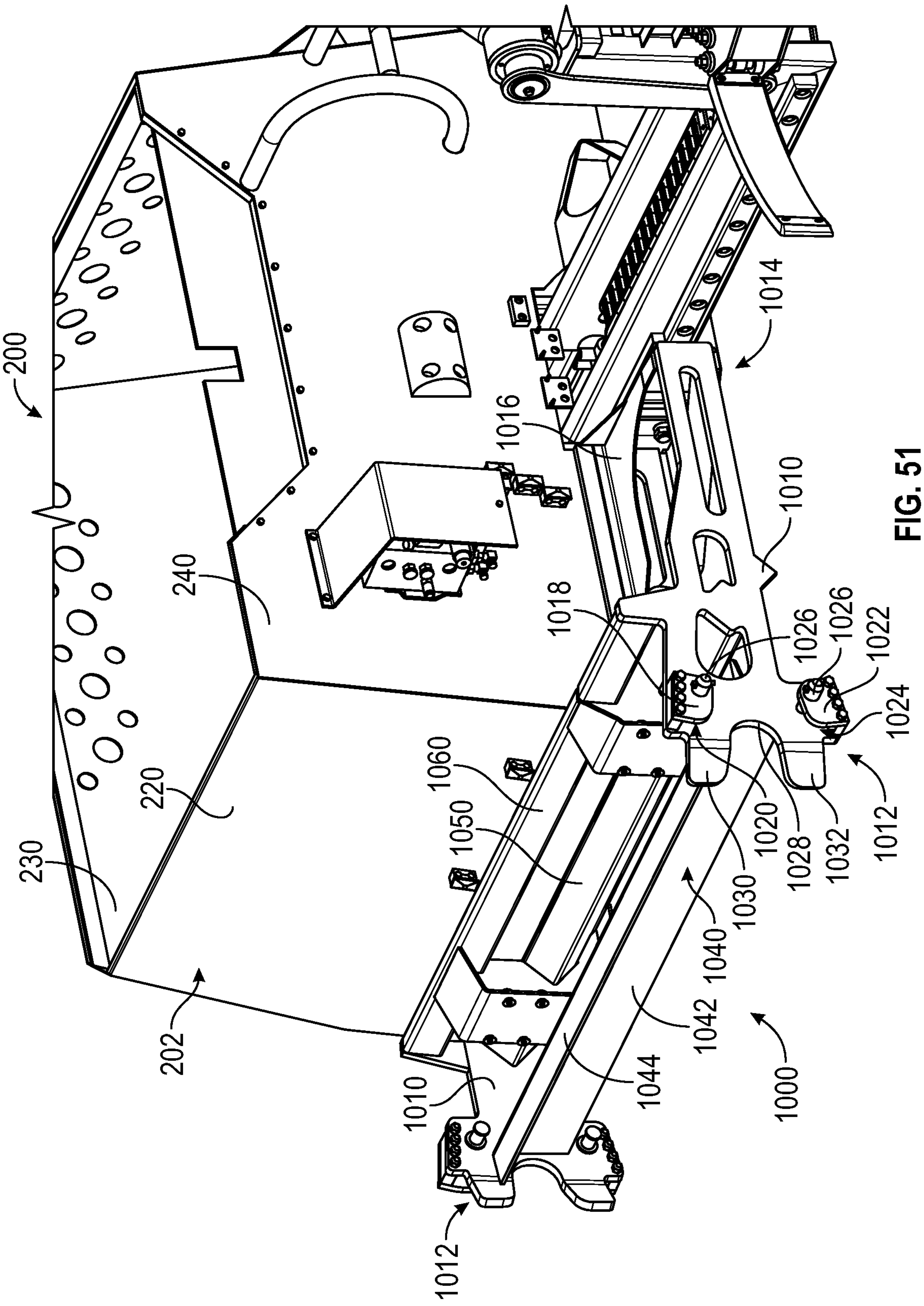
FIG. 51 is a rear perspective view of the first attachment, according to another exemplary embodiment.

As shown in FIGS. 51-55, the attachment interface 1000 of the container attachment 200 includes a pair of plates or arms, shown as support arms 1010. Each of the support arms 1010 has a first end or rear end, shown as coupling end 1012, and opposing second end or front end, shown as engagement end 1014, coupled to the refuse container 202. As shown in FIGS. 52 and 53, a first one of the support arms 1010 (e.g., a left support arm) is coupled to and flush with the first sidewall 230 of the refuse container 202. As shown in FIG. 51, a second one of the support arms 1010 (e.g., a right support arm) is coupled to and spaced laterally outward from the second sidewall 240 of the refuse container 202 by an extension or spacer, shown as spacer bracket 1016. In some embodiments, the attachment interface 1000 does not include the spacer bracket 1016, but rather the second one of the support arms 1010 is coupled to and flush with the second sidewall 240 (see, e.g., FIG. 57). In other embodiments, the support arms 1010 are not coupled to the refuse container 202, but rather the engagement ends 1014 have curved or hooked ends to form forks of the fork attachment 300 (see, e.g., FIG. 58).

As shown in FIGS. 51-54, the attachment interface 1000 includes (i) a first cross member, shown as engagement bracket 1040, that extends between the inward facing surfaces of the support arms 1010 at the coupling end 1012 thereof, (ii) a second cross member, shown as support bar 1050, that extends between the inward facing surfaces of the support arms 1010 at a position between the coupling end 1012 and the engagement end 1014 of the support arms 1010, and (iii) a third cross member, shown as support bar 1060, that (a) extends between the inward facing surfaces of the support arms 1010 at a position between the coupling end 1012 and the engagement end 1014 of the support arms 1010 and (b) is positioned above the support bar 1050. According to an exemplary embodiment, the support bar 1050 and/or the support bar 1060 are coupled (e.g., welded, etc.) to the rear wall 220 of the refuse container 202. As shown in FIGS. 51 and 54, the engagement bracket 1040 includes a first plate, shown as front plate 1042, and a second plate, shown as top plate 1044, extending rearward from an upper end of the front plate 1042. According to an exemplary embodiment, the top plate 1044 is perpendicular to or substantially perpendicular to the front plate 1042 such that the engagement bracket 1040 has a generally "L-shaped" structure. In some embodiments, the top plate 1044 extends at an upward angle from the upper end of the front plate 1042. In other embodiments, the engagement bracket 1040 does not include one of the front plate 1042 or the top plate 1044. As shown in FIG. 54, the front plate 1042 and the top plate 1044 are configured to engage with the profile 914 of the guide plates 910. According to an exemplary embodiment, the profile 914 is sized and shaped to vertically orient the attachment interface 1000 and provide a consistent depth of insertion with respect to the attachment interface 900 to facilitate proper interfacing with the attachment interface 900 of the attachment assembly 100.

As shown in FIGS. 51-55, the coupling end 1012 of each of the support arms 1010 includes (i) a first support, shown as upper bracket 1018, coupled to and extending laterally outward from an upper end portion of the coupling end 1012 of each of the support arms 1010 and (ii) a second support, shown as lower bracket 1022, coupled to and extending laterally outward from a lower end portion of the coupling end 1012 of each of the support arms 1010. The upper bracket 1018 and the coupling end 1012 of each of the support arms 1010 define a first channel, shown as upper channel 1020. The lower bracket 1022 and the coupling end 1012 of each of the support arms 1010 define a second channel, shown as lower channel 1024. As shown in FIGS. 51, 54, and 55, (i) the upper portion of the coupling end 1012 of each of the support arms 1010 and each of the upper brackets 1018 and (ii) the lower portion of the coupling end 1012 of each of the support arms 1010 and each of the lower brackets 1022 cooperatively define a plurality of apertures, shown as coupling apertures 1026.

As shown in FIGS. 53-55, the upper channels 1020 of the upper brackets 1018 selectively receive the upper extensions 924 of the connecting plates 920 and the lower channels 1024 of the lower brackets 1022 selectively receive the lower extensions 926 of the connecting plates 920. According to an exemplary embodiment, the upper brackets 1018 and the lower brackets 1022 are oriented (e.g., angled toward each other, sloped downward, etc.) to correspond with the tapered or sloped profile of the upper extensions 924 and the lower extensions 926 of the connecting plates 920. The orientation of the upper brackets 1018 and the lower brackets 1022 prevents over-insertion of the connecting plates 920 therein such that the coupling apertures 928 of the connecting plates 920 and the coupling apertures 1026 of the support arms 1010 properly align. As shown in FIGS. 53-55, the coupling apertures 928 of the attachment interface 900 and the coupling apertures 1026 of the attachment interface 1000 selectively receive a plurality of fasteners (e.g., bolts, pins, etc.), shown as pins 930, to selectively secure the attachment interface 1000 to the attachment interface 900 and, thereby, the desired attachment to the attachment assembly 100.

As shown in FIGS. 51, 54, and 55, a rear edge of the coupling end 1012 of the support arms 1010 defines a cutout, shown as tube notch 1028. As shown in FIGS. 54 and 55, the tube notch 1028 of the support arms 1010 interfaces with and receives at least a portion of the main tube 110 when the attachment interface 1000 engages with the attachment interface 900. As shown in FIGS. 51, 54, and 55, the coupling end 1012 of each of the support arms 1010 includes (i) a first guide member, shown as upper guide flange 1030, that is coupled to and extends rearward from the rear edge and above the tube notch 1028 of the coupling end 1012 of each of the support arms 1010 and (ii) a second guide member, shown as lower guide flange 1032, that is coupled to and extends rearward from the rear edge and below the tube notch 1028 of the coupling end 1012 of each of the support arms 1010. According to the exemplary embodiment shown in FIGS. 51, 54, and 55, the upper guide flanges 1030 and the lower guide flanges 1032 are angled or slant inward toward a center axis of the container attachment 200. According to an exemplary embodiment, the upper guide flanges 1030 and the lower guide flanges 1032 are configured to engage with the connecting plates 920 as the attachment interface 1000 is being interfaced with the attachment interface 900 to laterally orient and guide the attachment interface 1000 with respect to the attachment interface 900 to facilitate proper interfacing with the attachment interface 900 of the attachment assembly 100.

As shown in FIGS. 53-55, the attachment interface 900 of the attachment assembly 100 is configured to releasably receive and interface with the attachment interface 1000 to facilitate selectively coupling a desired attachment (e.g., the container attachment 200, a fork attachment, a plow attachment, a bucket attachment, a street sweeper attachment, a grabber attachment, a cart tipper attachment, etc.) to the vehicle 10. Specifically, (i) the front plate 1042 and the top plate 1044 of the engagement bracket 1040 are configured to interface with the profile 914 of the guide plates 910 and (ii) the upper brackets 1018 and the lower brackets 1022 are configured to slide onto and interface with the upper extensions 924 and the lower extensions 926 of the connecting plates 920 such that the coupling apertures 928 and the coupling apertures 1026 align to receive the pins 930 to selectively secure the attachment interface 1000 to the attachment interface 900 and, thereby, the desired attachment to the attachment assembly 100.

Figure 56:
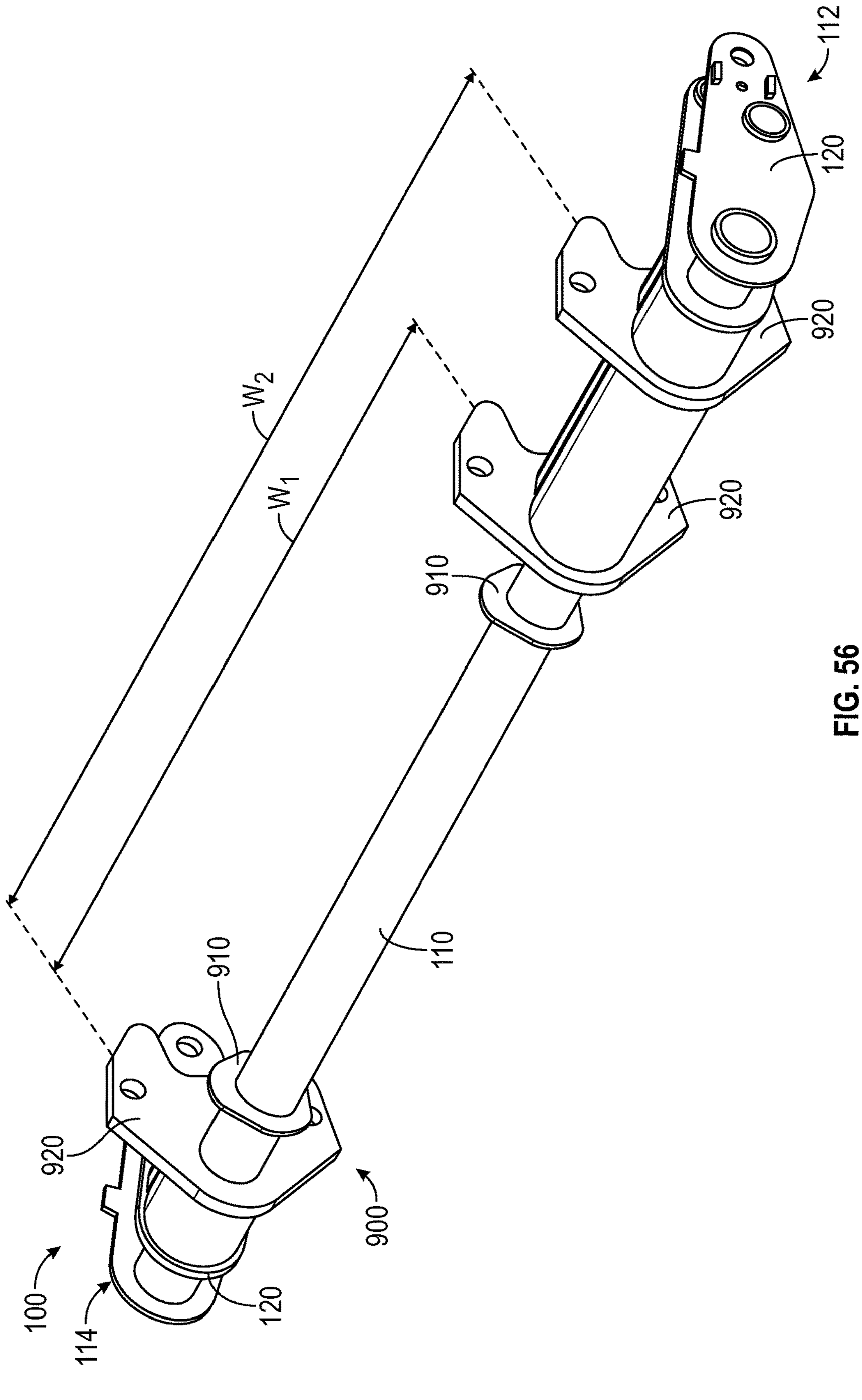
FIG. 56 is a rear perspective view of the attachment assembly of FIG. 50, according to an alternative embodiment.
Figure 57:
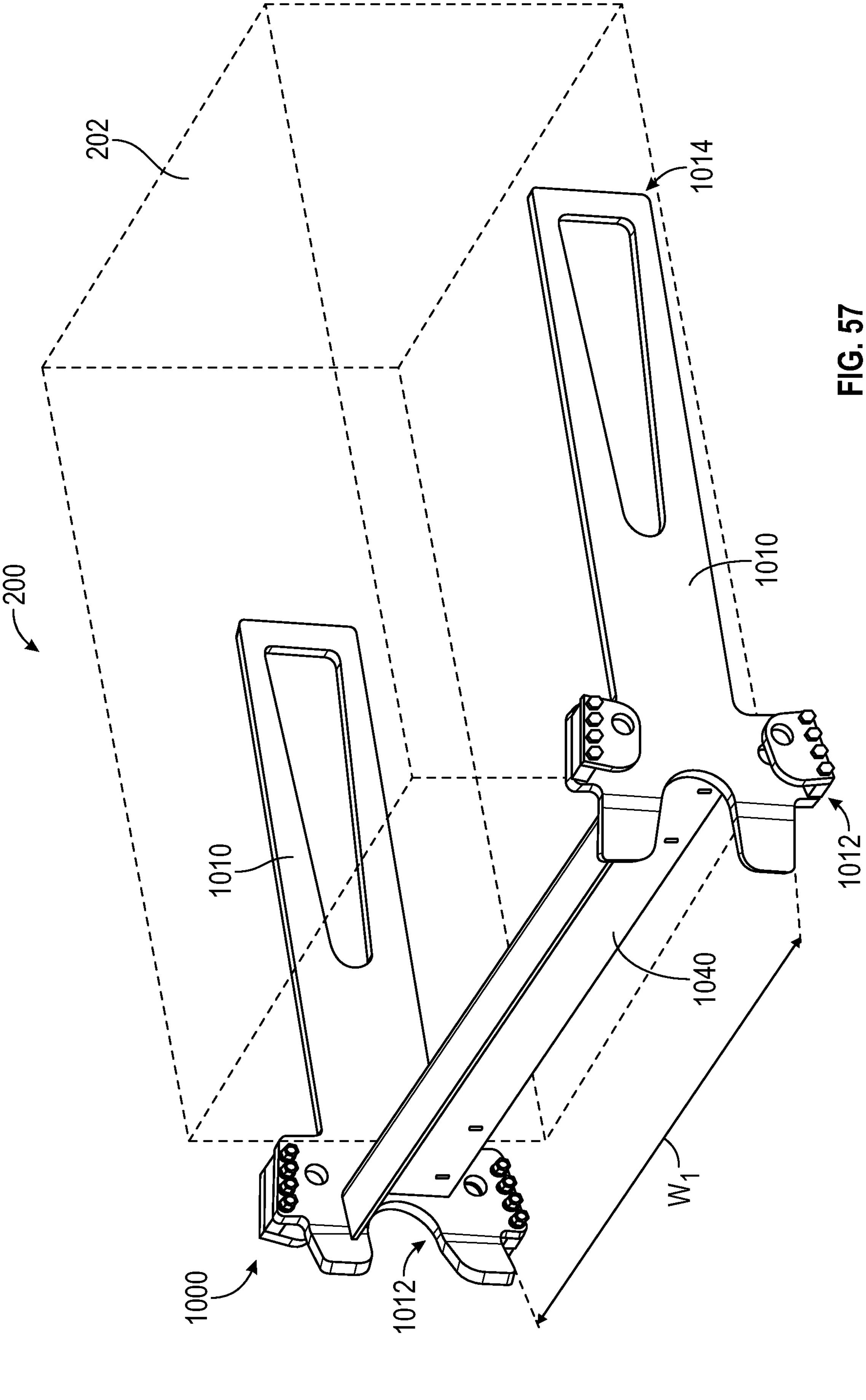
FIG. 57 is a rear perspective view of the first attachment of FIG. 51, according to an alternative embodiment.
Figure 58:
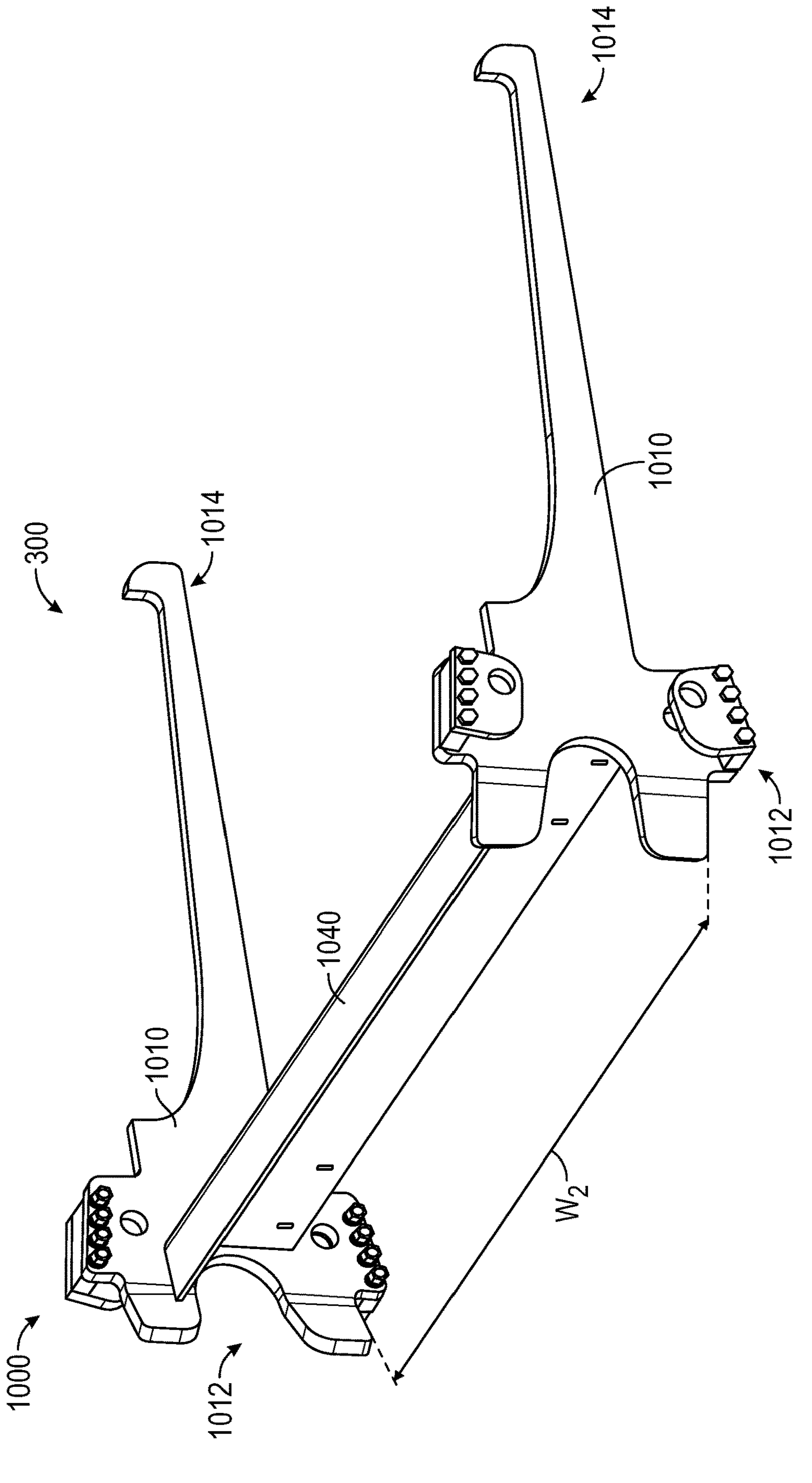
FIG. 58 is a rear perspective view of the second attachment, according to another exemplary embodiment.
Figure 59:
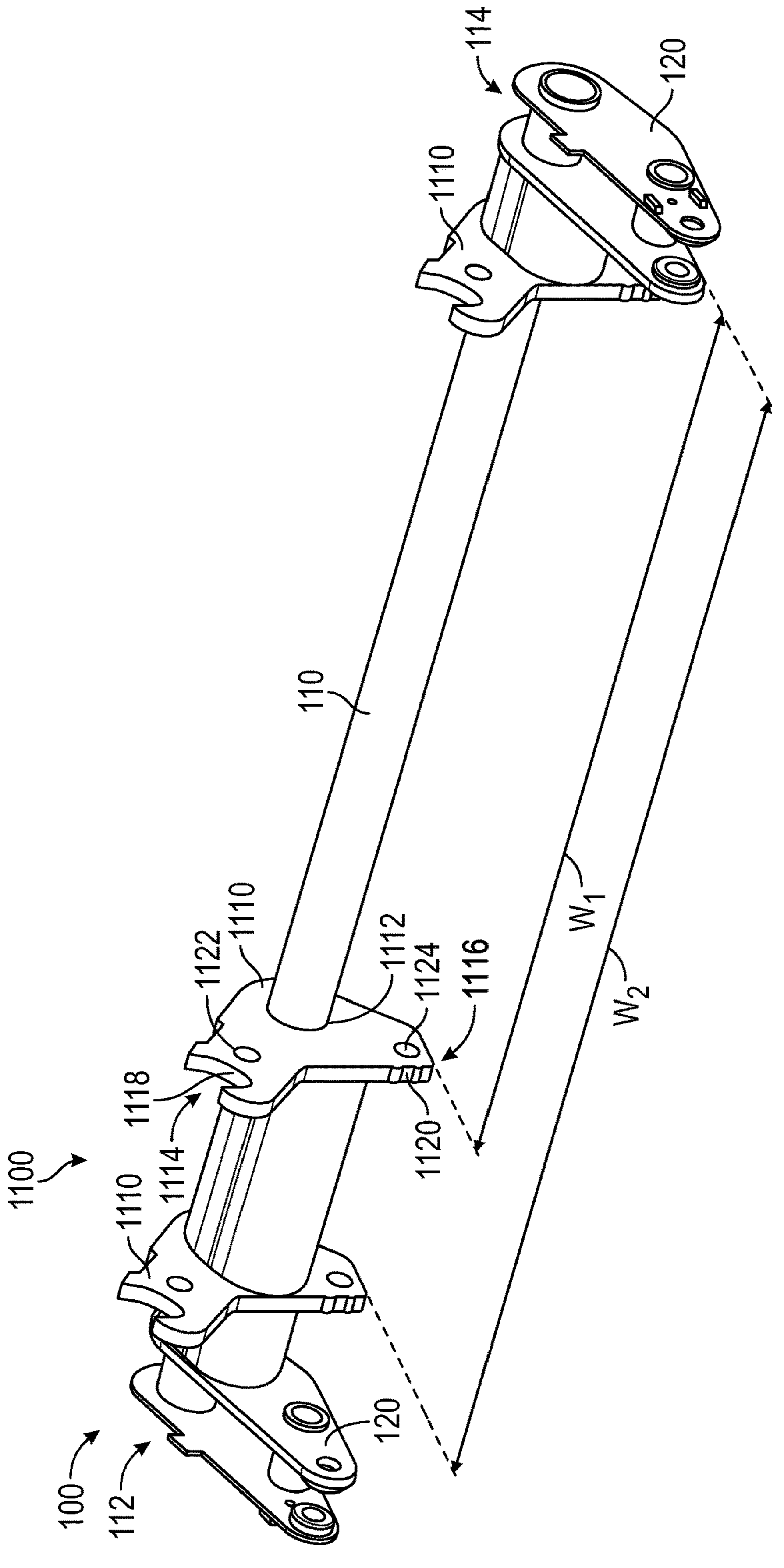
FIG. 59 is a perspective view of an attachment assembly of a refuse vehicle, according to another exemplary embodiment.

According to the exemplary embodiment shown in FIG. 56, the attachment interface 900 of the attachment assembly 100 includes a third or middle connecting plate 920 positioned along the main tube 110 between (i) the right connecting plate 920 positioned proximate the right end 112 of the main tube 110 and (ii) the left connecting plate 920 positioned proximate the left end 114 of the main tube 110 (e.g., offset closer to the right end 112 than the left end 114) such that (a) the left connecting plate 920 and the middle connecting plate 920 are spaced a first distance or width $w_1$ apart and (b) the right connecting plate 920 and the left connecting plate 920 are spaced a second distance or width $w_2$ apart that is greater than the width $w_1$. As shown in FIG. 57, the attachment interface 1000 of the container attachment 200 has the width $w_1$ such that the container attachment 200 can be selectively secured to the attachment assembly 100 using the left connecting plate 920 and the middle connecting plate 920. As shown in FIG. 58, the attachment interface 1000 of the fork attachment 300 has the width $w_2$ such that the fork attachment 300 can be selectively secured to the attachment assembly 100 using the right connecting plate 920 and the left connecting plate 920. Accordingly, the left connecting plate 920, the right connecting plate 920, and the middle connecting plate 920 facilitate coupling different width attachments to the vehicle 10.

According to the exemplary embodiment shown in FIGS. 59-69, (i) the attachment assembly 100 does not include the coupling tube 140, the attachment plate 150, the support plates 160, the couplers 170, the attachment interface 700, or the attachment interface 900, (ii) the container attachment 200 (e.g., a carry can attachment) does not include the attachment interface 280, the attachment interface 290, the attachment interface 800, or the attachment interface 1000, and (iii) the fork attachment 300 does not include the fork hooks 322, the attachment interface 330, the attachment interface 800, or the attachment interface 1000. Rather, (i) the attachment assembly 100 includes an alternative attachment interface, shown as attachment interface 1100, and (ii) the container attachment 200 and the fork attachment 300 include another alternative or fifth interface, shown as attachment interface 1200. As described in more detail herein, the attachment interface 1100 and the attachment interface 1200 are configured to facilitate selectively and releasably coupling the container attachment 200 and the fork attachment 300 to the attachment assembly 100 and, thereby, the refuse vehicle 10.

As shown in FIGS. 59 and 64-67, the attachment interface 1100 of the attachment assembly 100 includes a plurality of brackets or interfaces, shown as connecting plates 1110, coupled to the main tube 110. The connecting plates 1110 include (1) a first or right connecting plate 1110 positioned proximate the right bracket 120 positioned at the right end 112 of the main tube 110, (2) a second or left connecting plate 1110 positioned proximate the left bracket 120 positioned at the left end 114 of the main tube 110, and (3) a third or middle connecting plate 1110 positioned along the main tube 110 between (a) the right connecting plate 1110 positioned proximate the right end 112 of the main tube 110 and (b) the left connecting plate 1110 positioned proximate the left end 114 of the main tube 110 (e.g., offset closer to the right end 112 than the left end 114) such that (i) the left connecting plate 1110 and the middle connecting plate 1110 are spaced a first distance or width $w_1$ apart and (ii) the right connecting plate 1110 and the left connecting plate 1110 are spaced a second distance or width $w_2$ apart that is greater than the width $w_1$. While shown as including three connecting plates 1110, the attachment assembly 100 may include a different number of the connecting plates 1110 (e.g., two, similar to the attachment interface 900, etc.). According to an exemplary embodiment, the main tube 110, the brackets 120, and/or the connecting plates 1110 form a single weldment. In other embodiments, one or more components of the attachment assembly 100 are otherwise coupled together (e.g., fastened, adhesively coupled, etc.).

As shown in FIGS. 59 and 64-67, a first end (e.g., a rear end, etc.) of each of connecting plates 1110 defines an aperture, shown as main aperture 1112, that receives the main tube 110 to couple the connecting plates 1110 to the main tube 110. An opposing second end (e.g., a front end, etc.) of each of the connecting plates 1110 includes a first interface, shown as upper interface 1114, and a second interface, shown as lower interface 1116, positioned at the upper and lower ends thereof, respectively. The upper interface 1114 (*i*) includes a latch, shown as hook 1118, and (ii) defines a first aperture, shown as upper coupling aperture 1122. The lower interface 1116 (*i*) includes a stop, shown as bumper 1120, that defines a recess, dimple, or groove and (ii) defines a second aperture, shown as lower coupling aperture 1124.

Figure 60:
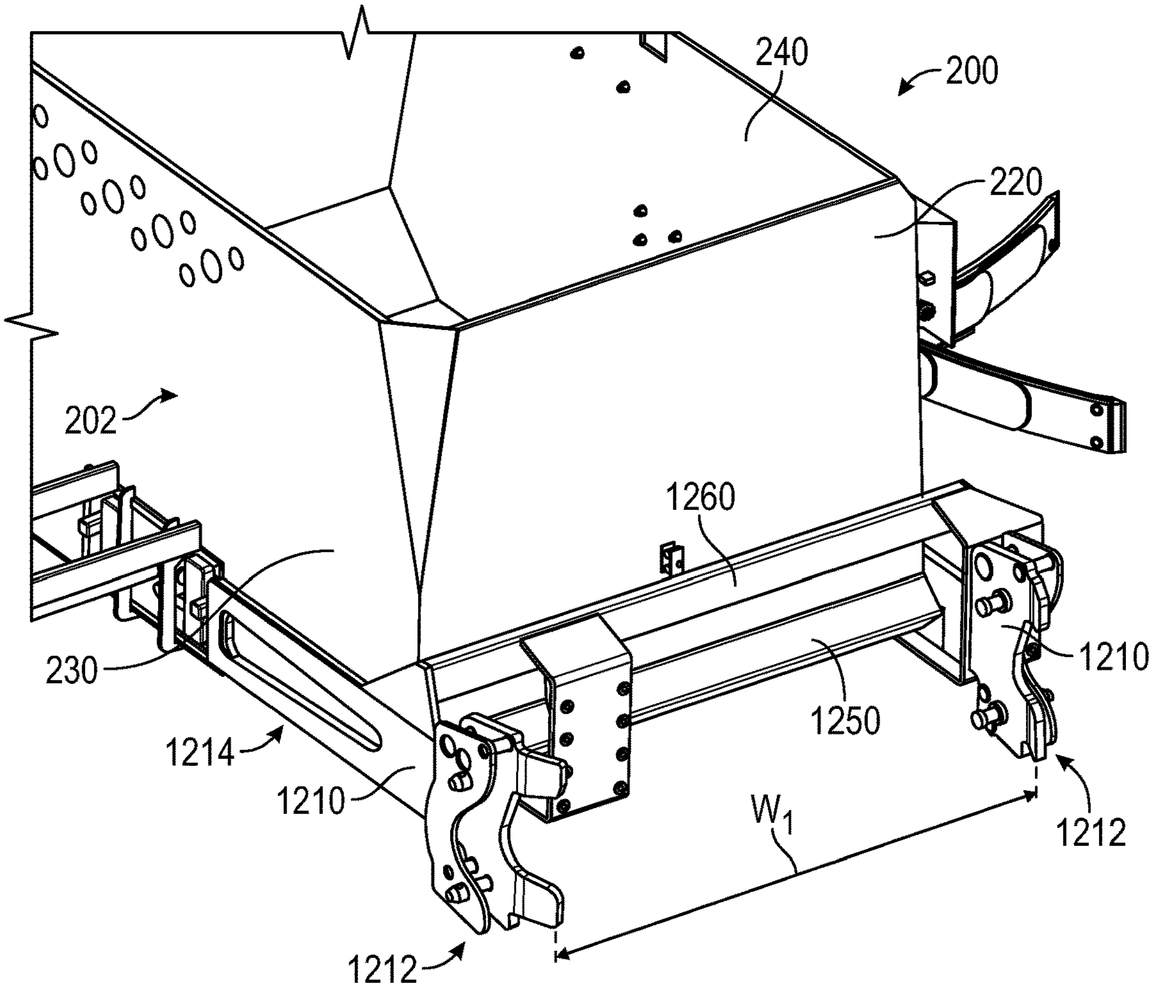
FIG. 60 is a rear perspective view of the first attachment, according to another exemplary embodiment.

As shown in FIGS. 60-62 and 64-67, the attachment interface 1200 of the container attachment 200 includes a pair of plates or arms, shown as support arms 1210. Each of the support arms 1210 has a first end, shown as coupling end 1212, and opposing second end, shown as engagement end 1214, coupled to the refuse container 202. As shown in FIGS. 60 and 64-66, (i) a first one of the support arms 1210 (e.g., a left support arm) is coupled to and flush with the first sidewall 230 of the refuse container 202 and (ii) a second one of the support arms 1210 (e.g., a right support arm, etc.) is coupled to and flush with the second sidewall 240. As shown in FIG. 60, the support arms 1210 of the attachment interface 1200 of the container attachment 200 are spaced the width $w_1$ apart such that the container attachment 200 can be selectively secured to the attachment assembly 100 using the left connecting plate 1110 and the middle connecting plate 1110. In other embodiments, at least one of the support arms 1210 is coupled to and spaced laterally outward from the first sidewall 230 and/or the second sidewall 240 of the refuse container 202 by an extension or spacer (e.g., the spacer bar 812, the spacer bracket 1016, etc.). In such embodiments, the support arms 1210 of the attachment interface 1200 of the container attachment 200 are spaced the width $w_2$ apart such that the container attachment 200 can be selectively secured to the attachment assembly 100 using the right connecting plate 1110 and the left connecting plate 1110.

Figure 63:
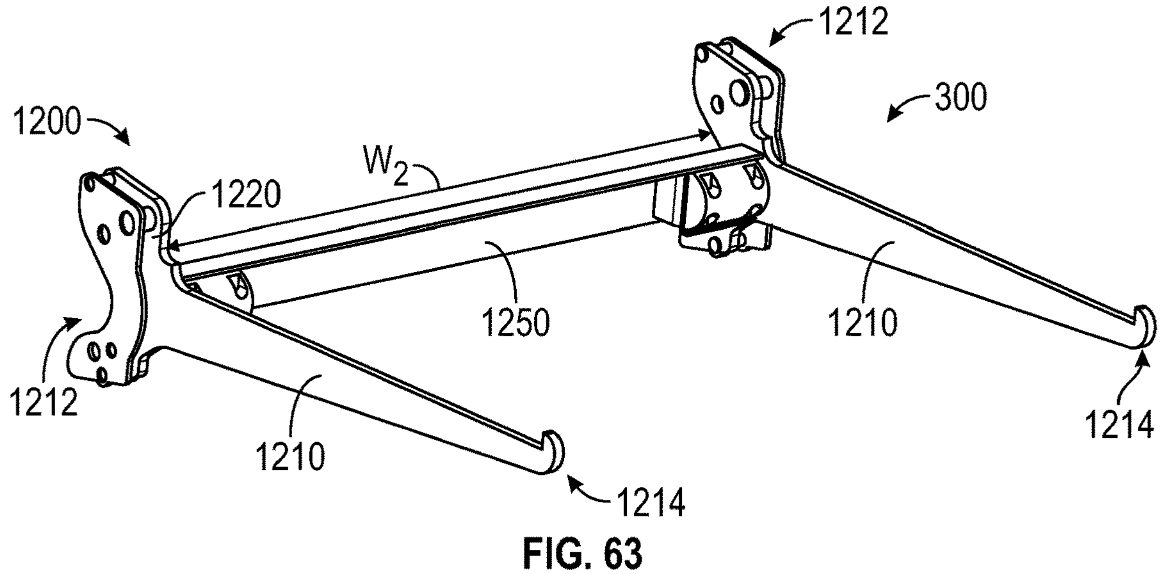
FIG. 63 is a front perspective view of the second attachment, according to another exemplary embodiment.

As shown in FIG. 63, the support arms 1210 are not coupled to the refuse container 202, but rather the engagement ends 1214 have curved or hooked ends to form forks of the fork attachment 300. The support arms 1210 of the attachment interface 1200 of the fork attachment 300 are spaced the width $w_2$ apart such that the fork attachment 300 can be selectively secured to the attachment assembly 100 using the right connecting plate 1110 and the left connecting plate 1110. Accordingly, the left connecting plate 1110, the right connecting plate 1110, and the middle connecting plate 1110 facilitate coupling different width attachments to the vehicle 10.

As shown in FIG. 60, the attachment interface 1200 of the container attachment 200 includes (i) a first cross member, shown as support bar 1250, that extends between the inward facing surfaces of the support arms 1210 at a position between the coupling end 1212 and the engagement end 1214 of the support arms 1210, and (ii) a second cross member, shown as support bar 1260, that (a) extends between the inward facing surfaces of the support arms 1210 at a position between the coupling end 1212 and the engagement end 1214 of the support arms 1210 and (b) is positioned above the support bar 1250. According to an exemplary embodiment, the support bar 1250 and/or the support bar 1260 are coupled (e.g., welded, etc.) to the rear wall 220 of the refuse container 202. As shown in FIG. 63, the attachment interface 1200 of the fork attachment 300 does not include the support bar 1260, but only includes the support bar 1250.

Figure 61:
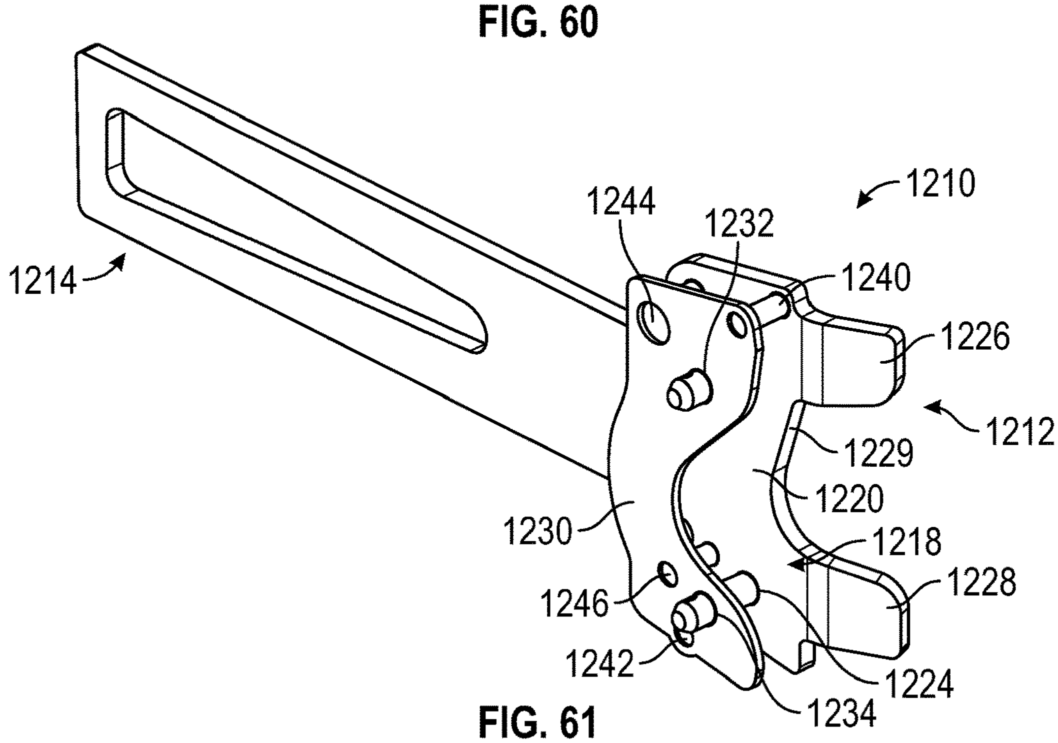
FIGS. 61 and 62 are various detailed views of an attachment interface of the first attachment of FIG. 60, according to an exemplary embodiment.
Figure 62:
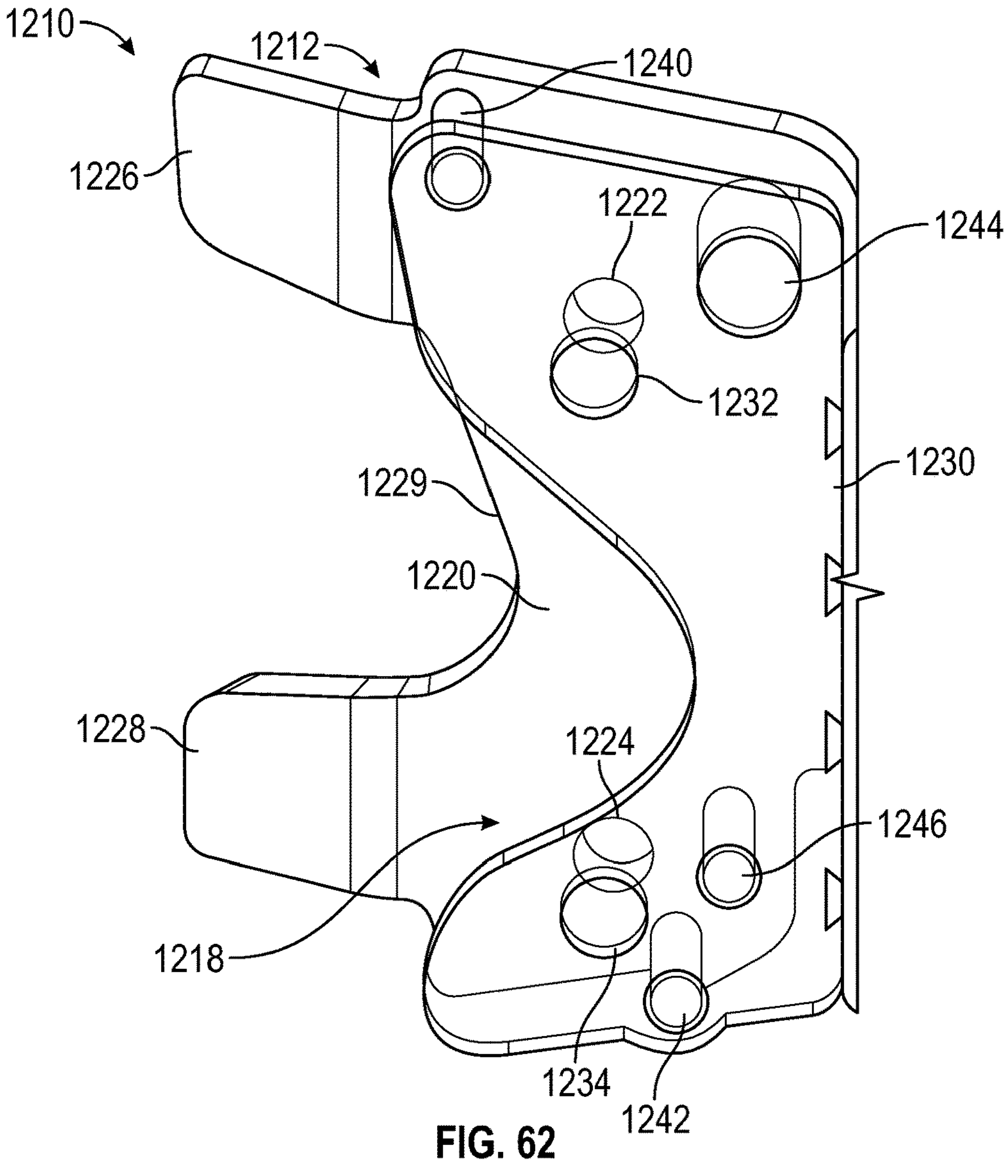

As shown in FIGS. 61 and 62, the coupling end 1212 of each of the support arms 1210 includes (i) a first plate, shown as inner plate 1220, that is integral with the rest of the support arm 1210, and (ii) a second plate, shown as outer plate 1230, spaced laterally outward from and coupled to the inner plate 1220, defining a channel, shown as slot 1218, therebetween. The inner plate 1220 defines (i) a first aperture, shown as upper coupling aperture 1222, positioned proximate an upper end of the inner plate 1220 and (ii) a second aperture, shown as lower coupling aperture 1224, positioned proximate a lower end of the inner plate 1220. The outer plate 1230 defines (i) a first aperture, shown as upper coupling aperture 1232, positioned proximate an upper end of the outer plate 1230 and that aligns with the upper coupling aperture 1222 of the inner plate 1220 and (ii) a second aperture, shown as lower coupling aperture 1234, positioned proximate a lower end of the outer plate 1230 and that aligns with the lower coupling aperture 1224 of the inner plate 1220.

As shown in FIGS. 61 and 62, the coupling end 1212 of each of the support arms 1210 includes (i) a first coupler, shown as upper coupling pin 1240, extending between the inner plate 1220 and the outer plate 1230 at a rear, upper end thereof, (ii) a second coupler, shown as lower coupling pin 1242, extending between the inner plate 1220 and the outer plate 1230 at lower end thereof, (iii) a third coupler, shown as catch pin 1244, extending between the inner plate 1220 and the outer plate 1230 at a forward, upper end thereof, and (iv) a fourth coupler, shown as stop pin 1246, extending between the inner plate 1220 and the outer plate 1230 at a position above, but proximate, the lower coupling pin 1242. In some embodiments, the coupling end 1212 includes a greater or fewer number of coupling pins.

As shown in FIGS. 61 and 62, the inner plates 1220 includes (i) a first guide member, shown as upper guide flange 1226, extending rearward from an upper, rear edge thereof and (ii) a second guide member, shown as lower guide flange 1228, extending rearward from a lower, rear edge thereof. According to the exemplary embodiment shown in FIGS. 61 and 62, the upper guide flanges 1226 and the lower guide flanges 1228 are angled or slant inward toward a center axis of the container attachment 200. According to an exemplary embodiment, the upper guide flanges 1226 and the lower guide flanges 1228 are configured to engage with the connecting plates 1110 as the attachment interface 1200 is being interfaced with the attachment interface 1100 to laterally orient and guide the attachment interface 1200 with respect to the attachment interface 1100 to facilitate proper interfacing with the attachment interface 1100 of the attachment assembly 100. As shown in FIGS. 61 and 62, the rear edge of the inner plate 1220 defines a cutout, shown as tube notch 1229, positioned between the upper guide flange 1226 and the lower guide flange 1228. According to an exemplary embodiment, the tube notch 1229 of the support arms 1210 interfaces with and accommodates at least a portion of the main tube 110 when the attachment interface 1200 engages with the attachment interface 1100.

Figure 65:
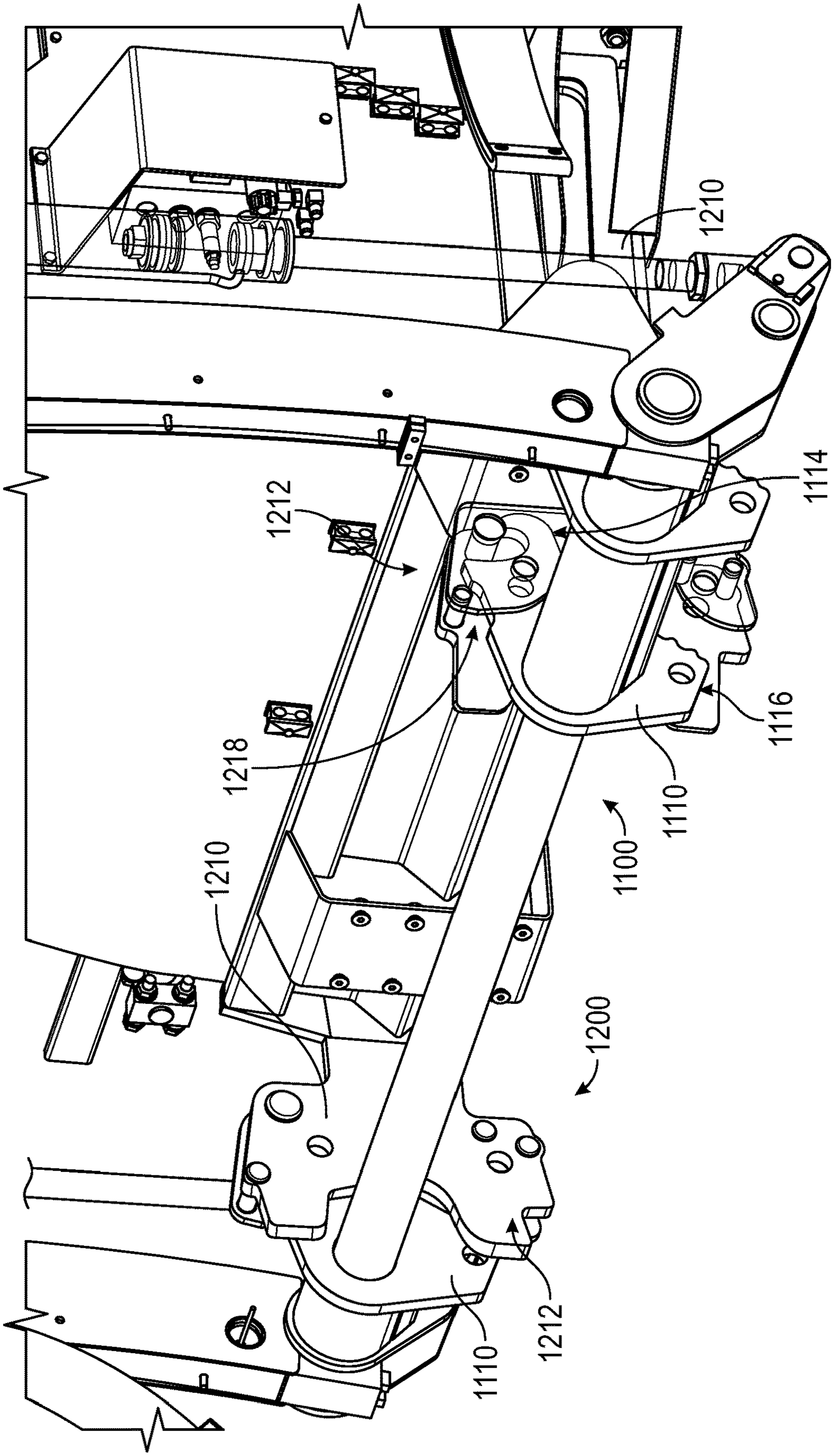
Figure 66:
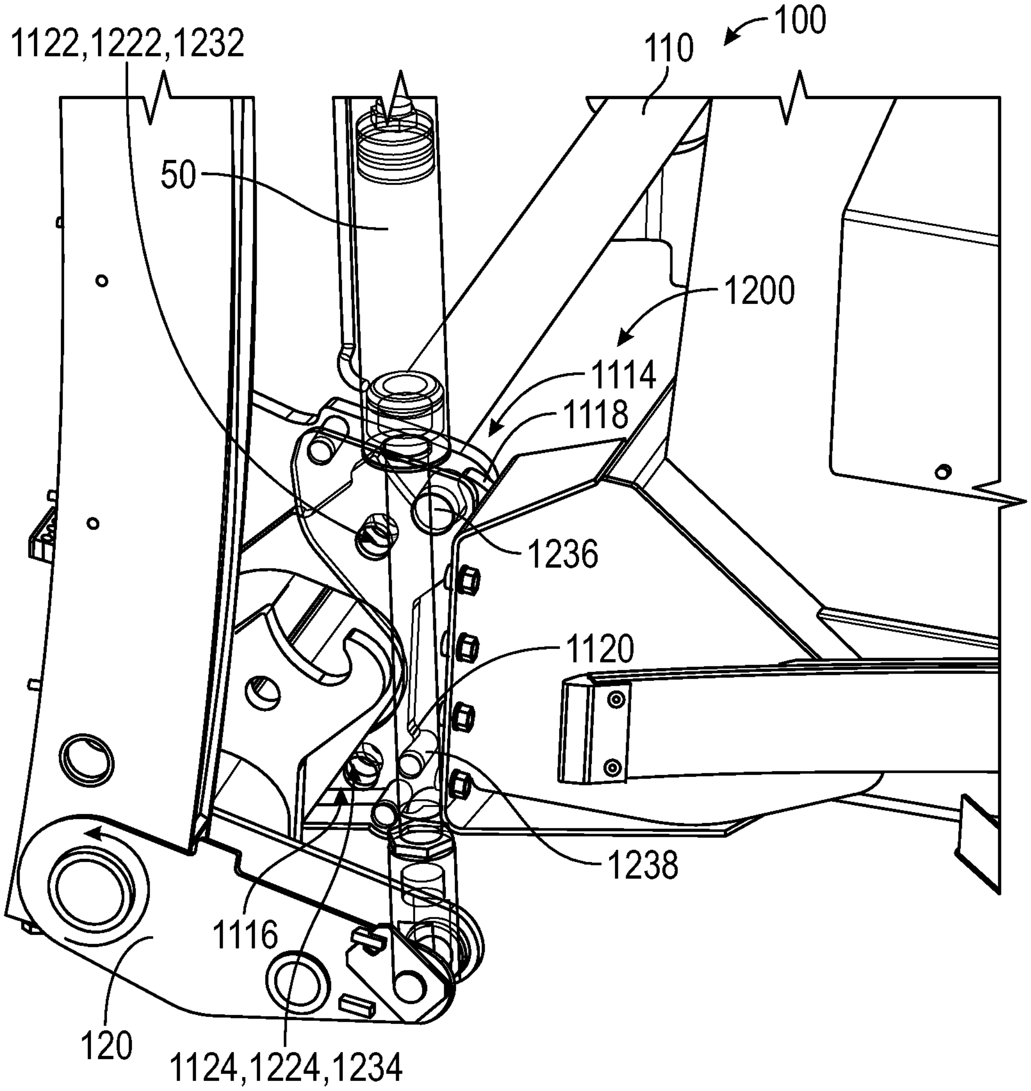
Figure 67:
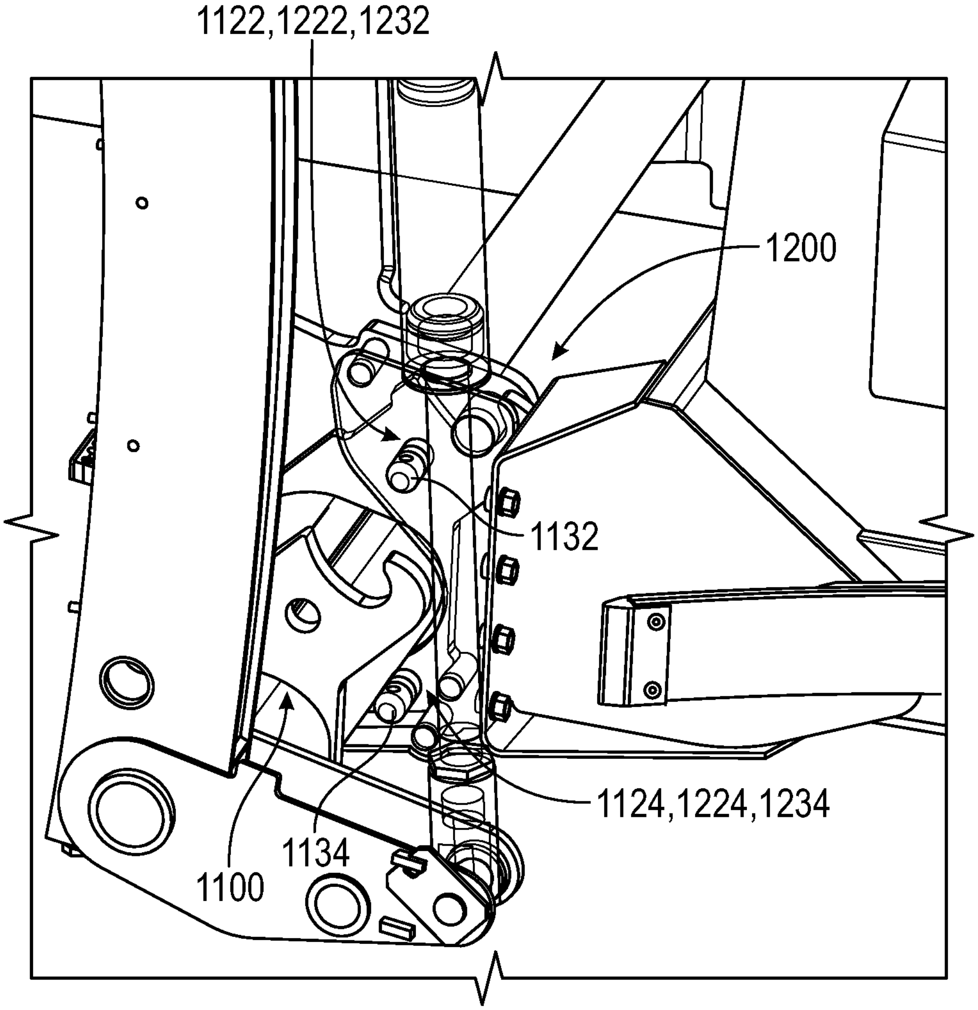

As shown in FIGS. 64-67, each of the slots 1218 of the coupling ends 1212 of the support arms 1210 selectively receives a respective one of the connecting plates 1110 such that (i) the upper coupling aperture 1122 aligns with the upper coupling aperture 1222 of the inner plate 1220 and the upper coupling aperture 1232 of the outer plate 1230 and (ii) the lower coupling aperture 1124 aligns with the lower coupling aperture 1224 of the inner plate 1220 and the lower coupling aperture 1234 of the outer plate 1230. As shown in FIG. 67, (i) each set of the upper coupling apertures 1122, the upper coupling apertures 1222, and the upper coupling apertures 1232 receives a first fastener (e.g., a bolt, a pin, etc.), shown as upper pin 1132, and (ii) each set of the lower coupling apertures 1124, the lower coupling apertures 1224, and the lower coupling apertures 1234 receives a second fastener, shown as lower pin 1134. The upper pin 1132 and the lower pin 1134 selectively secure the attachment interface 1200 to the attachment interface 1100 and, thereby, the desired attachment to the attachment assembly 100.

Figure 68:
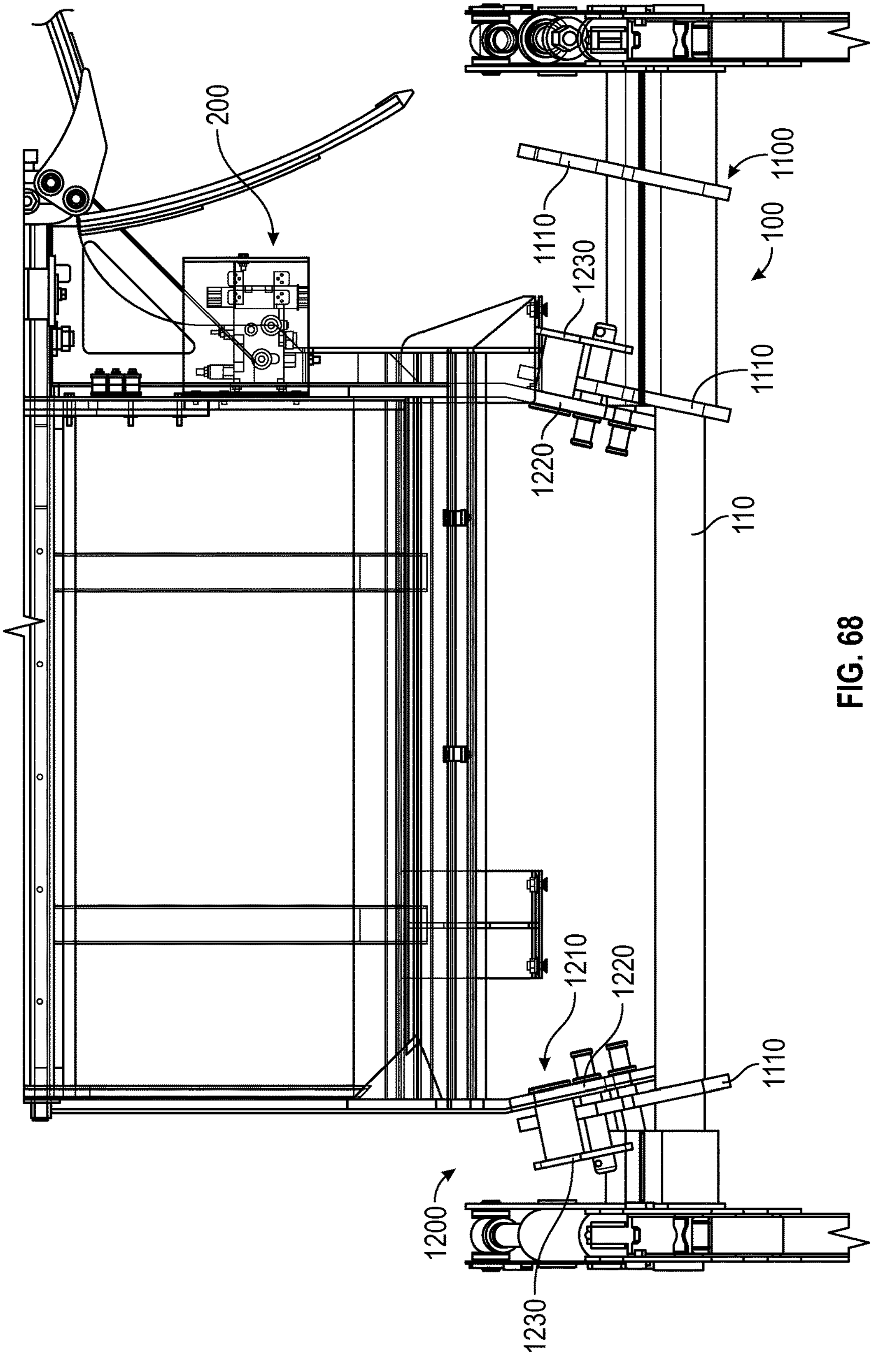
FIGS. 68 and 69 are various views of the attachment assembly of FIG. 59 and the first attachment, according to an alternative embodiment.
Figure 69:
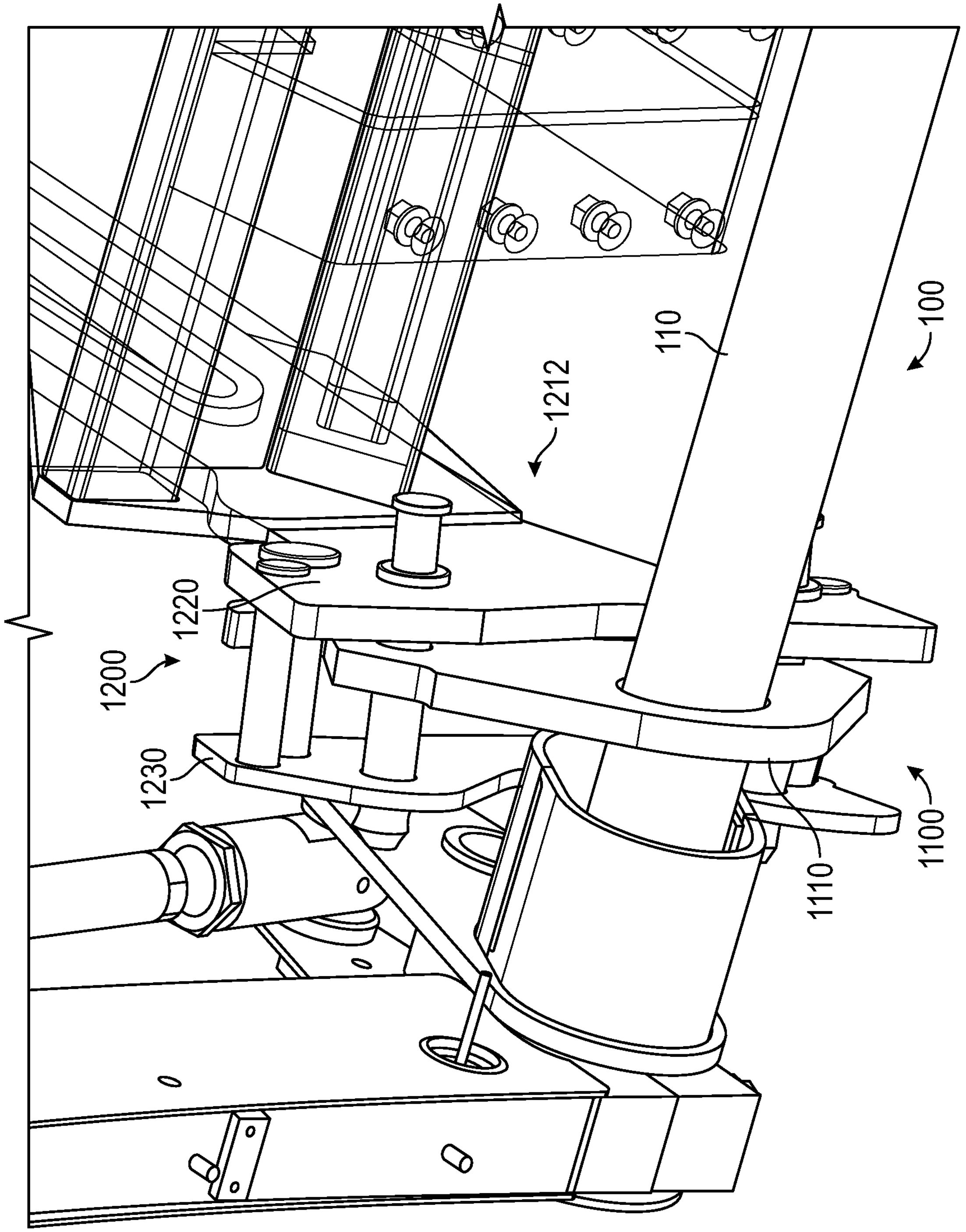

As shown in FIGS. 59-67, (i) the connecting plates 1110 of the attachment interface 1100 extend perpendicular to the main tube 110 and (ii) the inner plates 1220 and the outer plates 1230 of the coupling ends 1212 of the support arms 1210 of the attachment interface 1200 are substantially in-line with the remainder of the support arms 1210 (i.e., the support arms 1210 are straight or substantially straight). As shown in FIGS. 68 and 69, (i) the connecting plates 1110 of the attachment interface 1100 extend an outward angle (i.e., an obtuse angle) relative to the main tube 110 and (ii) the inner plates 1220 and the outer plates 1230 of the coupling ends 1212 of the support arms 1210 of the attachment interface 1200 extend at an inward angle (i.e., an acute angle) relative to the remainder of the support arms 1210. In other embodiments, (i) the connecting plates 1110 of the attachment interface 1100 extend an inward angle (i.e., an acute angle) relative to the main tube 110 and (ii) the inner plates 1220 and the outer plates 1230 of the coupling ends 1212 of the support arms 1210 of the attachment interface 1200 extend at an outward angle (i.e., an obtuse angle) relative to the remainder of the support arms 1210. According to an exemplary embodiment, the angles of (i) the connecting plates 1110 and (ii) the inner plates 1220 and the outer plates 1230 are supplementary angles. The angled arrangement of the attachment interface 1100 and the attachment interface 1200 may facilitate easier connection therebetween relative to a straight arrangement. Further, it should be understood that a similar angled arrangement may be applied to the various other attachment interfaces disclosed herein (e.g., the attachment interface 700, the attachment interface 800, the attachment interface 900, the attachment interface 1000, etc.).

Figure 64:
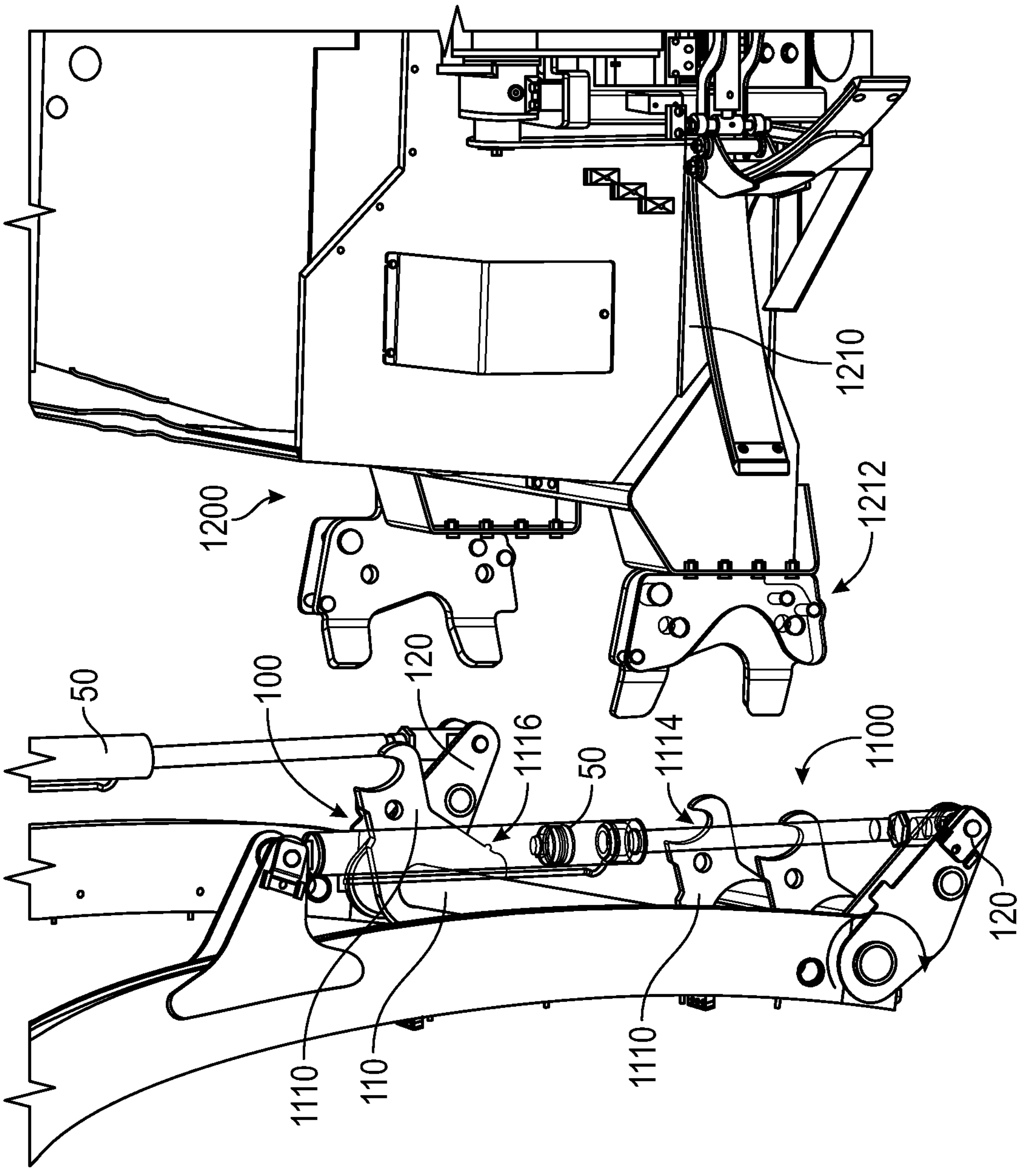
FIGS. 64-67 show various views of a process of engaging the attachment assembly of FIG. 59 with the first attachment of FIG. 60, according to an exemplary embodiment.

The process by which the attachment interface 1100 of the attachment assembly 100 interfaces with the attachment interface 1200 of the various attachments (e.g., the container attachment 200, the fork attachment 300, a plow attachment, a bucket attachment, a street sweeper attachment, a grabber attachment, a cart tipper attachment, etc.) is shown in FIGS. 64-67. First, as shown in FIG. 64, (i) the attachment interface 1100 of the attachment assembly is aligned with the attachment interface 1200 of the attachment (e.g., by repositioning the attachment, by driving the vehicle 10, etc.) and (ii) the articulation actuators 50 are controlled (e.g., extended, etc.) to pivot the brackets 120 downward and, thereby, rotate the main tube 110 such that the upper interfaces 1114 of the connecting plates 1110 pivot forward and the lower interfaces 1116 of the connecting plates 1110 pivot rearward. Second, as shown in FIG. 65, the connecting plates 1110 are inserted into the slots 1218 of the coupling ends 1212 of the support arms 1210 (e.g., by moving the attachment rearward, by driving the vehicle 10 forward, etc.). Third, as shown in FIG. 66, the articulation actuators 50 are controlled (e.g., retracted, etc.) to pivot the brackets 120 upward and, thereby, rotate the main tube 110 such that (i) the upper interfaces 1114 of the connecting plates 1110 pivot rearward and the hooks 1118 engage with the catch pins 1236, (ii) the lower interfaces 1116 of the connecting plates 1110 pivot forward and the recesses, dimples, or grooves of the bumpers 1120 engage with the stop pins 1238, (iii) the upper coupling apertures 1122, the upper coupling apertures 1222, and the upper coupling apertures 1232 align, and (iv) the lower coupling apertures 1124, the lower coupling apertures 1224, and the lower coupling apertures 1234 align. Lastly, as shown in FIG. 67, (i) the upper pins 1132 are inserted into the upper coupling apertures 1122, the upper coupling apertures 1222, and the upper coupling apertures 1232 and (ii) the lower pins 1134 are inserted into the lower coupling apertures 1124, the lower coupling apertures 1224, and the lower coupling apertures 1234 to secure the attachment interface 1200 to the attachment interface 1100 and, thereby, the desired attachment to the attachment assembly 100.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10, the attachment assembly 100, the container attachment 200, the fork attachment 300, the grabber attachment 400, the cart tipper attachment 500, the refuse container 600, and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An attachment assembly for a vehicle, the attachment assembly comprising:
- a lateral member; and
- an attachment interface configured to selectively engage with an attachment to facilitate releasably coupling the attachment to the vehicle, the attachment interface including:
  - a first connecting plate coupled to the lateral member proximate a first end of the lateral member; and
  - a second connecting plate coupled to the lateral member proximate an opposing second end of the lateral member;
  - wherein each of the first connecting plate and the second connecting plate includes (i) an upper interface positioned at an upper end thereof and (ii) a lower interface positioned at a lower end thereof;
  - wherein the upper interface of each of the first connecting plate and the second connecting plate defines a first aperture;
  - wherein the lower interface of each of the first connecting plate and the second connecting plate defines a second aperture; and
  - wherein the first connecting plate is configured to engage with a first interface of the attachment and the second connecting plate is configured to engage with a second interface of the attachment such that the first aperture and the second aperture of each of the first connecting plate and the second connecting plate align with corresponding apertures of the first interface and the second interface to removably receive a plurality of fasteners to selectively couple the attachment to the attachment interface.

2. The attachment assembly of claim 1, wherein the first connecting plate and the second connecting plate extend perpendicular to the lateral member.

3. The attachment assembly of claim 1, wherein the first connecting plate and the second connecting plate extend at an outward angle relative to the lateral member and away from one another.

4. The attachment assembly of claim 1, further comprising a third connecting plate coupled to the lateral member between the first connecting plate and the second connecting plate.

5. The attachment assembly of claim 4, further comprising:
- a first attachment that selectively engages with the first connecting plate and the second connecting plate; and
- a second attachment that selectively engages with the first connecting plate and the third connecting plate.

6. The attachment assembly of claim 1, wherein the upper interface includes a first portion that extends forward from the upper end and the lower interface includes a second portion that extends forward from the lower end.

7. The attachment assembly of claim 6, wherein the first portion of the upper interface and the second portion of the lower interface have a tapered or sloped profile.

8. An attachment assembly for a vehicle, the attachment assembly comprising:
- an attachment including:
  - a first arm having a first arm end and an opposing second arm end;
  - a second arm having a third arm end and an opposing fourth arm end; and
  - a cross-member extending between the first arm and the second arm;
- a lateral member; and
- an attachment interface configured to selectively engage with the attachment to facilitate releasably coupling the attachment to the vehicle, the attachment interface including:
  - a first connecting plate coupled to the lateral member proximate a first end of the lateral member; and
  - a second connecting plate coupled to the lateral member proximate an opposing second end of the lateral member;
- wherein:

each of the first connecting plate and the second connecting plate includes (i) an upper interface positioned at an upper end thereof and (ii) a lower interface positioned at a lower end thereof;

the upper interface of each of the first connecting plate and the second connecting plate defines a first aperture;

the lower interface of each of the first connecting plate and the second connecting plate defines a second aperture;

the upper interface includes a first portion that extends forward from the upper end and the lower interface includes a second portion that extends forward from the lower end;

each of the first arm end of the first arm and the third arm end of the second arm includes (i) a first support coupled to and extending laterally from an upper portion thereof and (ii) a second support coupled to and extending laterally from a lower portion thereof;

the first support defines (i) a first channel that selectively receives the first portion of the upper interface and (ii) a third aperture that selectively aligns with the first aperture to receive a first pin; and the second support defines (i) a second channel that selectively receives the second portion of the lower interface and (ii) a fourth aperture that selectively aligns with the second aperture to receive a second pin.

9. The attachment assembly of claim 8, wherein the upper interface and the lower interface have a tapered or sloped profile, and wherein the first support and the second support are angled to correspond with the tapered or sloped profile.

10. The attachment assembly of claim 8, wherein the opposing second arm end of the first arm and the opposing fourth arm end of the second arm are curved or have hooks such that the first arm and the second arm are fork arms.

11. The attachment assembly of claim 8, wherein the attachment includes a container, and wherein the opposing second arm end of the first arm and the opposing fourth arm end of the second arm are coupled to the container.

12. The attachment assembly of claim 8, wherein the cross-member has a L-shaped structure, wherein the attachment interface includes a guide positioned along the lateral member between the first connecting plate and the second connecting plate, and wherein the cross-member is configured to engage with a profile of the guide when the attachment engages with the attachment interface.

13. The attachment assembly of claim 8, wherein a rear edge of each of the first arm end of the first arm and the third arm end of the second arm includes (i) a first guide flange extending rearward from the rear edge at the upper portion, (ii) a second guide flange extending rearward from the rear edge at the lower portion, and (iii) a notch positioned between the first guide flange and the second guide flange that selectively receives at least a portion of the lateral member, and wherein the first guide flange and the second guide flange are angled toward a center of the attachment.

14. The attachment assembly of claim 1, wherein the upper interface includes a hook and the lower interface includes a bumper.

15. An attachment assembly for a vehicle, the attachment assembly comprising:

a lateral member;

an attachment interface including:

a first connecting plate coupled to the lateral member proximate a first end of the lateral member; and a second connecting plate coupled to the lateral member proximate an opposing second end of the lateral member;

wherein each of the first connecting plate and the second connecting plate includes (i) an upper interface positioned at an upper end thereof and (ii) a lower interface positioned at a lower end thereof, wherein the upper interface includes a hook and the lower interface includes a bumper, wherein the upper interface of each of the first connecting plate and the second connecting plate defines a first aperture, and wherein the lower interface of each of the first connecting plate and the second connecting plate defines a second aperture; and an attachment including:

a first arm having a first arm end and an opposing second arm end;

a second arm having a third arm end and an opposing fourth arm end;

a cross-member extending between the first arm end of the first arm and the third arm end of the second arm;

a first outer plate coupled to and laterally spaced from the first arm end by a first upper coupler and a first lower coupler such that a first channel is defined therebetween that selectively receives the first connecting plate, wherein the hook and the bumper of the first connecting plate selectively engage with the first upper coupler and the first lower coupler, respectively; and a second outer plate coupled to and laterally spaced from the third arm end by a second upper coupler and a second lower coupler such that a second channel is defined therebetween that selectively receives the second connecting plate, wherein the hook and the bumper of the second connecting plate selectively engage with the second upper coupler and the second lower coupler, respectively.

16. The attachment assembly of claim 15, wherein the first arm end of the first arm and the first outer plate define third apertures that selectively align with the first aperture to receive a first pin, and wherein the first arm end of the first arm and the first outer plate define fourth apertures that selectively align with the second aperture to receive a second pin.

17. The attachment assembly of claim 15, wherein a rear edge of each of the first arm end of the first arm and the third arm end of the second arm includes (i) a first guide flange extending rearward from the rear edge at an upper portion thereof, (ii) a second guide flange extending rearward from the rear edge at a lower portion thereof, and (iii) a notch positioned between the first guide flange and the second guide flange that selectively receives at least a portion of the lateral member, and wherein the first guide flange and the second guide flange are angled toward a center of the attachment.

18. An attachment assembly for a vehicle, the attachment assembly comprising:

a lateral member;

a plurality of arms spaced along a length of and extending forward of the lateral member; and an attachment interface including:

a pair of interfaces coupled to the lateral member, one of the pair of interfaces positioned proximate each end of the lateral member such that the plurality of arms are positioned between the pair of interfaces; and a plate coupled to the plurality of arms such that the plate is positioned between the pair of interfaces and offset forward relative to the lateral member;

wherein the plate and the pair of interfaces are configured to selectively engage with an attachment to facilitate releasably coupling the attachment to the vehicle.

19. The attachment assembly of claim 18, wherein the plate is part of a bump stop having an L-shaped structure.

20. The attachment assembly of claim 18, wherein:

each of the pair of interfaces includes a first end coupled to the lateral member and an opposing second end defining an aperture;

each of the pair of interfaces defines an interior slot;

each of the pair of interfaces has an upper wall, a lower wall, an outer wall extending between the upper wall and the lower wall, and an inner wall extending (a) between the upper wall and the lower wall and (b) only partially from the first end towards the opposing second end such that a cutout is defined; and the aperture and the cutout cooperatively provide an L-shaped opening that permits receiving a portion of the attachment within the interior slot.

* * * * *